(12) United States Patent
Narushima et al.

(10) Patent No.: US 9,132,392 B2
(45) Date of Patent: Sep. 15, 2015

(54) COLUMN CONTACT APPARATUS AND METHOD FOR OPERATING THE SAME

(75) Inventors: Takeshi Narushima, Utsunomiya (JP); Yoichi Endo, Utsunomiya (JP); Yoshihiro Nozawa, Moka (JP); Minoru Goto, Utsunomiya (JP); Toru Ugajin, Utsunomiya (JP); Hiroyuki Shiomi, Utsunomiya (JP); Kunio Matsui, Sakura (JP); Yasumitsu Sakuma, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 13/993,819

(22) PCT Filed: Dec. 19, 2011

(86) PCT No.: PCT/JP2011/079336
§ 371 (c)(1),
(2), (4) Date: Jun. 13, 2013

(87) PCT Pub. No.: WO2012/086581
PCT Pub. Date: Jun. 28, 2012

(65) Prior Publication Data
US 2013/0259774 A1    Oct. 3, 2013

(30) Foreign Application Priority Data

Dec. 21, 2010 (JP) ................. 2010-284203
Dec. 21, 2010 (JP) ................. 2010-284204
Dec. 21, 2010 (JP) ................. 2010-284205

(51) Int. Cl.
*B01J 19/24*    (2006.01)
*B01F 3/04*    (2006.01)
(Continued)

(52) U.S. Cl.
CPC ........... *B01F 3/04078* (2013.01); *B01J 8/0242* (2013.01); *B01J 10/00* (2013.01);
(Continued)

(58) Field of Classification Search
CPC ............. B01J 10/00; B01J 19/24; B01J 35/04
USPC .................. 422/222, 600, 605; 585/260
See application file for complete search history.

(56) References Cited

U.S. PATENT DOCUMENTS 3,489,809 A * 1/1970 Romeo, Sr. et al. .......... 585/260
5,866,734 A   2/1999 Flick et al.

(Continued)

FOREIGN PATENT DOCUMENTS

CN    1411431 A        4/2003
DE    42 43 424 A1    6/1994
(Continued)

OTHER PUBLICATIONS

Cybulski et al., "Structured Catalysts and Reactors," Second Edition, CRC Press, 2006, pp. 426-427 (3 pages total provided).

(Continued)

*Primary Examiner* — Walter D Griffin
*Assistant Examiner* — Huy-Tram Nguyen
(74) *Attorney, Agent, or Firm* — Birch, Stewart, Kolasch & Birch, LLP

(57) ABSTRACT

The invention is a column contact apparatus for contacting gas with liquid in an upflow in a column container, containing two or more stages of honeycomb structural bodies in the column container in a vertical direction, a space portion formed between the respective stages of the honeycomb structural bodies and a flow-aligning portion as back-flow prevention means provided in the space portion between the respective stages such that the flow-aligning portion is not brought into contact with the honeycomb structural bodies, the flow-aligning portion including a plurality of holes with hole diameters of 0.5 mm to 8 mm.

21 Claims, 23 Drawing Sheets

(51) Int. Cl.
*B01J 10/00* (2006.01)
*B01J 35/04* (2006.01)
*B01J 8/02* (2006.01)
*B01J 37/02* (2006.01)
*B01J 29/068* (2006.01)
*B01J 29/072* (2006.01)
*B01J 19/00* (2006.01)
*B01J 19/32* (2006.01)

(52) U.S. Cl.
CPC .............. *B01J 19/006* (2013.01); *B01J 19/24* (2013.01); *B01J 19/2485* (2013.01); *B01J 19/32* (2013.01); *B01J 19/325* (2013.01); *B01J 29/068* (2013.01); *B01J 29/072* (2013.01); *B01J 35/04* (2013.01); *B01J 37/0244* (2013.01); *B01J 2219/00777* (2013.01); *B01J 2219/2404* (2013.01); *B01J 2219/2406* (2013.01); *B01J 2219/2407* (2013.01); *B01J 2219/2408* (2013.01); *B01J 2219/2422* (2013.01); *B01J 2219/2427* (2013.01); *B01J 2219/2432* (2013.01); *B01J 2219/2434* (2013.01); *B01J 2219/2443* (2013.01); *B01J 2219/2445* (2013.01); *B01J 2219/32275* (2013.01); *B01J 2219/32408* (2013.01); *B01J 2219/32466* (2013.01)

(56) References Cited

U.S. PATENT DOCUMENTS

| | | | |
|---|---|---|---|
| 5,989,411 | A | 11/1999 | Gupta |
| 6,123,323 | A | 9/2000 | Yoneda et al. |
| 6,569,314 | B1 * | 5/2003 | Iaccino et al. ................ 208/58 |
| 7,156,977 | B2 * | 1/2007 | Wrisberg et al. ............. 208/49 |
| 2002/0076372 | A1 | 6/2002 | Leloup et al. |
| 2003/0049185 | A1 * | 3/2003 | Welp et al. .................... 422/222 |
| 2003/0050510 | A1 | 3/2003 | Welp et al. |
| 2004/0120871 | A1 | 6/2004 | De Angelis et al. |
| 2004/0152925 | A1 | 8/2004 | Sunkara et al. |
| 2005/0129594 | A1 | 6/2005 | Welp et al. |
| 2006/0078483 | A1 * | 4/2006 | Kemoun et al. ............. 422/188 |

FOREIGN PATENT DOCUMENTS

| | | | |
|---|---|---|---|
| JP | 50-50838 | | 5/1975 |
| JP | 58-45280 | A | 3/1983 |
| JP | 7-8707 | A | 1/1995 |
| JP | 10-95739 | A | 4/1998 |
| JP | 10-146523 | A | 6/1998 |
| JP | 2002-528597 | A | 9/2002 |
| JP | 2003-517082 | | 5/2003 |
| JP | 2003-517082 | A | 5/2003 |
| JP | 2003-176255 | A | 6/2003 |
| JP | 2004-522567 | A | 7/2004 |
| JP | 2009-291695 | A | 12/2009 |
| JP | 2011-78945 | A | 4/2011 |

OTHER PUBLICATIONS

English machine translation of DE-4243424-A1 published Jun. 23, 1994.
English machine translation of JP-2011-78945-A published Apr. 21, 2011.
English machine translation of JP-50-50838-A published May 17, 1975.
Hashimoto, "Reaction Engineering," Baifukan, 1993, pp. 179-197.
International Preliminary Report on Patentability and translation of the Written Opinion of the International Searching Authority (Forms PCT/IB/373 and PCT/ISA/237) for International Application No. PCT/JP2011/079336 mailed Jul. 2, 2013.
Kawakami et al., "Kagaku Kogaku Ronbunshu," vol. 13, 1987, pp. 318-323 ("Characteristics of a Honeycomb Monolith Three-Phase Bioreactor—Oxidation of glucose by immobilized glucose oxidase").
Kreutzer et al., "Scaling-up Multiphase Monolith Reactors: Linking Residence Time Distribution and Feed Maldistribution," Ind. Eng. Chem. Res., vol. 44, 2005, pp. 4898-4913.
Maruzen, Chemical Engineering Handbook, Sixth Edition, edited by the Society of Chemical Engineers, 1999, pp. 611-612 (with partial English translation).
Patrick et al., "Residence Time Distribution in Three-Phase Monolith Reactor," AIChE Journal, vol. 41, No. 3, Mar. 1995, pp. 649-667.
Sederman et al., "MRI strategies for characterising two-phase flow in parallel channel ceramic monoliths," Catalysis Today, vol. 128, 2007 (available online Jun. 8, 2007), pp. 3-12.
Thulasidas et al., "Dispersion during bubble-train flow in capillaries," Chemical Engineering Science, vol. 54, 1999, pp. 61-76.
English machine translation of JP-7-8707-A published Jan. 13, 1995.
International search report issued in PCT/JP2011/079336 mailed Mar. 19, 2012.
The Office Action, dated Dec. 16, 2014, issued in the corresponding Japanese Patent Application No. 2010-284204.
The Office Action, dated Dec. 16, 2014, issued in the corresponding Japanese Patent Application No. 2010-284205.
The Office Action, dated Dec. 2, 2014, issued in the corresponding Japanese Patent Application No. 2010-284203.
The Office Action (including an English translation), dated Nov. 27, 2014, issued in the corresponding Chinese Patent Application No. 201180067801.4.

* cited by examiner

Gas, liquid (a)

(b)

(a)

(b)

(a)

(b)

(a)

(b)

COLUMN CONTACT APPARATUS AND METHOD FOR OPERATING THE SAME

FIELD OF THE INVENTION

The present invention relates to a column contact apparatus and a method for operating the same for contacting gas with liquid (hereinafter, abridged to gas-liquid) in an upflow in a column container.

BACKGROUND OF THE INVENTION

As methods for reacting two phases of gas and liquid (gas-liquid two-phase) in a reaction column in which catalyst is accommodated, a downward co-current type or downflow type method (Japanese National Phase Laid-Open Patent Publication No. 2004-522567 (US2002/0076372)) in which the gas-liquid is flowed from top to bottom and reacted and an upward co-current type or upflow type method (JP-A 2003-176255 (US2003/0050510)) in which the gas-liquid is flowed from the bottom to the top and reacted are known. As a support body of catalyst used in these methods, a honeycomb structural body or a monolith structural body configured by a plurality of parallel narrow tubular channels is used since a pressure loss when fluid flows is small.

As a flow regime of the gas-liquid two-phase flow flowing through the narrow tubular channels configuring the honeycomb structural body, Taylor flow in which gas bubbles and liquid slug alternately flow is known. In the above-mentioned Taylor flow, since it is a very thin liquid film that separates the gas bubbles from the catalyst fixed on an inner wall of the channels, mass transfer between the gas and the solid wall is fast. Further, an internal circulating flow is generated in the liquid slug, and mass transfer inside the liquid slug is promoted as well. For these reasons, the honeycomb structural body is expected as a catalyst support body for a gas-liquid-solid catalyst reaction.

In the honeycomb structural body, since pressure loss is small, it is easy to apply an upflow type column as a reactor. In the upflow of the gas-liquid two-phase, since the liquid is in a continuous phase under a broad range of flow rates of the gas and the liquid, advantage that the flow in the narrow tubular channels in the honeycomb easily becomes Taylor flow is obtained. Also, according to regularity of the channel structure, it is considered that the flow becomes uniform with respect to a cross-sectional surface of the honeycomb.

At present, however, it is known that gas bubbles tend to flow into only part of channels selectively and the flow becomes unstable so that the flow becomes non-uniform with respect to the cross-sectional surface of the honeycomb.

The flow state inside a reaction column can be evaluated from residence time distribution (Kenji Hashimoto: Reaction Engineering (Baifukan, 1993) pp. 179-197 [in Japanese] (Literature 1)). The residence time distribution is directed to a distribution of time in which the fluid flowing into the apparatus at a certain moment resides in the apparatus. The residence time distribution can be obtained by, for example, momentarily injecting a tracer into an apparatus via an inlet to measure concentration response (change in concentration) of the tracer at an outlet of the apparatus so as to normalize the concentration response as a probability density (impulse response method).

As a residence time distribution $E(t)$, a completely mixed flow and a plug flow that are model flow states completely opposite to each other are known. The completely mixed flow is directed to a flow state model of a continuous stirred-tank reactor, namely a flow in which the fluid is momentarily mixed to be uniform in the reactor, while the plug flow is directed to a flow state model of a tubular reactor, namely a flow in which the fluid are not mixed at all in the flow direction in the reactor. Since these assumptions cannot be strictly probable, these two flows are referred to as ideal flows.

The actual flow takes an intermediate residence time distribution between the completely mixed flow and the plug flow. For example, a fact that the residence time distribution in the reaction column is close to that of the completely mixed flow indicates that the mixture of the fluid in the reaction column is noticeable, namely the flow inside the reaction column is noticeably turbulent. In the case of the gas-liquid two-phase flow, it is most probable that the completely mixed flow reflects an unstable flow state.

In the completely mixed flow, since a large portion of fluid is discharged from the reaction column in a noticeably short residence time, reaction is not sufficiently progressed inside the reaction column. Accordingly, problems may be caused with respect to reaction activity. In contrast, fluid that remains in the reaction column for a noticeably long residence time also coexists. At this time, there is an increased possibility that the reaction is overperformed, not resulting in an intended product, but side products. That is, this may cause disadvantage on the selectivity of the reaction.

As researches in which the residence time distribution of the liquid is examined with respect to the upflow of the gas-liquid two-phase in the apparatus that accommodates the honeycomb structural body or the monolith structural body, Koei Kawakami, Kimihiro Adachi, Norimichi Minemura, Koichiro Kusunoki; Kagaku Kogaku Ronbunshu, Vol. 13 (1987) 318 [in Japanese] (K. Kawakami, K. Kawasaki, F. Shiraishi, K. Kusunoki; Ind. Eng. Chem. Res. 28 (1989) 394) (Literature 2), R. H. Patrick, T. Klindera, L. L. Crynes, R. L. Cerro, M. A. Abraham; AIChE J. 41 (1995) 649 (Literature 3), and T. C. Thulasidas, M. A. Abraham, R. L. Cerro; Chem. Eng. Sci. 54 (1999) 61 (Literature 4) are known.

In Literature 2, a monolith with 80 channels per square inch (80 cpsi, 12.4 per 1 $cm^2$), which is configured by narrow tubular channels with a square cross section of width of 2.4 mm, is used. The monolith has a square cross section with each side of 2 cm and has a height of 10 cm (the number of the narrow tubular channels is 49). One or three of the monoliths are accommodated in a rectangular tube with a square cross section of each side of 2.2 cm. Stainless narrow tubes are inserted into all of the 49 narrow tubular channels so that the gas is uniformly dispersed. The gas is supplied through these stainless narrow tubes. The residence time distribution of the liquid obtained as mentioned above is close to substantially the completely mixed flow. The experimental condition seems that the superficial gas velocity is equal to or less than $5.2 \times 10^{-2}$ m/s and the superficial liquid velocity is equal to or less than $5.2 \times 10^{-4}$ m/s. The superficial velocity is obtained by dividing the flow rate by the cross-sectional area of the column (or the apparatus, reactor).

In Literature 3, a cylindrical tube with an inner diameter of 5 cm accommodates three monoliths (400 cpsi) each configured by narrow tubular channels with a width of 1 mm. The height of total of the three monoliths is 0.33 m. The narrow tubular channels between the monoliths are not consistent with each other. The residence time distribution of the liquid at the superficial gas velocity of $2.2 \times 10^{-2}$ m/s and the superficial liquid velocity of $2.3 \times 10^{-3}$ m/s is obtained, and the flow is close to the completely mixed flow.

In Literature 4, the monolith is emulated by bundling the narrow tubes (a height of 15.2 cm) having a square cross section with a width of 2 mm. The residence time distribution of the liquid at the superficial gas velocity of $1.2 \times 10^{-2}$ m/s and the superficial liquid velocity of $1.2\times10^{-3}$ m/s is obtained, and the flow is close to the completely mixed flow as expected. Here, the superficial velocity is calculated from device cross-sectional surface of 5.7 cm×2.3 cm.

As described above, with respect to the upflow of the gas-liquid two-phase in the apparatus that accommodates the honeycomb structural body or the monolith structural body therein, only the residence time distribution of the liquid that is close to that of the completely mixed flow is known.

In M. T. Kreutzer, J. J. W. Bakker, F. Kapteijn, J. A. Moulijn; Ind. Eng. Chem. Res. 44 (2005) 4898 (Literature 5) and A. Cybulski, J. A. Moulijn (eds.); Structured Catalysts and Reactors, Second Edition (CRC Press, 2006) pp. 426-427 (Literature 6), stability analysis of the flow is performed on the basis of the pressure loss model of Taylor flow in the narrow tubular channels. According to them, in the upflow, the flow becomes unstable irrespective of the flow rate conditions of the gas or the liquid. This is consistent with the result of Literatures 2 to 4.

In A. J. Sederman, J. J. Heras, M. D. Mantle, L. F. Gladden; Catal. Today 128 (2007) 3 (Literature 7), the upflow of the gas-liquid two-phase in the honeycomb is confirmed according to visualization by MRI. The monolith currently used is configured by narrow tubular channels with a square cross section of width of 1.7 mm, and the diameter of the monolith is 42 mm, and the height thereof is 0.15 m, and 200 cpsi. The monolith is accommodated in a circular tube having an inner diameter of 50 mm with a lateral surface sealed so that the flow is not bypassed. For example, velocity distribution of the liquid in the monolith cross-sectional surface obtained at the superficial gas velocity of $9\times10^{-4}$ m/s and the superficial liquid velocity of $4.1\times10^{-3}$ m/s is noticeably broad distribution also including downward velocity. This result is also consistent with the Literatures 2 to 6.

As described above, the upflow of the gas-liquid two-phase in the honeycomb packed column in which the honeycomb structural bodies are accommodated is unstable, and only the residence time distribution of the liquid that is close to that of the completely mixed flow is known. Therefore, in the honeycomb packed column, as can be seen in Japanese National-Phase Laid-Open Patent Publication No. 2004-522567 (US2002/0076372) and Literature 5, many studies are performed on the downflow.

Since the liquid dispersion is important in the downflow, in Japanese National-Phase Laid-Open Patent Publication No. 2004-522567 (US2002/0076372), the honeycomb structural bodies are shifted and stacked with each other to disperse the liquid. In Literature 5, a spray nozzle and a static mixer are used.

Also, as for the upflow, a method for dispersing the gas-liquid by a static mixer, for example, is disclosed as in JP-A2003-176255 (US2003/0050510). As disclosed in Literature 2, it is known that the residence time distribution of the liquid is close to that of the completely mixed flow even if gas dispersion is improved. Although mass transfer is promoted by the gas-liquid dispersion by the static mixer to increase the reaction efficiency in JP-A 2003-176255 (US2003/0050510), the flow state is not necessarily stable.

Further, one of the problems of a fixed-bed reaction column which is used as a reactor is to reduce the work load necessary for regularly exchanging the catalyst, and reduce costs including expenses for the work loads. To reduce the work load, a method for accommodating the catalyst in a container and packing the container in the reaction column may be applied. JP-A 2009-291695 discloses a configuration in which film catalyst obtained by stacking a corrugated plate film and a flat plate film alternately to be honeycomb structural body is accommodated in a cylindrical case.

When loading the container that accommodates the catalyst therein in the reaction column, clearance is often present between the inner wall surface of the reaction column and the catalyst container. In some cases, the clearance is generated due to dimension accuracy error upon manufacturing, while in some cases, adjustment is performed so that the clearance is formed in advance to facilitate the catalyst container to be taken in and out.

When the clearance is present in the reaction column, however, problems that the clearance becomes a bypass so that the reactant passes through the clearance without passing through the catalyst portion are caused. When reaction substances are two-phase of the gas and the liquid, in the upflow reaction column in which the gas and the liquid enters the reaction column from a bottom thereof and are discharged via a top thereof, in most cases, the liquid is in a continuous phase and the gas is in a dispersed phase where the gas is present as bubbles. In such cases, the bypass flow is in particular noticeable.

In order to restrict or suppress the bypass flow to the clearances, a method for using seal materials at portions corresponding to an inlet and an outlet of the clearance to prevent the gas and the liquid from flowing into the clearance is known. When performing the reaction over a long period of time, however, it is not easy to maintain sealing by the seal materials. Although there is a method for embedding the whole clearance with the seal materials, the work load is heavy and eventually the work load for exchanging the catalyst is heavy as well.

US2004/0120871 discloses a method for filling catalyst particles in a gap (clearance) between the reaction column and the monolith catalysts with respect to the integral monolith catalysts with a honeycomb structure. As for the monolith catalyst here, the accommodating container is not used. As well as the use of the accommodating container, however, it is intended to reduce the work loads for exchanging the catalysts.

Although it is considered that the bypass flow into the clearance is restricted by filling up the clearance with the catalyst particles, the filling work or the exchanging work of the catalyst particles itself results in an increase of the work loads.

Further, it is considered that, according to this method, a size or filling density of the catalyst particles to appropriately restrict the bypass flow into the clearance is unclear and thus, the control of the restriction is difficult. It can be considered that since the fillings in the clearance are also catalysts, a problem is not serious even if the bypass flow is present. A fact that the flow into the monolith catalyst to be utilized is reduced, however, is problematic for an efficient use of the catalyst.

Although Chemical Engineering Handbook, Sixth Edition (Maruzen, 1999) edited by the Society of Chemical Engineers, Japan: pp. 611-612 [in Japanese] (Literature 8) is not directed to control techniques of the bypass flow into the clearance, it discloses an internal loop airlift bubble column. Literature 8 discloses that a dual tubular structure is formed in the column, and by guiding the gas into an inner tube, for example, the liquid is accompanied by the gas so as to cause an upflow in the inner tube and a downflow in an outer tube.

SUMMARY OF THE INVENTION

The present invention is directed to a column contact apparatus for contacting gas with liquid in an upflow in a column container, in which two or more stages of honeycomb structural bodies are accommodated in the column container, each of the honeycomb structural bodies is configured by a plurality of parallel narrow tubular channels. The apparatus further includes a space portion having a length equal to or more than 5 mm and equal to or less than twice as large as an inner diameter of the column container, which space portion is formed between respective stages of the two or more stages of the honeycomb structural bodies. A flow-aligning portion as back-flow prevention means is provided in the space portion between the respective stages in a state in which the flow-aligning portion is not brought into contact with the honeycomb structural bodies, and the flow-aligning portion includes a plurality of holes with hole diameters of 0.5 mm to 8 mm.

Further, the present invention provides a method for operating the column contact apparatus as mentioned above, which method includes the step of contacting the gas with the liquid at a superficial liquid velocity of 0.0001 to 0.5 m/s and a superficial gas velocity of 0.05 to 10 m/s.

BRIEF DESCRIPTION OF THE DRAWINGS

FIG. 14 is views illustrating aspect (I) of the present invention, in which FIG. 14(a) is a cross-sectional view in a vertical direction showing the column contact apparatus used in the examples 22 and 23, and FIG. 14(b) is a cross-sectional view showing the honeycomb structural body used in the column contact apparatus of FIG. 14(a).

FIG. 17 is views illustrating aspect (II) of the present invention, in which FIG. 17(a) is a cross-sectional view in a vertical direction showing the column contact apparatus according to an example of the present invention, and FIG. 17(b) is a partial enlarged view of FIG. 17(a).

FIG. 18 is views illustrating aspect (II) of the present invention, in which FIG. 18(a) is a plan view illustrating a state in which the honeycomb structural bodies are accommodated in a container, and FIG. 18(b) is a cross-sectional view of FIG. 18(a) in an axial direction (in a height direction).

FIG. 19 is views illustrating aspect (II) of the present invention, in which FIG. 19(a) is a plan view illustrating an annular plate as flow control means, and FIG. 19(b) is a partial enlarged plan view illustrating an installation state in which the annular plate in FIG. 19(a) is provided in the column contact apparatus in FIG. 17.

FIG. 20 is views illustrating aspect (II) of the present invention, in which FIG. 20(a) is a cross-sectional view in a vertical direction showing a column contact apparatus according to another example of the present invention, and FIG. 20(b) is a partial enlarged view of FIG. 20(a).

DETAILED DESCRIPTION OF THE INVENTION

Figure 1:
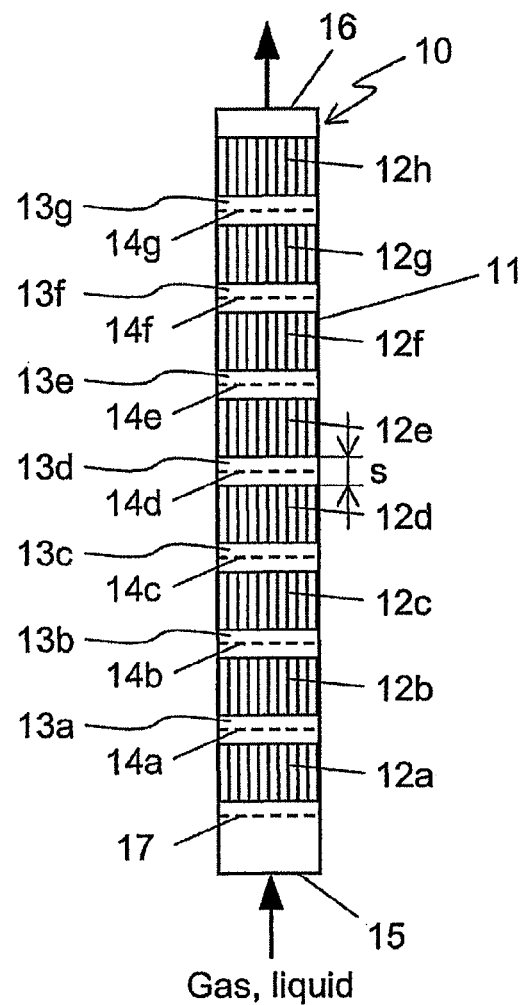
FIG. 1 is a schematic diagram showing a column contact apparatus according to the present invention.

The present invention provides a column contact apparatus and a method for operating the apparatus for contacting gas with liquid in an upward flow (upflow) in a column container in which honeycomb structural bodies are accommodated so as to stabilize a flow state when the gas is brought into contact with the liquid.

In the upflow of the gas-liquid two-phase in the honeycomb packed column in which the honeycomb structural bodies are accommodated, a noticeable back-mixing of the liquid is caused. The phrase "back-mixing" is a phenomenon in which fluids are mixed in a flow in a direction opposite to that of a main flow, and is also referred to as an axial dispersion. A completely mixed flow is an example in which a noticeable back-mixing is present, while a plug flow indicates a state in which the back-mixing is not present.

The present invention provides a column contact apparatus and a method for operating the apparatus for contacting gas with liquid in an upward flow (upflow) in a column container in which honeycomb structural bodies are accommodated so as to suppress back-mixing of the liquid from being generated when the gas is brought into contact with the liquid and narrow down a distribution width of a residence time distribution of the liquid.

According to the analysis in the Literatures 5 and 6, the upflow is unstable. As an assumption of the analysis, it is assumed that the presence of a liquid film can be ignored. Such the assumption can be considered as appropriate in the case of the downflow with thin liquid film, however, the assumption cannot be considered as appropriate in the case of the upflow, in which the liquid film is thicker than that in the downflow, since the presence of the thicker liquid film cannot be ignored.

The followings can be understood from a correlation between the volume flow ratio of the gas (which can be obtained by dividing the superficial gas velocity by a sum of the superficial gas velocity and the superficial liquid velocity) and the gas holdup in a single narrow tubular channel. The inventors conducted stability analysis on the basis of the correlation, and first discovered that especially when the narrow tubular channel is narrower, in the actual flow rate, the flow is stable according to contribution of friction loss by the liquid film. Further, when the above discovery is examined by using the honeycomb structural bodies with different widths of the narrow tubular channels, through experiments, it has been found for the first time that the upflow in the honeycomb packed column that accommodates the honeycomb structural bodies is stabilized when the narrow tubular channel is narrower. In the present invention, a column contact apparatus with a hydraulic diameter of the cross-sectional shape in the width direction of the narrow tubular channel equal to or more than 0.1 mm and less than 1 mm is completed. The present invention includes the column contact apparatus in which the hydraulic diameter of the cross-sectional shape of the narrow tubular channel in a width direction is equal to or more than 0.1 mm and less than 1 mm as a preferred aspect (I).

According to the column contact apparatus of the present invention, when the gas is brought into contact with the liquid in the upflow in the column container in which the honeycomb structural bodies are accommodated, the width of the residence time distribution of the liquid can be narrowed. For this reason, in the column container, the presence of the liquid with a short residence time and the presence of the liquid with a long residence time can be reduced, the efficiency of contact between the gas and the liquid is increased. When the honeycomb structural bodies are used as a reacting apparatus, the efficiency of the reaction is increased.

When the narrow tubular channels in the present invention include hydraulic diameter of the cross-sectional shape in the width direction equal to or more than 0.1 mm and less than 1 mm and when the gas is brought into contact with the liquid in the upflow in the column container in which the honeycomb structural bodies are accommodated, the flow state can be stabilized. For this reason, since the gas-liquid can be almost uniformly flowed into a plurality of narrow tubular channels that the honeycomb structural bodies have, the efficiency of contact between the gas and the liquid is increased. When the honeycomb structural bodies are used as a reacting apparatus, the efficiency of the reaction is increased.

Aspect (II) of the present invention is directed to a column contact apparatus for contacting the gas and the liquid supplied from a bottom of the apparatus with each other in the upflow in a column container and then taking out the gas and the liquid via a top of the apparatus, which apparatus includes:

a container that accommodates the honeycomb structural body therein in the column container;

a clearance being continuous from a bottom to a top of the column container in a height direction between the column container and the accommodating container for the honeycomb structural body; and flow control means that can control a pressure loss ($PL_1$) of the gas and the liquid passing through the clearance at a desired height position of the clearance to be equal to or more than a pressure loss ($PL_2$) of the gas and the liquid passing through the honeycomb structural body.

Aspect (II) of the present invention provides a column contact apparatus and a method for operating the same that can converge the gas-liquid flow in the honeycomb structural bodies by preventing the flow from being bypassed through the clearance present between the column container and the accommodating container for the honeycomb structural bodies (bypass flow) so as to increase the efficiency of contact between the gas and the liquid in the honeycomb structural bodies.

According to aspect (II) of the present invention, when the gas is brought into contact with the liquid in the upflow, the bypass flow of the gas-liquid to the clearance formed between the column container and the container that accommodates the honeycomb structural bodies is restricted.

Accordingly, by converging the flow of the gas-liquid into the honeycomb structural bodies, contact efficiency between the gas and the liquid in the narrow tubular channels of the honeycomb structural bodies is increased. When the honeycomb structural bodies are used as a support body of catalyst, namely, a reacting apparatus, the catalyst can be efficiently used to increase reaction efficiency.

<Column Contact Apparatus>

A column contact apparatus according to the present invention will be described with reference to FIG. 1. FIG. 1 is a vertical cross-sectional view showing a column contact apparatus 10 according to an example of the present invention. The column contact apparatus according to the present invention is not limited to the one shown in FIG. 1.

The column contact apparatus 10 according to the present invention is intended to contact gas with liquid in an upward flow in a column container 11.

The column container 11 used in the column contact apparatus 10 has a size and a shape in accordance with objects and is supplied with the gas and the liquid from a lower portion thereof in which the gas and the liquid are taken out of a top portion thereof and the gas and the liquid are brought into contact with each other in the upward flow.

Honeycomb structural bodies 12 (12a-12h) configured by a plurality of parallel narrow tubular channels are accommodated in the column container 11.

The honeycomb structural body 12 is intended to contact the gas with the liquid therein.

In FIG. 1, a total of eight stages of the honeycomb structural bodies 12 are accommodated. The number of the accommodated stages of the honeycomb structural bodies 12 may be two or more and selected in accordance with the intended use of the column contact apparatus 10. The fact that the two or more stages are accommodated is directed to the fact that the stages are accommodated in the state where a gap is formed between the stages. In the present invention, a single one of the stage is occasionally referred to as "a honeycomb packed bed".

In order to obtain an advantage of back mixing regulation according to the present invention effectively, it is preferable that the number of the stages may be equal to or more than four, more preferably, equal to or more than 10, and even more preferably equal to or more than 20.

One stage of the honeycomb structural body 12 may be configured by a single one of the honeycomb structural body, or a combination of a plurality of the honeycomb structural bodies.

The shape and the configuration of the honeycomb structural body 12 used in the column contact apparatus 10 according to the present invention is well known.

As for the honeycomb structural body 12, a cross-sectional shape of each of the narrow tubular channels in the width direction may be of any shape. For example, a circular shape, an oval shape, a polygonal shape (a triangular shape, a rectangular shape, a hexagonal shape, etc.), a substantially polygonal shape and the like are used. Here, the phrase "a substantially polygonal shape" is directed to a polygonal shape in which one or more corner parts are round or one or more sides include curved lines.

Figure 2:
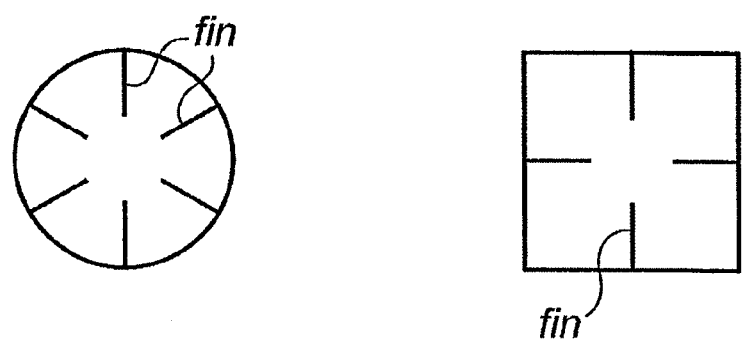
FIG. 2 is a view illustrating a cross-sectional shape of the narrow tubular channels with fins.

Further, for the cross-sectional shapes of the narrow tubular channels in the width direction, shapes in which any number of fins including any size are attached to any positions as shown in FIG. 2 may be adopted.

As the honeycomb structural body 12, the one in which a flat plate film and a corrugated plate film are alternately stacked in the thickness direction and the cross-sectional shape of each of the narrow tubular channels in the width direction is a substantially triangular shape can be used (hereinafter, referred to as "a composite honeycomb structural body of the flat plate film and the corrugated plate film"). The phrase "a substantially triangular shape" is directed to a triangular shape in which one or more corner parts are round or one or more sides include curved lines.

Figure 3:
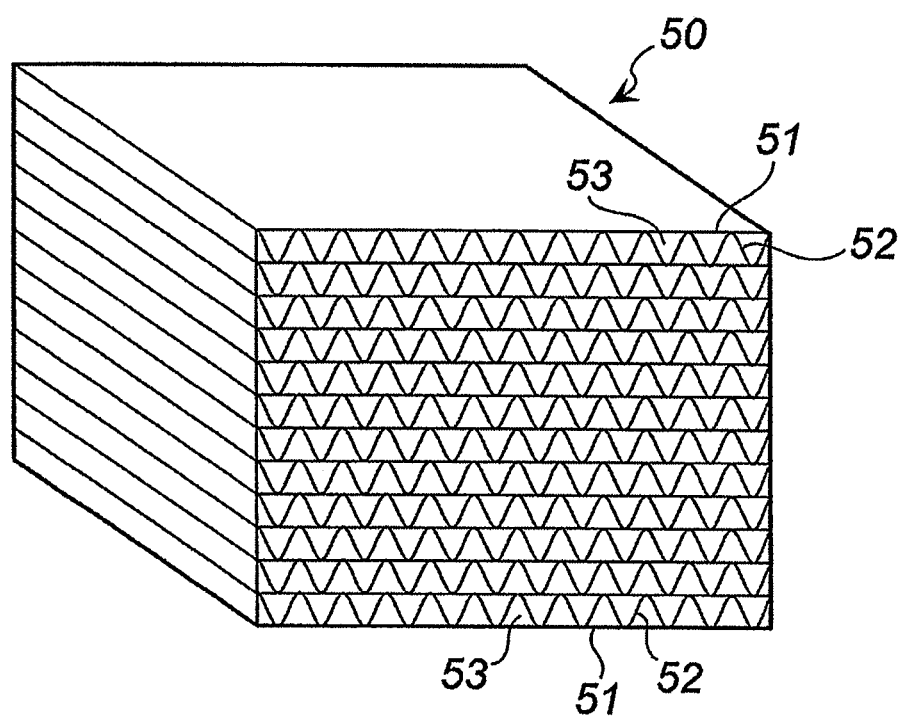
FIG. 3 is a perspective view showing honeycomb structural bodies according to an example.

As an external shape and a structure of the composite honeycomb structural body of the flat plate film and the corrugated plate film, the one shown in FIG. 3 may be used.

A composite honeycomb structural body 50 of the flat plate film and the corrugated plate film as shown in FIG. 3 is configured by alternately stacking a flat plate film 51 and a corrugated plate film 52 in which a plurality of parallel narrow tubular channels 53 with substantially triangular shapes (in each of the shapes, a corner is round and two sides include curved lines) are formed.

When the honeycomb structural body 12 is used as a structured catalyst, the honeycomb structural body 12 is used as a support body of catalyst. The catalyst is fixed on a surface of the honeycomb structural body 12. Here, the surface of the honeycomb structural body is directed to a surface in contact with gas or liquid, namely inner wall surfaces of the plurality of narrow tubular channels that the honeycomb structural body has and an outer surface of the honeycomb structural body.

Such a honeycomb structural body 12 with the surface on which the catalyst is fixed is publicly known. For example, the ones as disclosed in the Japanese National-Phase Laid-Open Patent Publication No. 2004-522567 (US2002/0076372) or JP-A 2003-176255 (US2003/0050510) can be used.

The above described composite honeycomb structural body of the flat plate film and the corrugated plate film on which the catalyst is fixed can be obtained by fixing the catalyst on the honeycomb structural body 50 as shown in FIG. 3. The honeycomb structural body 50 on which the catalyst is fixed as shown in FIG. 3 may be obtained by applying manufacturing methods the same as those shown in FIG. 3 of JP-A 2009-262145 and FIG. 6 of JP-A 2008-110341.

When accommodating the honeycomb structural body 12 in the column container 11, a method for accommodating the honeycomb structural body 12 processed to include a size and a shape that can be accommodated in the column container 11 may be applied. According to the needs, a method for accommodating a holder (accommodating container for the honeycomb structural body) accommodating the honeycomb structural body 12 therein may be applied in which the holder includes a size and a shape that can be accommodated in the column container 11.

In FIG. 1, the honeycomb structural body 12 (or the holder that accommodates it) is supported and fixed by a member, not shown in the drawing, through which the gas-liquid can flow and forms space portions 13a-13g. The member is support means fixed on or attached to the column container 11 so that the member can be attached to and removed from the column container 11. As the member, a ring, a grid, a disc-shaped net, a perforated plate, a cylindrically-shaped frame body, a frame body formed by a frame structure may be used.

As shown in FIG. 1, in the column contact apparatus 10 of the present invention, flow-aligning portions 14a-14g as back flow prevention means are placed at the corresponding space portions 13a-13g among the honeycomb structural bodies 12a-12h. Also, a flow-aligning portion 17 may be provided under the honeycomb structural body 12a. The flow-aligning portion 17 may be provided and also may not be provided. If provided, the flow-aligning portion 17 is preferable since dispersion of the gas above the flow-aligning portion 17 is improved when the gas-liquid is flowed into the column contact apparatus 10. The flow-aligning portion may be provided on an upper side of the honeycomb structural body 12h, where the flow-aligning portion is not shown in the drawing. In this case, the flow-aligning portion is preferable since back-mixing from a space on the upper side of the honeycomb structural body 12h can be restricted.

The flow-aligning portions 14a-14g are not particularly limited as long as the pressure loss with respect to the flow of the gas-liquid is small. The flow-aligning portions that have a plurality of perforation channels (holes) through which the gas and the liquid together can flow and can restrict the movements of the gas-liquid in the horizontal direction between the proximate channels (holes) are preferable.

The flow-aligning portions having a plurality of perforation channels (holes) operate such that when gas bubbles pass through the channels (holes) of the flow-aligning portions from bottom to top, the gas bubbles function as plugs for the channels (holes) to restrict the back-flow of the liquid through the channels (holes) of the flow-aligning portions from the top to the bottom. Specifically, a perforated plate such as a punching metal, a thick honeycomb plate (a thick plate of a honeycomb structure) in which channels in the vertical direction are sectioned by thin walls to be shaped triangularly, rectangularly, hexagonally or the like, and that in which two meshes are filled with regular spherical or cylindrical particles therebetween are preferable for the flow-aligning portions. A perforated plate with uniform circular channels, that can be easily processed is particularly preferable.

To perform the above described operations, it is preferable that hole diameters of the flow-aligning portions 14a-14g are the same with or less than the largest diameters of the gas bubbles in the column contact apparatus 10, preferably equal to or less than 8 mm, more preferably equal to or less than 6 mm, and even more preferably equal to or less than 5 mm. Further, from a point of view of suppressing the pressure loss when the gas-liquid passes through the flow-aligning portions and a point of view of preventing a stagnant portion of the flow in the column contact apparatus 10 from being generated, the hole diameters of the flow-aligning portions 14a-14g are preferably equal to or more than 0.5 mm, more preferably equal to or more than 0.8 mm, and even more preferably equal to or more than 1 mm. To prevent the back-flow of the liquid in the flow-aligning portions, valves may be attached to the holes. In this case, when the gas-liquid flows from bottom to top, the valves are opened to pass the gas-liquid therethrough, while in the case of the back-flow, the valves are closed.

From a point of view of efficiently utilizing the space in the column contact apparatus 10, the thickness of the flow-aligning portions 14a-14g is sufficiently small compared with the height of the honeycomb structural body. It is preferable that the thickness is equal to or less than 25% of the height of one honeycomb structural body.

As the flow-aligning portions 14a-14g, the perforated plate with the above described hole diameter range and the thick honeycomb plate may be used. The perforated plate and the thick honeycomb plate have same back-mixing restriction effect as the flow-aligning portions because of having similarly the uniform channels (holes). Since most of the thick honeycomb plate includes a large aperture ratio, when using the thick honeycomb plate as the flow-aligning portions, the thickness of the thick honeycomb plate is more than that of the perforated plate from a point of view of strength.

When using the perforated plate as the flow-aligning portions, since the aperture ratio with respect to the area of the perforated plate is associated with the hole diameters of the perforated plate, from a point of view of obtaining the back-mixing restriction effect, the aperture ratio is preferably equal to or less than 70%, more preferably equal to or less than 60%, even more preferably equal to or less than 50%, and even more preferably equal to or less than 45%. Further, from a point of view of suppressing the pressure loss when the gas-liquid passes through the perforated plate and a point of view of preventing a stagnant portion of the flow in the column contact apparatus 10 from being generated, the aperture ratio with respect to the area of the perforated plate is preferably equal to or more than 1%, more preferably equal to or more than 10%, even more preferably equal to or more than 20% and even more preferably equal to or more than 31%.

When using the perforated plate as the flow-aligning portions, a distance (pitch) (length of a line connecting central points of the adjacent holes) between the adjacent holes is associated with the aperture ratio. That is, the aperture ratio is determined by a ratio between the pitch and the hole diameters. For example, assuming a certain hole diameter, the pitch is large when the aperture ratio is small, while the pitch is decreased when the aperture ratio increases. The ratio between the pitch and hole diameters, namely, the pitch/the hole diameters may be in the range of 1.1 to 15, preferably in the range of 1.2 to 8, and more preferably in the range of 1.25 to 4.

When using the perforated plate as the flow-aligning portions, the hole may be of any shape, for example, a circular shape, an oval shape, a polygonal shape and a slit shape. From a point of view of restricting the back-mixing of the liquid by plugging the holes with the gas bubbles when the gas bubbles pass through the holes, it is preferable that the shapes of the holes are circular. The shape of the perforated plate may be in a dish shape from a point of view of strength. From a point of view of efficiently utilizing the space in the column contact apparatus 10, it is preferable that the shape may be of a flat plate.

When using the perforated plate as the flow-aligning portions, the holes may be in any array. For example, the holes may be in a regular triangle array in which lines connecting central points of the holes form an equilateral triangle, or in a square array. Also, the holes may be in a random array. From a point of view of uniformly distributing the gas, a number density of the holes may be changed at a central portion and a circumferential portion for the perforated plate. From a point of view of suppressing the pressure loss by increasing the aperture ratio, it is advantageous for the circular holes to be in the equilateral triangle array. From a point of view of uniform dispersion of the gas or the aperture ratio, holes can be formed with arbitrary diameters thereof.

When using the perforated plate as the flow-aligning portions, the thickness of the perforated plate is preferably equal to or more than 0.5 mm, more preferably equal to or more than 1 mm from a point of view of strength. The thickness is preferably equal to or less than 20 mm, more preferably equal to or less than 10 mm, and even more preferably equal to or less than 5 mm from a point of view of workability and suppressing an increase in mass.

In a case of using the thick honeycomb plates as the flow-aligning portions, some include nearly 100% aperture ratio. An important factor for restricting the back-mixing of the liquid is the hole diameters of the flow-aligning portions. Accordingly, the aperture ratio may be larger. The thick honeycomb plate includes a variety of manufacturing methods and products and thus degree of freedom of the holes and pitch size is high. Accordingly, the plate including a small aperture ratio can be used. In this case, from a point of view of suppressing the pressure loss when the gas-liquid passes through the thick honeycomb plate and a point of view of preventing the stagnant part of the flow from being generated in the column contact apparatus 10, the aperture ratio of the thick honeycomb plate is preferably equal to or more than 1%, more preferably equal to or more than 10%, even more preferably equal to or more than 20% and even more preferably equal to or more than 31%.

In the case of using the thick honeycomb plate as the flow-aligning portions, the strength is maintained by the thickness of the thick honeycomb plate. The thickness of the thick honeycomb plate is preferably equal to or more than 5 mm, more preferably equal to or more than 10 mm, and even more preferably equal to or more than 20 mm from a point of view of strength. The thickness is preferably equal to or less than 25% of the height of one honeycomb structural body from a point of view of efficiently utilizing the space in the column contact apparatus 10.

The flow-aligning portions 14a-14g are provided in the space portions 13a-13g and are not in contact with any of the honeycomb structural bodies that are adjacent to the flow-aligning portions 14a-14g thereon or thereunder. When the flow-aligning portions 14a-14g contact any one of the honeycomb structural bodies 12a-12h adjacent to the flow-aligning portions 14a-14g thereon or thereunder, it is not preferable since the back-mixing restriction effect is reduced. The phrase "not in contact with" here does not exclude an example in which the flow-aligning portions are supported and fixed by the honeycomb structural bodies to be held in the space portions. The flow-aligning portions 14a-14g in the space portions 13a-13g are preferably installed at an intermediate position between the two adjacent honeycomb structural bodies in the vertical direction.

The lengths (distances between the respective stages, "s" shown in FIG. 1) of the space portions 13a-13g are directed to the lengths (lengths obtained by subtracting the thickness of the flow-aligning portions therefrom) of the space portions defined after the flow-aligning portions 14a-14g are provided. The lengths may be within a range in which the flow-aligning portions 14a-14g can be provided and the flow-aligning portions 14a-14g are not in contact with the adjacent honeycomb structural bodies 12a-12h vertically.

The lengths of the space portions 13a-13g may be the same with or different from each other. From a point of view of obtaining the back-mixing restriction effect, the lengths are preferably equal to or more than 5 mm, more preferably equal to or more than 10 mm, and even more preferably equal to or more than 20 mm.

The upper limit of the lengths of the space portions is determined in consideration of the size of the column container 11 and the size and the number of stages of the honeycomb structural bodies to be accommodated. It is preferable that the upper limit is determined in consideration of the flow state in the space portions. That is, circulation flow of the liquid may be generated in the space portions. It is considered that the circulation flow is not preferable for the restriction of the back-mixing by the flow-aligning portions. Since a larger one of the circulation flow has a size substantially the same as that of a column diameter, from a point of view of restricting the larger circulation flow, it is desirable that the upper limit of the lengths of the space portions is determined in consideration of a relationship between the lengths and an inner diameter of the column container 11. In consideration of providing the flow-aligning portions in the space portions, the upper limit of the lengths of the space portions is preferably equal to or less than twice as large as the inner diameter of the column container 11, more preferably equal to or less than the inner diameter of the column container 11, and even more preferably equal to or less than a half of the inner diameter of the column container 11.

That is, it is preferable that the lengths of the space portions are equal to or more than 5 mm, equal to or more than 10 mm or equal to or more than 20 mm. It is preferable that the lengths of the space portions are equal to or less than twice as large as the inner diameter of the column container, equal to or less than the inner diameter, or equal to or less than a half as large as the inner diameter. It is a condition that the upper limit of the lengths is more than the lower limit. Accordingly, it is preferable that the inner diameter of the column container is equal to or more than 50 mm. It is preferable that the lower limit of the lengths of the space portions on the basis of the inner diameter of the column container is equal to or more than 10 mm or equal to or more than 20 mm.

In FIG. 1, seven of the flow-aligning portions 14a-14g are provided in all (seven positions) of the space portions 13a-13g. To solve the problems of the present invention, one to seven of the aligning portions may be provided at any one to seven positions of the space portions 13a-13g. Further, two or more flow-aligning portions may be provided in one of the space portions. A plurality of the flow-aligning portions may be successively (adjacently) provided or provided apart from each other. Also, when installing two or more flow-aligning portions in one of the space portions, the same type of the flow-aligning portions may be used or different types of the flow-aligning portions may be used.

Further, eight of the honeycomb structural bodies 12a-12h may be appropriately combined. For example, the eight honeycomb structural bodies 12a-12h are separated into two groups, namely, two stages of four at each so that one of the stages is formed by four successively provided honeycomb structural bodies and one of the flow-aligning portions is provided in the space portion between the first and the second stages (As shown in FIG. 6(a), the two stages are formed. In FIG. 6(a), however, in a lower stage 112a, eight of the honeycomb structural bodies are used, in an upper stage 112b, eight of the honeycomb structural bodies are used.), the eight honeycomb structural bodies 12a-12h are separated into four groups, namely, four stages of two in each so that one of the stages is formed by two successively provided honeycomb structural bodies and one of the flow-aligning portions is provided in the space portion between the respective stages (As shown in FIG. 6(b), the four stages are formed.

In FIG. 6(b), however, in four stages 112a-112d, four honeycomb structural bodies are used.), the eight honeycomb structural bodies 12a-12h are separated into three groups, namely, three stages in which each of two stages is formed by three successively provided honeycomb structural bodies and the remaining one stage is formed by two successively provided honeycomb structural bodies and one of the flow-aligning portions is provided in the space portion between the respective stages, the eight honeycomb structural bodies 12a-12h are successively provided to be a single stage of the honeycomb structural bodies as a whole in which one flow-aligning portion is provided below the lowest one 12a of the honeycomb structural bodies (As shown in FIG. 6(c), single one stage is formed. In FIG. 6(c), however, in one stage 112a, sixteen honeycomb structural bodies are used).

The flow-aligning portions 14a-14g are fixed on an inner wall surface of the column container 11 directly or via appropriate support means.

In the column contact apparatus 10, the gas-liquid is supplied from a column lower portion 15, passing through the honeycomb structural body 12, and is discharged through a column top portion 16.

In a normal column contact apparatus without a flow-aligning portion, when the gas is brought into contact with the liquid in an upflow, back-mixing of the liquid becomes noticeable in the apparatus and the flow state of the liquid is close to a completely mixed flow.

Since the column contact apparatus 10 of the present invention includes the flow-aligning portions 14a-14g, however, when the liquid and the gas is brought into contact with each other in the upflow, the back-mixing of the liquid is restricted to be in a state rather close to a plug flow so as to reduce a distribution width of a residence time distribution of the liquid.

The column contact apparatus 10 of the present invention can be used as an apparatus in which the gas is advantageously brought into contact with the liquid. For example, the honeycomb structural body 12 is used as a structured catalyst according to the purpose so that it can be applied to hydrogenation reaction, dehydrogenation reaction, oxidation reaction, decomposition reaction, alkylation reaction, acylation reaction, etherification reaction, esterification reaction, and the like. Specifically, the column contact apparatus 10 can be used as a synthetic reaction apparatus for tertiary amine using alcohol and primary or secondary amine.

Preferred Aspect (I)

In the present invention, an example in which the narrow tubular channels include hydraulic diameter of the cross-sectional shape in the width direction equal to or more than 0.1 mm and less than 1 mm will be described below in detail.

<Column Contact Apparatus>

Figure 9:
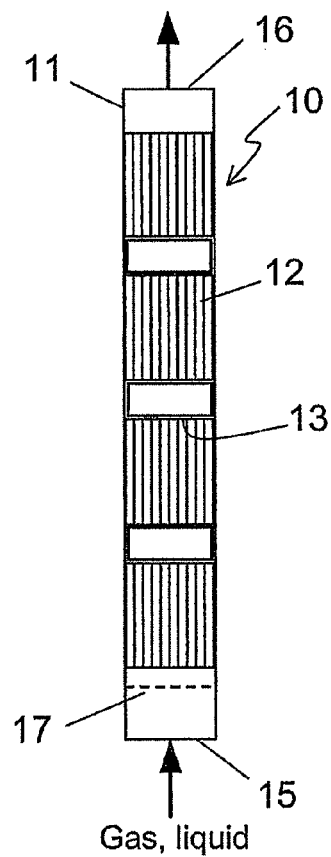
FIG. 9 is a schematic diagram showing a column contact apparatus according to aspect (I) of the present invention.

A column contact apparatus according to the present invention will be described with reference to FIG. 9. FIG. 9 is a vertical cross-sectional view showing a column contact apparatus 10 according to an example of the present invention. The column contact apparatus according to the present invention is not limited to the one shown in FIG. 9.

The column contact apparatus 10 according to the present invention is intended to contact the gas with the liquid in the upward flow in the column container 11.

The column container 11 used in the column contact apparatus 10 may be the one with a size and a shape in accordance with the purpose which may be supplied with the gas and the liquid from a lower portion thereof in which the gas and the liquid may be taken out of a top portion thereof and the gas and the liquid may be brought into contact with each other in the upward flow.

The honeycomb structural body 12 configured by a plurality of parallel narrow tubular channels is accommodated in the column container 11.

The honeycomb structural body 12 is intended to contact the gas with the liquid therein and accommodates a single stage or two or more stages. The fact that the two or more stages are accommodated is directed to the fact that the stages are accommodated in the state where the gap is formed between the stages. The flow-aligning portion such as the perforated plate may be provided in the gap between the stages.

The number of the accommodated honeycomb structural body 12 is selected in accordance with intended use. For example, when the apparatus 10 is used as a reaction apparatus, the honeycomb structural body 12 can accommodate preferably two or more stages, more preferably four or more stages, ten or more stages or twenty or more stages.

Further, the honeycomb structural body 12 with a single stage may be configured by the single one of the honeycomb structural body, or a combination of a plurality of the honeycomb structural bodies.

Although the shape and the configuration of the honeycomb structural body 12 used in the column contact apparatus 10 of the present invention is publicly known, the subject matter that the hydraulic diameter of the cross-sectional shapes of the narrow tubular channels in the width direction is less than 1 mm is novel and different from that of the publicly-known art. From the viewpoint where the pressure loss when the gas-liquid flows through the narrow tubular channels is prevented from becoming too large, the hydraulic diameter is preferably equal to or more than 0.1 mm and less than 1 mm, and more preferably equal to or more than 0.5 mm and less than 1 mm.

Figure 10:
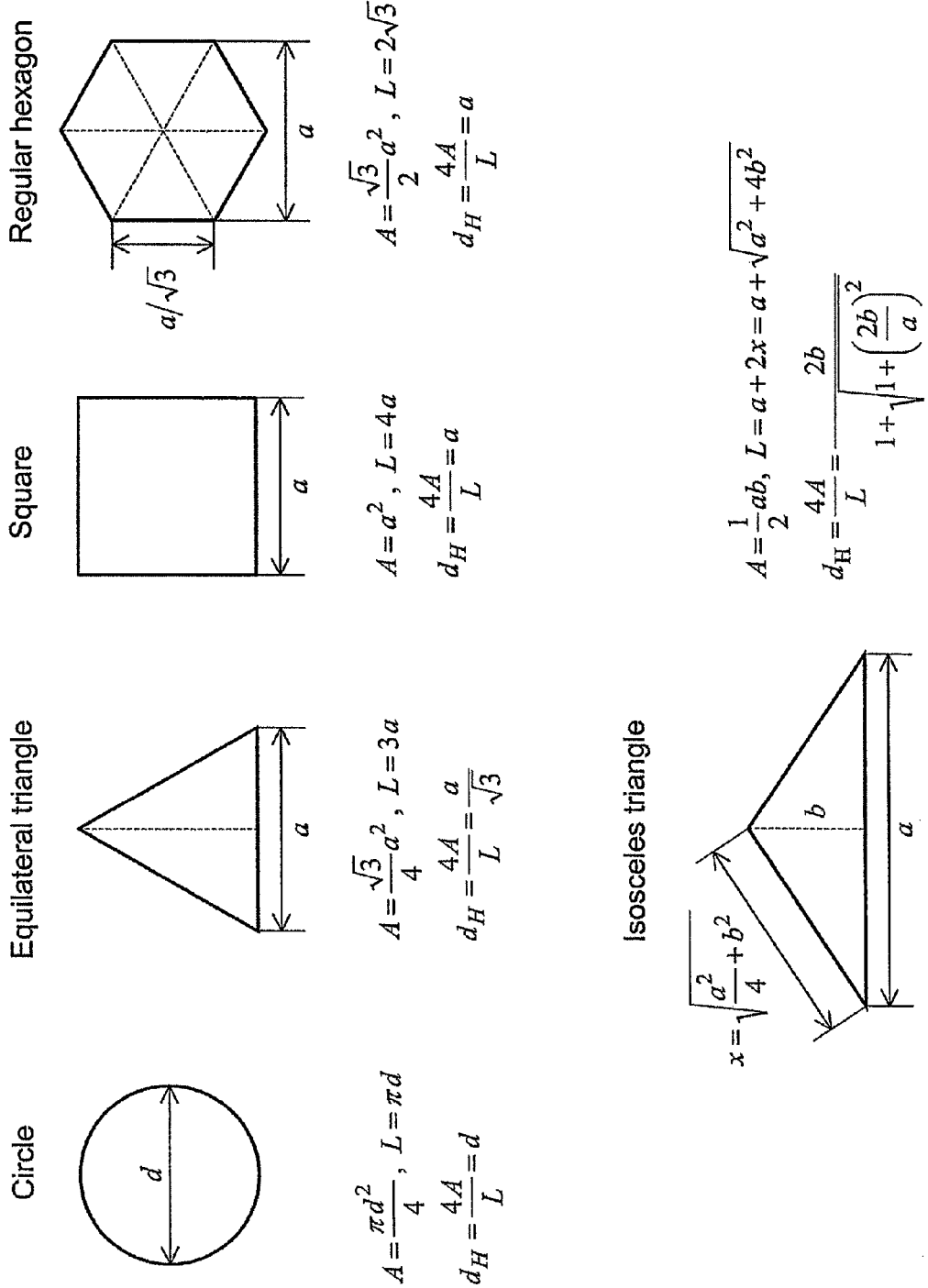
FIG. 10 is a schematic diagram showing a hydraulic diameter according to aspect (I) of the present invention.

Here, "hydraulic diameter" is publicly known and represented by the following equation: $d_H = 4A/L$ (A is directed to a cross-sectional area of the channel and L is directed to a wetted perimeter). In FIG. 10, equations for the "hydraulic diameters" in some cross-sectional shapes are illustrated.

As for the honeycomb structural body 12, the cross-sectional shapes of the narrow tubular channels may be any shape as long as the hydraulic diameter is within the above described range. As shown in FIG. 2, the shapes in which any number and any size of fins are attached to any positions may be used. Even if the shapes and the cross-sectional areas of the channels are the same with each other, if the fins are provided, the wetted perimeter L is increased resulting in the reduction of the hydraulic diameter. This suggests that the upflow of the two-phase of the gas-liquid tends to be stabilized if fins are attached. Generally, it is known that liquid film of the narrow tubular channels becomes thick when the fins are attached. From a point of view of increase of friction loss due to the liquid film, it is considered that the fins are advantageously effective in stabilizing the flow.

As for the honeycomb structural body 12, the honeycomb structural body 12 including the hydraulic diameter within the above described range in which the cross-sectional shapes of the narrow tubular channels in the width direction are selected from a circular shape, an oval shape, a polygonal shape, or a substantially polygonal shape is preferable from a point of view of easiness of processing. Here, the phrase "a substantially polygonal shape" is directed to a polygonal shape in which one or more corner parts are round or one or more edges include a curved line.

As for the honeycomb structural body 12, the honeycomb structural body 12 including the hydraulic diameter within the above described range in which the cross-sectional shapes of the narrow tubular channels in the width direction are polygonal shapes selected from hexagonal shapes, pentagonal shapes, rectangular shapes, triangular shapes or substantial polygonal shapes is preferable.

As for the honeycomb structural body 12, the honeycomb structural body 12 including the hydraulic diameter within the above described range in which the cross-sectional shapes of the narrow tubular channels in the width direction are triangular or substantially triangular is more preferable. The triangular shape may be an equilateral, an isosceles triangle or a right triangle. The phrase "a substantially triangular shape" is directed to a triangular shape in which one or more corner parts are round or one or more sides include curved lines.

As the honeycomb structural body 12, the one in which a flat plate film and a corrugated plate film are alternately stacked in the thickness direction and the cross-sectional shape of each of the narrow tubular channels is a substantially triangular shape can be used (hereinafter, referred to as "a composite honeycomb structural body of the flat plate film and the corrugated plate film").

As an external shape and a structure of the composite honeycomb structural body of the flat plate film and the corrugated plate film, the one shown in FIG. 3 may be used.

A composite honeycomb structural body 50 of the flat plate film and the corrugated plate film as shown in FIG. 3 is configured by alternately stacking a flat plate film 51 and a corrugated plate film 52 in which a plurality of parallel narrow tubular channels 53 with substantially triangular shapes (in each of the shapes, a corner is round and two sides include curved lines) are formed.

When the honeycomb structural body 12 is used as a structured catalyst, the honeycomb structural body 12 is used as a support body of catalyst. The catalyst is fixed on a surface of the honeycomb structural body 12. Here, the surface of the honeycomb structural body is directed to a surface in contact with gas or liquid, namely inner wall surfaces of the plurality of narrow tubular channels that the honeycomb structural body has and an outer surface of the honeycomb structural body.

Such a honeycomb structural body 12 with the surface on which the catalyst is fixed is publicly known. For example, the ones as disclosed in the Japanese National-Phase Laid-Open Patent Publication No. 2004-522567 (US2002/0076372) and JP-A 2003-176255 (US2003/0050510) can be used.

The above described composite honeycomb structural body of the flat plate film and the corrugated plate film on which the catalyst is fixed can be obtained by fixing the catalyst on the honeycomb structural body 50 as shown in FIG. 3. The honeycomb structural body 50 (adjusted such that the hydraulic diameter is less than 1 mm) on which the catalyst is fixed as shown in FIG. 3 can be obtained by applying a manufacturing method the same as those disclosed in FIG. 3 of JP-A 2009-262145 and FIG. 6 of JP-A 2008-110341 (these two patent publication gazettes do not disclose the hydraulic diameter at all).

When accommodating the honeycomb structural body 12 in the column container 11, a method for accommodating the honeycomb structural body 12 processed to include a size and a shape that can be accommodated in the column container 11 may be applied. According to the needs, a method for accommodating a holder (accommodating container for the honeycomb structural body) accommodating the honeycomb structural body 12 therein may be applied in which the holder includes a size and a shape that can be accommodated in the column container 11.

In FIG. 9, the honeycomb structural body 12 (or the holder that accommodates the same) is supported and fixed by a member 13 through which the gas-liquid can flow.

The member 13 is support means fixed on or attached to the column container 11 so that the member 13 can be attached to and removed from the column container 11. As the member, a ring, a grid, a disc-shaped net, a perforated plate, a cylindrically-shaped frame body, a frame body formed by a frame structure may be used.

In the column contact apparatus 10, the gas-liquid is supplied from the column lower portion 15, passing through the honeycomb structural body 12, and is discharged through the column top portion 16.

A perforated plate 17 may be provided under the honeycomb structural body 12 (in a side nearest to the column lower portion 15) in the lowest stage. When the perforated plate is provided under the honeycomb structural body 12 in the lowest stage, the perforated plate is preferable since dispersion of the gas above the perforated plate 17 is improved when the gas-liquid is flowed into the column contact apparatus 10.

Next, in the column contact apparatus 10, operations (mechanism) that can stabilize the flow state when the gas is brought into contact with the liquid in the upflow will be described.

Figure 11:
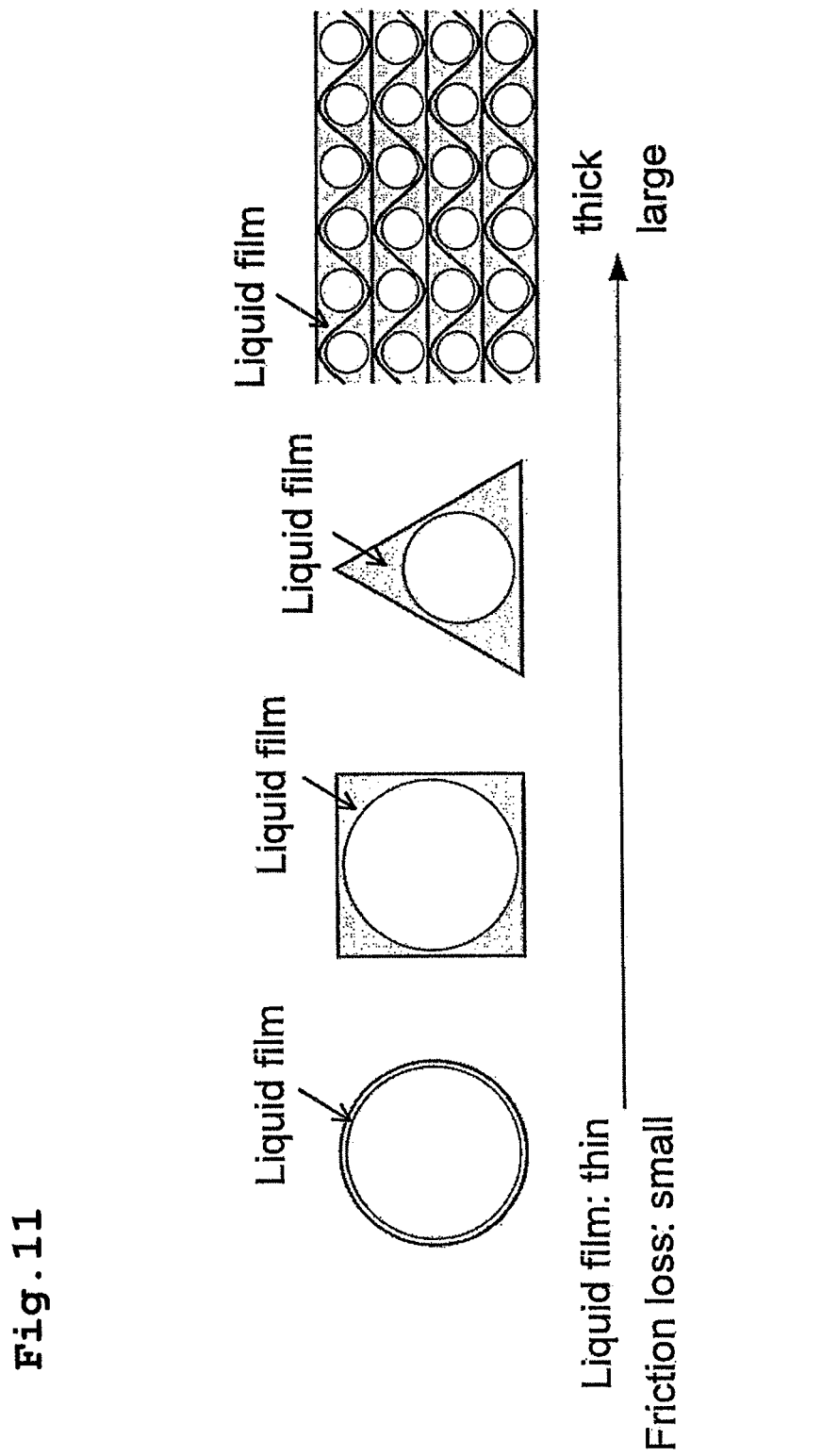
FIG. 11 is a view for illustrating differences of liquid film caused by differences of the shape of the narrow tubular channel of the honeycomb structural bodies when the column contact apparatus according to aspect (I) of the present invention is operated.

When the gas-liquid is flowed in the upflow through the narrow tubular channels (narrow tubular channels 53 in the honeycomb structural body 50 in FIG. 3) of the honeycomb structural body 12, liquid films are formed on the walls of the narrow tubular channels (refer to FIG. 11). As previously described, the liquid film in the upflow is thicker than the liquid film in the downflow so that volume fraction (liquid holdup) occupied by the liquid in the narrow tubular channels is increased and the friction loss effecting the stabilization of the flow becomes more noticeable.

In a case where the narrow tubular channels are large, when the gas bubbles enter some channels, the pressure loss of the channels is reduced due to density difference between the gas and the liquid so that more of the gas and the liquid are guided and converged into the channels. Accordingly, the flow becomes unstable. This is the mechanism of the instability that is publicly known regarding the upflow.

In contrast, when the narrow tubular channels are narrower, effects due to the friction loss cannot be ignored. The friction loss is inversely proportional to the square of the diameter of a channel in a laminar flow. As the flow of the gas-liquid is converged in certain channels, the friction loss of the channels is increased so that it becomes difficult for the gas-liquid to flow into the channels even compared to the effect of the reduction of the pressure loss due to the density difference of the gas-liquid. Accordingly, the flow is directed to other channels so that the flow is stabilized. Such an effect was revealed for the first time by reviewing contribution of liquid holdup and friction loss in consideration of presence of the liquid film. The friction loss is one of the pressure losses, namely, a pressure loss due to friction at wall surfaces of the channels when the fluid flows in the channels. Also, there are other pressure losses such as a pressure loss due to gravity (associated with the density of the fluid) and a pressure loss due to change in momentum.

As the upflow is stabilized in this manner, the flow is uniformly distributed in any of the narrow tubular channels without converging the flow into particular narrow tubular channels. Accordingly, the dispersion of the gas-liquid is automatically improved. According to the stabilization of the flow, directly from a point of view of a residence time distribution of the liquid, improvement of reaction activity or selectivity may be expected. Also, from a point of view of the distribution of the gas-liquid, an excellent effect on the reaction may be expected.

Further, the stabilization of the upflow in the column contact apparatus 10 according to the present invention is on the basis of the friction loss caused by the presence of the liquid film. Accordingly, from a point of view of the stabilization of the flow, the cross-sectional shapes of the narrow tubular channels forming thicker liquid films are desirable.

As shown in FIG. 11, it is known that the liquid films are thicker if the cross-sectional shapes of the narrow tubular channels are rectangular, and further triangular than they are circular. According to these facts, it is preferable that the cross-sectional shapes of the narrow tubes include acute angles. Moreover, a composite structure configured by the flat plate film and the corrugated plate film (refer to FIG. 3) is more preferable from a point of view of the stabilization of the flow by the liquid film.

The column contact apparatus 10 of the present invention can be used as an apparatus in which the gas is stably brought into contact with the liquid. For example, the honeycomb structural body 12 is used as a structured catalyst according to the purpose so that it can be applied to hydrogenation reaction, dehydrogenation reaction, oxidation reaction, decomposition reaction, alkylation reaction, acylation reaction, etherification reaction, esterification reaction, and the like.

The column contact apparatus 10 of the present invention can be used as a manufacturing apparatus for tertiary amine using alcohol and primary or secondary amine.

When the column contact apparatus 10 is used as the device for producing the tertiary amine, the honeycomb structural body on which the catalyst is fixed may be produced by applying methods disclosed in JP-A 2009-262145 and JP-A 2008-110341.

When the column contact apparatus 10 is used as the device for producing the tertiary amine, an active material configuring the catalyst to be fixed on the honeycomb structural body is not particularly limited and thus a publicly-known active material may be used. Generally, metals such as a copper system may be preferably used.

For example, Cu alone or a metal configured by two or more components including Cu and metallic elements such as Nb, Cr, Mo, Mn, Fe, Ru, Co, Rh, Ni, Pd, Pt, and Zn are illustrated. The metals that contain Cu and Ni are preferably used. Further, the active materials including a carrier for carrying these metals, such as silica, alumina, titania, zeolite, silica-alumina, zirconia, diatom earth, and the like may also be used.

The structured catalyst may include therein a binder for forming a thin catalyst film on which the active material is fixed. The binder does not operate as the active material alone.

As the binder, a polymer or inorganic compound having properties such as binding property in which the active materials are bound to each other or to a surface of the support body as well as heat resistance and chemical resistance that are free of adverse effects to a reacting system is used.

For example, cellulosic resins such as carboxymethylcellulose and hydroxyethyl cellulose, fluorine-based resins such as polytetrafluoroethylene and polyvinylidene fluoride, polymer compounds such as polyurethane resin, epoxy resin, polyester resin, phenol resin, melamine resin, silicone resin, polyvinyl alcohol, polyimide resin and polyimide amide resin, and inorganic compound sol such as silica, alumina are used.

As for alcohols as materials for producing the tertiary amine, linear or branched, saturated or unsaturated aliphatic alcohols containing 6 to 36 carbon atoms are preferable, e.g., hexyl alcohol, octyl alcohol, decyl alcohol, lauryl alcohol, myristyl alcohol, palmityl alcohol, stearyl alcohol, behenyl alcohol, oleyl alcohol, mixtures thereof, Ziegler alcohol obtained by Ziegler's process, oxo alcohol obtained by the oxo process, and Guerbet alcohol are used.

As the primary or the secondary amine for producing the tertiary amine, a primary or a secondary aliphatic amine is preferable, e.g., methylamine, dimethylamine, ethylamine, diethylamine, dodecylamine, and di-dodecyl amine.

The obtained tertiary amine is the one in which a hydrogen atom bonded to a nitrogen atom of the primary or the secondary amine is substituted for alkyl and/or alkenyl group derived from an alcohol. For example, the corresponding tertiary amine obtained from the dodecyl alcohol and dimethylamine is N-dodecyl-N, N-dimethyl amine, which is discriminated from the tertiary amines of N,N-didodecyl-N-methyl amine and N,N,N-tri-dodecylamine as side products obtained by reacting methylamine generated by disproportionating dimethylamine with ammonia.

Preferred Aspect (II)
<Column Contact Apparatus>

Figure 17:
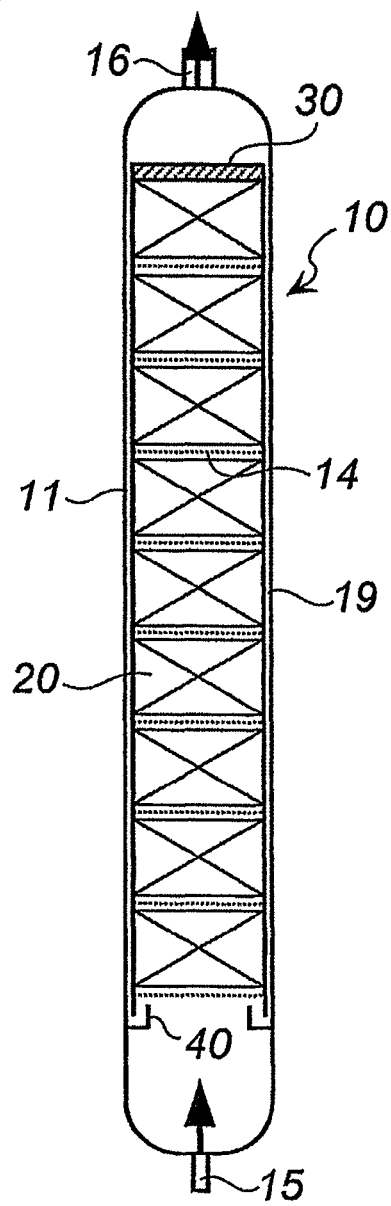
Figure 17:
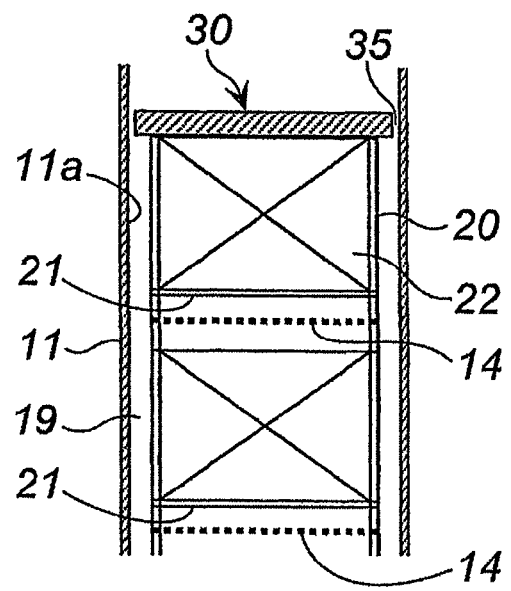
Figure 18:
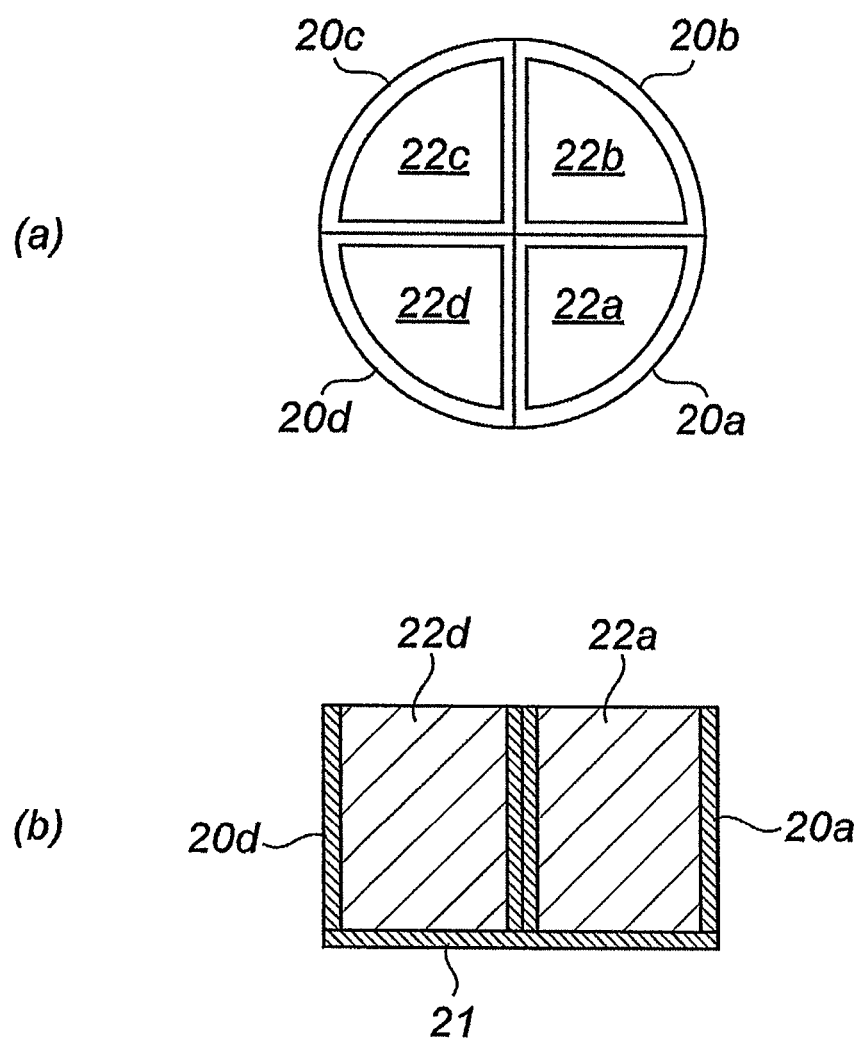
Figure 19:
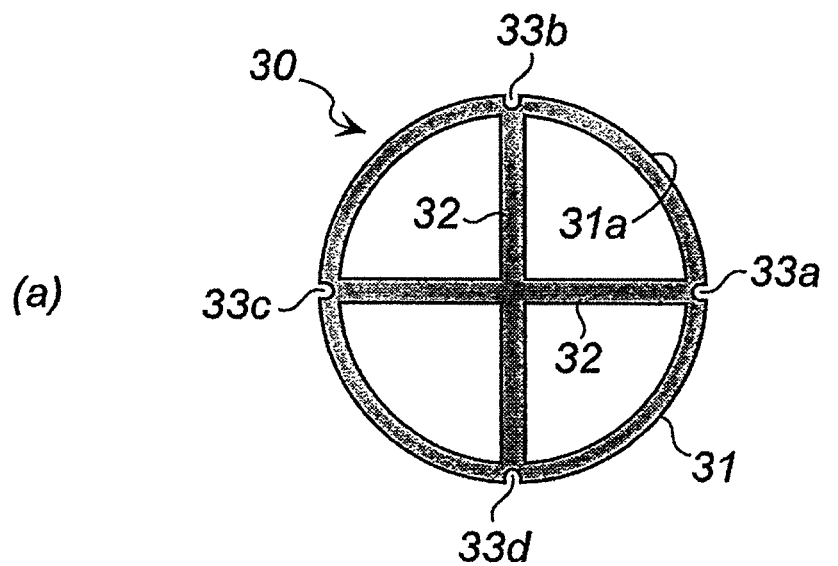
Figure 19:
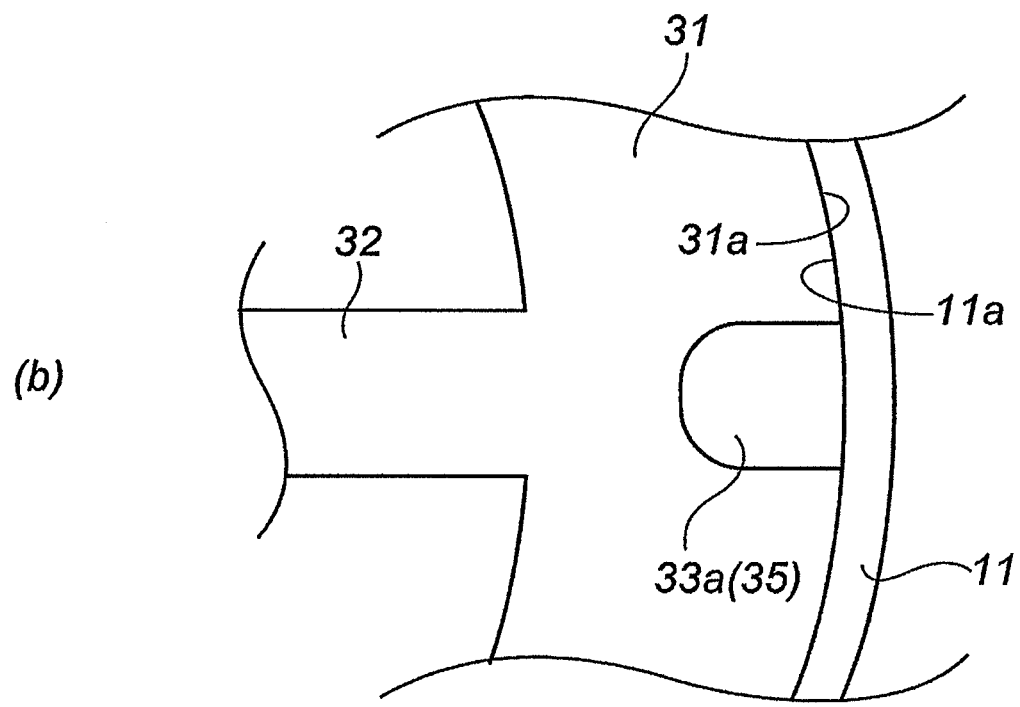

With reference to FIGS. 17-19, a column contact apparatus according to aspect (II) of the present invention will be described.

The column contact apparatus 10 according to the present invention is intended to contact the gas with the liquid in the upward flow in the column container 11.

The column container 11 used in the column contact apparatus 10 as shown in FIG. 17 may be the one with a size and a shape in accordance with need, which is supplied with the gas and the liquid from a lower portion thereof in which the gas and the liquid is taken out of a top portion thereof and the gas and the liquid is brought into contact with each other in the upward flow.

A container 20 in which the honeycomb structural body configured by a plurality of parallel narrow tubular channels (cells) is accommodated is provided in the column container 11.

In FIG. 17, the container 20 is provided with a plurality of stages. In the present invention, however, the container 20 may be provided with a single stage. As for the number of stages, from a point of view of replacing operations (for example, a case where a part of the containers, e.g., only the container 20 is replaced), it is more preferable that the honeycomb structural body is provided with a plurality of separated stages than providing a single stage. Also, the number of stages may be selected in accordance with intended use of the column contact apparatus 10. When the column contact apparatus 10 is used as a reaction apparatus, for example, the number of stages is preferably equal to or more than two, more preferably equal to or more than four, equal to or more than ten or equal to or more than twenty.

The container 20 is supported and fixed by a member (not shown) through which the gas-liquid can pass.

A member 21 (for example, a net, a grid, and a perforated plate) through which the gas-liquid can pass is fixed on a bottom of the container 20 accommodating the honeycomb structural body. A honeycomb structural body 22 is accommodated inside the container 20. The member 21 may be also provided at an upper portion of the container 20 so that the honeycomb structural body is ensured to be fixed in the container 20.

The honeycomb structural body 22 is intended to contact the gas with the liquid therein.

The container 20 of the single stage in which the honeycomb structural body 22 is accommodated may be a single container in which the honeycomb structural body is accommodated. From a point of view of easily exchanging the honeycomb structural body in the container 20, however, it is preferable that the container 20 may be a combination of about 2 to 8 containers.

For example, as shown in FIGS. 18(a) and 18(b), the container in which containers 20a-20d accommodating therein honeycomb structural bodies 22a-22d are formed together into a columnar shape as a whole may be used.

As shown in FIGS. 17(a) and 17(b), a continuous clearance 19 from a bottom to a top of the column container 11 in a height direction thereof is formed between the column container 11 and the container 20 configuring a plurality of stages.

The apparatus 10 of the present invention includes flow control means (pressure loss control means) 30 (refer to FIG. 17) that can control the pressure loss ($PL_1$) of the gas and the liquid passing through the clearance 19 at a desired height position of the clearance 19 to be equal to or more than the pressure loss ($PL_2$) of the gas and the liquid passing through the honeycomb structural body 22 accommodated in the container 20.

From a point of view of restricting a bypass flow to the clearance 19, as described above, the pressure loss ($PL_1$) and the pressure loss ($PL_2$) satisfy a relationship of $PL_1 \geq PL_2$ in which a ratio of $PL_1/PL_2$ is preferably equal to or more than twice, more preferably equal to or more than four times and even more preferably equal to or more than ten times. Further, to prevent reacting materials and generated products from remaining at the clearance 19, the ratio is preferably equal to or less than 10,000 times, more preferably equal to or less than 1,000 times, and even more preferably equal to or less than 100 times.

The flow control means is not particularly limited as long as it controls the pressure loss with respect to the flow of the gas-liquid. The flow control means in which a perforation hole is formed or a perforation hole can be formed is preferable, for example, the flow control means in which a plate member including a hole, a slit, and a cutout (recessed portion) is used or the flow control means in which a regular packing such as cylindrical particles fills a space between two meshes. From a view of ease of processing, the flow control means in which the plate member including the hole, the slit, and the cutout (recessed portion) is used is preferable.

As the flow control means, a flat annular plate 30 as shown in FIG. 19(a) may be used, for example.

The annular plate 30 as the flow control means includes an annular body portion 31 and two reinforcing members 32 bridged across an inner side of the annular body portion 31.

Four recessed portions 33a-33d that are recessed in a direction toward a central portion of the annular body portion 31 are formed on an outer peripheral edge 31a of the annular body portion 31.

An outer diameter of the annular plate 30 (annular body portion 31) corresponds to an inner diameter of the column container 11 and an inner diameter of the annular body portion 31 is smaller than an outer diameter of the accommodating container 20 for the honeycomb structural body.

As shown in FIGS. 17(a) and 17(b), the annular plate 30 is fixed to be provided such that the outer peripheral edge 31a of the annular body portion 31 is in contact with an inner wall surface 11a of the column container 11.

As shown in FIG. 19(b), a hole formed by the recessed portion 33a and the inner wall surface 11a corresponds to a perforation hole 35. The length of the perforation hole 35 corresponds to the thickness of the annular plate 30 (annular body portion 31).

When the annular plate 30 shown in FIG. 19 is used, a total sum of four perforation holes 35 are formed by the recessed portions 33a-33d and the inner wall surface 11a.

Most of the clearance 19 is closed by the annular body portion 31 at a position at which the annular plate 30 is provided. Accordingly, the portions above and below the annular plate 30 in the axial direction (height direction) are perforated with each other only through the perforation hole 35 and the pressure loss with respect to the gas-liquid passing through the perforation hole 35 is controlled to satisfy at least $PL_1 \geq PL_2$.

Although the annular plate 30 as shown in FIG. 19 is used as the flow control means, the annular plate 30 as shown in FIG. 19 not including the recessed portions 33a-33d but including one or two or more (e.g., four) holes in the annular body portion 31 as the perforation holes substituting for the recessed portions 33a-33d may be used.

Next, with reference to FIGS. 20 and 21, a column contact apparatus according to another example of the present invention will be described.

Figure 20:
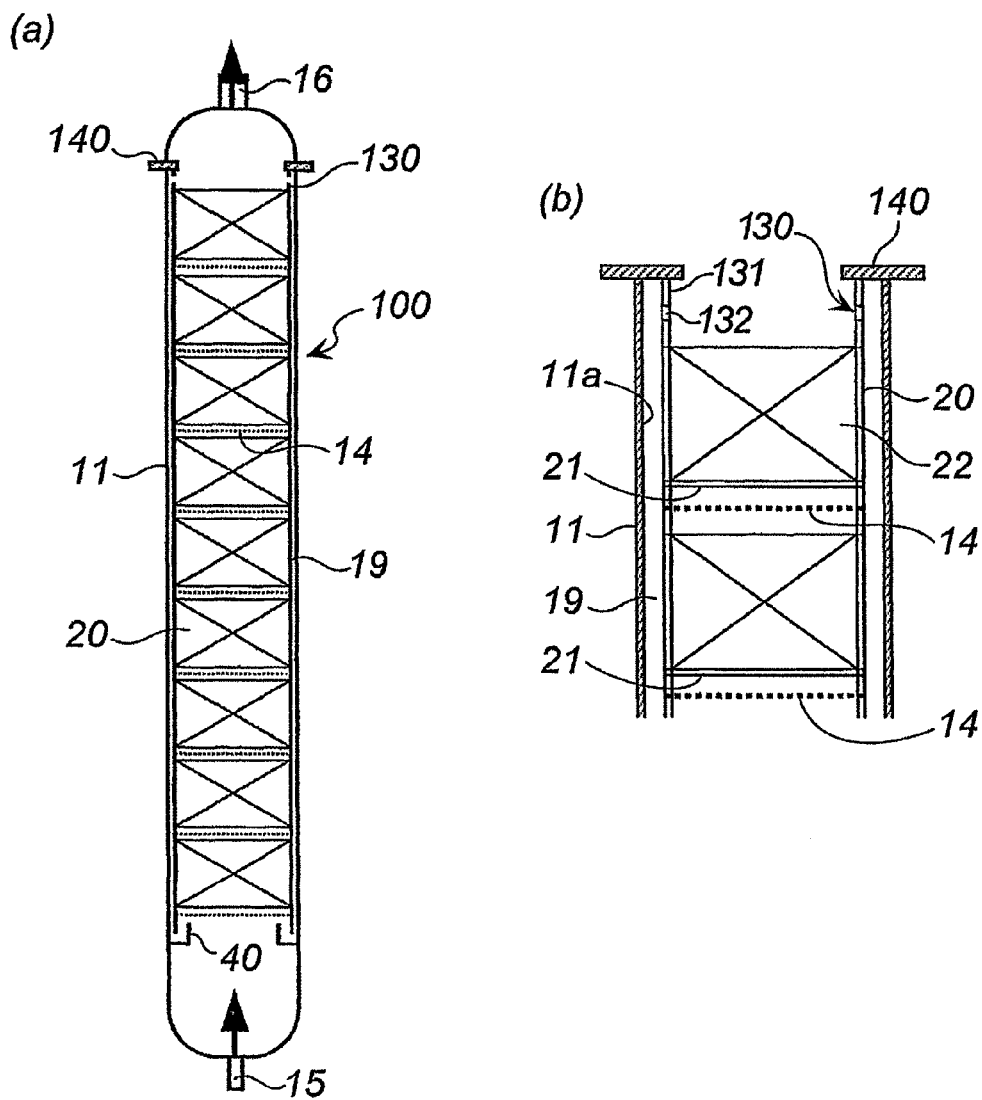

As for a column contact apparatus 100 as shown in FIG. 20, a basic structure thereof is the same as the column contact apparatus 10 as shown in FIG. 17. However, the column contact apparatus 100 is different from the column contact apparatus 10 in that a low tubular body 130 is used substituting for the annular plate 30 as shown in FIG. 19 as the flow control means. Elements to which the same numeral references as FIG. 17 are assigned are the same as FIG. 17.

As shown in FIG. 20, in the column contact apparatus 100, a flange 140 is formed between the container 20 at the top stage and an outlet 16 in a state in which an inner peripheral edge of the flange 140 is located inside the column container 11 and an outer peripheral edge protrudes outwardly of the column container 11 to form a flange 140.

The tubular body 130 (refer to FIG. 21) as the flow control means is provided between the container 20 at the top stage and the flange 140.

The tubular body 130 includes a tubular body portion 131 and one or two or more holes (perforation holes) 132 formed in the tubular body portion 131.

The tubular body 130 is provided in a state in which an upper peripheral portion 131a of the tubular body portion 131 is brought into contact with the flange 140 and a lower peripheral edge portion 131b of the tubular body portion 131 is brought into contact with the container 20 at the top stage. Accordingly, an upper end of the clearance 19 is closed.

Inner and outer diameters of the tubular member 130 correspond to the inner and outer diameters of the container 20.

Since the upper end of the clearance 19 is closed, the gas-liquid flowing through the clearance 19 passes through only the perforation hole 132 of the tubular body 130. The perforation hole 132 performs a function the same as that of the perforation hole 35 as shown in FIG. 19(b), the pressure loss regarding the gas-liquid passing therethrough is controlled to satisfy at least $PL_1 \geq PL_2$.

Figure 21:
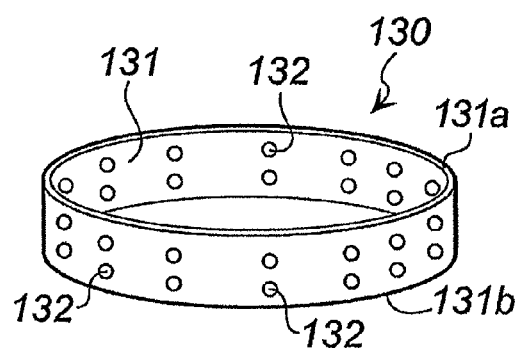
FIG. 21 is a perspective view showing a tubular body as flow control means provided in the apparatus in FIG. 20.

In FIG. 20(a), a tubular wall of the container 20 at the top stage may be elongated upward (in a direction toward the outlet 16) until it is in a state the same as that in which the tubular wall is brought into contact with the tubular body 130 and one or two or more holes (perforation holes) are formed in an elongated portion of the tubular wall in the same manner as in FIG. 21 to substitute the tubular body 130 in use.

Further, if an upper end of the tubular wall of the container 20 at the top stage is brought into contact with the flange 140, one or two or more holes (perforation holes) may be directly formed in the tubular wall of the container without elongating the tubular wall of the container 20 at the top stage upward. In this case, the container 20 at the top stage also serves as the flow control means so that the flow control means is placed at a position of the same height as the honeycomb structural body at the top stage.

The flow control means (for example, the annular plate 30, the tubular body 130, and the container 20 in which the holes are formed) may be provided at a desired height position in the column container 11, for example, at an inlet, outlet or an intermediate position of the clearance 19. As shown in FIG. 17(a), if the flow control means is provided on the upper side of the container 20 at the top stage, it can be easily attached and removed and thus it is preferable from a point of view of workability.

Further, in the apparatus 10 (FIG. 17) or the apparatus 100 (FIG. 20) according to the present invention, guiding means (a member to prevent gas bubble from flowing-in) 40 to guide gas bubbles to the accommodating container 20 for the honeycomb structural body may be provided between a supply port 15 for the gas and the liquid located at a bottom of the column container 11 and the clearance 19 formed by the accommodating container 20 for the honeycomb structural body at the bottom stage.

The guiding means 40 is means to guide the gas (gas bubbles) supplied via the supply port 15 to the honeycomb structural body at the bottom stage (namely, means to prevent the gas from flowing into the clearance 19). The shape or the structure of the guiding means 40 is not particularly limited as long as the guiding means 40 can guide the gas bubbles (namely, prevent the gas bubbles from flowing into the clearance). For example, the guiding means 40 with a structure as shown in FIG. 22 may be used.

The guiding means 40 is configured by an annular flat plate portion 41 and a tubular portion 42 protruding from an inner peripheral edge of the annular flat plate portion 41 to one side. The guiding means 40 may include a second tubular portion protruding from an outer peripheral edge of the annular flat plate portion 41 to a direction opposite to the tubular portion 42.

An outer diameter of the annular flat plate portion 41 corresponds to the inner diameter of the column container 11 and the outer peripheral edge of the annular flat plate portion 41 is fixed such that it is in contact with the inner wall surface 11a of the column container. The outer diameter of the annular flat plate portion 41 may be adjusted to be slightly more than the inner diameter of the column container 11 so that the annular flat plate portion 41 may be pressed against the inner wall surface 11a of the column container.

Figure 22:
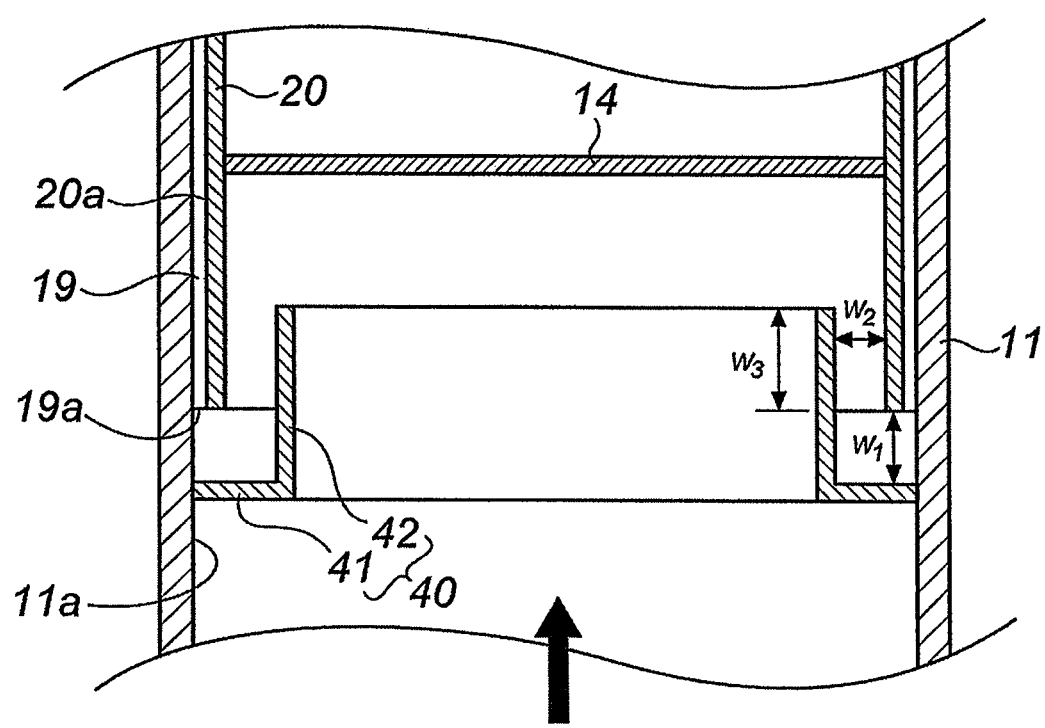
FIG. 22 is a partial enlarged view showing a portion of the column contact apparatus in FIG. 17 including guiding means provided in the column contact apparatus.

In an example as shown in FIG. 22, a circumferential surface of the accommodating container 20 at the bottom stage is elongated downward to be a tubular wall portion 20a. The guiding means 40 is provided such that it is combined with the tubular wall portion 20a.

In the guiding means 40, the annular flat plate portion 41 directly faces with a clearance inlet 19a at an interval $w_1$ and the tubular portion 42 and the tubular wall portion 20a directly face with each other at an interval $w_2$ in a state overlapping with each other in a range of the length $w_3$.

The intervals $w_1$ and $w_2$ and the length $w_3$ are not necessarily the same size. The length $w_3$ is necessary to be long enough to prevent the inflow of the gas bubbles, and the longer, the better. Generally, the density of the gas bubbles is remarkably smaller than the density of the liquid and it is less likely that the gas bubbles move downwardly in the liquid even in a turbulent flow. Accordingly, the length $w_3$ may be equal to or more than the size of the gas bubbles.

The length $W_3$ is preferably equal to or more than 5 mm, more preferably equal to or more than 10 mm, and even more preferably equal to or more than 20 mm. The upper limit of the length $w_3$ is determined by the size of the column container 11 and the size of the accommodating container 20 for the honeycomb structural body, and the number of stages of the accommodating container 20.

From a point of view of preventing the gas bubbles from flowing at intervals $w_1$ and $w_2$, it is preferable that the intervals $w_1$ and $w_2$ are as small as possible. It is not necessary that the interval $w_1$ is the same as the interval $w_2$. The intervals $w_1$ and $w_2$ are preferably equal to or less than 50 mm, more preferably equal to or less than 30 mm, and even more preferably equal to or less than 10 mm.

The gas bubbles contained in the gas-liquid supplied from an arrow direction in FIG. 22 are guided toward the honeycomb structural body 22 accommodated in the container 20 by operations of the guiding means 40 (the annular flat plate portion 41 and the tubular portion 42) and prevented from moving toward the clearance inlet 19a.

In the apparatus 10 (FIG. 17) or the apparatus 100 (FIG. 20) according to the present invention, the space portions may be provided between the plurality of stages of the accommodating containers 20 to provide flow-aligning plates 14 as the back-flow prevention means in the space portions. The flow-aligning plates 14 have a plurality of holes therein with each hole diameter of 0.5 mm to 8 mm.

In a case where the flow-aligning plates 14 having a plurality of holes are provided, when the gas bubbles pass through the holes from bottom to top, the gas bubbles function as plugs for the holes to restrict the back-flow of the liquid through the holes from the top to the bottom.

As for the flow-aligning plate, perforated plates such as punching metals of above described range of the hole diameter or thick honeycomb plates (thick honeycomb structural plates) may be used.

When using the perforated plates as the flow-aligning plates, since the aperture ratio with respect to the area of the perforated plate is associated with the hole diameters of the perforated plate, from a point of view of obtaining the back-mixing restriction effect, the aperture ratio is preferably equal to or less than 70%, more preferably equal to or less than 60%, even more preferably equal to or less than 50%, and even more preferably equal to or less than 45%. Further, from a point of view of suppressing the pressure loss when the gas-liquid passes through the perforated plate and a point of view of preventing a stagnant portion of the flow from being generated in the column contact apparatus 10 (FIG. 17) or the column contact apparatus 100 (FIG. 20), the aperture ratio with respect to the area of the perforated plate is preferably equal to or more than 1%, more preferably equal to or more than 10%, even more preferably equal to or more than 20% and even more preferably equal to or more than 31%.

In a case of using the thick honeycomb plates as the flow-aligning plates, some include nearly 100% aperture ratio. An important factor for restricting the back-mixing of the liquid is the hole diameters of the flow-aligning plates. Accordingly, the aperture ratio may be larger. The thick honeycomb plate includes a variety of manufacturing methods and products. Accordingly, the plate including a small aperture ratio can be used. In this case, from a point of view of suppressing the pressure loss when the gas-liquid passes through the thick honeycomb plate and a point of view of preventing the stagnant part of the flow from being generated in the column contact apparatus 10 (FIG. 17) or the column contact apparatus 100 (FIG. 20), the aperture ratio of the thick honeycomb plate is preferably equal to or more than 1%, more preferably equal to or more than 10%, even more preferably equal to or more than 20% and even more preferably equal to or more than 31%.

The flow-aligning plates are provided such that they do not contact with any of the honeycomb structural bodies adjacent to the flow-aligning plates thereon or thereunder. When the flow-aligning plates contact the honeycomb structural bodies adjacent to the flow-aligning plates thereon or thereunder, it is not preferable since the back-mixing restriction effect by the flow-aligning plate is reduced. The phrase "not in contact with" here does not exclude an example in which the flow-aligning plates are supported and fixed by the honeycomb structural bodies to be held in the space portions.

The shapes or the structures of the honeycomb structural bodies 22 used in the column contact apparatus 10 (FIG. 17) or the column contact apparatus 100 (FIG. 20) are not particularly limited and thus publicly-known ones may be used. For example, as the honeycomb structural body 22, the one in which a flat plate film and a corrugated plate film are alternately stacked in the thickness direction and the cross-sectional shape of each of the narrow tubular channels in the width direction is a substantially triangular shape can be used. The phrase "a substantially triangular shape" is directed to a triangular shape in which one or more corner parts are round or one or more sides include curved lines. As for the external shape and the structure of such a honeycomb structural body, the one shown in FIG. 3 may be used.

The honeycomb structural body 50 as shown in FIG. 3 is configured by alternately stacking the flat plate film 51 and the corrugated plate film 52 in which a plurality of parallel narrow tubular channels 53 with substantially triangular shapes (in each of the shapes, a corner is round and two sides include curved lines) are formed.

When the honeycomb structural body 22 is used as a structured catalyst, the honeycomb structural body 50 as shown in FIG. 3 is used as a support body of catalyst. The catalyst is fixed on a surface of the honeycomb structural body 50. Here, the surface of the honeycomb structural body is directed to a surface in contact with the gas or the liquid, namely inner wall surfaces of the plurality of narrow tubular channels that the honeycomb structural body has and an outer surface of the honeycomb structural body.

Next, in the column contact apparatus 10 (FIG. 17) according to the present invention, an operation (mechanism) for increasing contact efficiency of the gas-liquid in the honeycomb structural body 22 upon contacting the gas with the liquid in the upflow by the annular plate 30 as the flow control means provided in the clearance 19 will now be described.

In the column contact apparatus 10 according to the present invention, the pressure loss ($PL_1$) of the gas and the liquid passing through the clearance 19 is controlled to be equal to or more than the pressure loss ($PL_2$) of the gas and the liquid passing through the honeycomb structural body 22 ($PL_1 \geq PL_2$) by the annular plate 30 as the flow control means provided in the clearance 19. Accordingly, the gas and the liquid flow to the honeycomb structural body 22 more easily than to the clearance 19 so that a bypass flow to the clearance 19 is restricted and the flow of the gas-liquid is converged in the honeycomb structural body 22. Accordingly, the contact efficiency of the gas-liquid in the honeycomb structural body 22 is increased. A certain amount of the gas and the liquid, however, flows through the clearance 19.

Also, in the column contact apparatus 100 (FIG. 20) according to the present invention, the same advantage can be obtained by the tubular body 130 as the flow control means.

The control of the pressure loss can be confirmed by calculations as well as experiments.

When the gas-liquid flows through the honeycomb structural body 22, the pressure loss depends greatly on the friction loss in the narrow tubular channels. It can be calculated according to a formula that is publicly known as Fanning's equation (Chemical Engineering Handbook, Sixth Edition, edited by the Society of Chemical Engineers, Japan, (Maruzen, 1999) p. 286 [in Japanese]). Generally, the clearance 19 includes a larger cross-sectional area than the narrow tubular channels of the honeycomb structural body, so that the friction loss of the clearance can be ignored. Accordingly, the dominant pressure loss when the gas-liquid flows through the clearance 19 is a local loss when the gas-liquid passes through the flow control means 30. For example, when the flow control means includes the perforation holes (specifically, the annular plate 30 including the perforation holes 35 or the tubular body 130 including perforation holes 132, for example), the pressure loss may be calculated by using formulas known to calculate the pressure loss when the gas-liquid passes through the holes or orifices (K. S. Knaebel, Chemical Engineering 88 (1981) 116).

The friction loss is one of the pressure losses, namely, a pressure loss due to friction at wall surfaces of the channels when the fluid flows in the channels. The local loss is also referred to as a form loss and is a pressure loss caused by changes in the shapes of the channels. Another pressure loss is caused by gravity (associated with the density of the fluid), which is referred to as a static head loss.

These formulas target a single phase flow in which only the gas or only the liquid flows. The pressure loss when only the gas flows in the apparatus or the pressure loss when only the liquid flows in the apparatus can be calculated individually and evaluated respectively to design the flow control means.

In any of the cases when only the gas flows and when only the liquid flows, if the pressure loss in the clearance is more than the pressure loss in the honeycomb structural body, the same magnitude relationship of the pressure losses can be seen when the gas and the liquid flow simultaneously.

When calculating the pressure loss of the gas-liquid two-phase flow, a method to estimate the pressure loss of the gas-liquid two-phase flow on the basis of the pressure losses when each phase of the gas and the liquid flows as a single phase is proposed, which is known as the method of Lockhart-Martinelli. An approximate correlation formula of Chisholm, for example, may be used for calculating the friction loss. A calculation method known as a Murdock formula, for example, may be used for the local loss of the orifice (JSME Data Book, Hydraulic Losses in Pipes and Ducts (The Japan Society of Mechanical Engineers, 1979) p. 189 [in Japanese]).

Further, in the column contact apparatus 10 (FIG. 17) or the column contact apparatus 100 (FIG. 20) according to the present invention, an operation (mechanism) for increasing contact efficiency between the gas and the liquid in the honeycomb structural body 22 when the gas is brought into contact with the liquid in the upflow in a case in which the guiding means 40 is provided as means to guide the supplied gas (gas bubbles) to the honeycomb structural body at the bottom stage (namely, means to prevent the gas bubbles from flowing into the clearance 19) will be described.

When the gas is brought into contact with the liquid in the upflow, in a case in which the liquid is in a continuous phase, while the gas is in a dispersed phase present as the gas bubbles, the guiding means 40 is provided on the inlet 19a side of the clearance 19 in addition to the pressure loss by the annular plate 30 or the tubular body 130 as the flow control means so that a bypass flow to the clearance 19 can be further advantageously controlled.

According to the operations of the guiding means 40, the gas bubbles are guided to the honeycomb structural body 22 so that the static head loss at the honeycomb structural body 22 is reduced. Accordingly, the liquid is also guided to the honeycomb structural body 22. Since the clearance 19 is not sealed, the clearance 19 is filled with the liquid. If the gas bubbles do not flow into the clearance 19, the liquid flow through the clearance 19 becomes downward. That is, internal circulating flow of the liquid is generated in the apparatus 10 (FIG. 17) or the apparatus 100 (FIG. 20), while almost all of the gas flows to the honeycomb structural body so that the contact efficiency between the gas and the liquid in the honeycomb structural body 22 can be improved.

The column contact apparatus 10 (FIG. 17) or the column contact apparatus 100 (FIG. 20) according to the present invention can be used as an apparatus in which the gas is stably brought into contact with the liquid. For example, the honeycomb structural body 12 is used as a structured catalyst according to need so that it can be applied to hydrogenation reaction, dehydrogenation reaction, oxidation reaction, decomposition reaction, alkylation reaction, acylation reaction, etherification reaction, esterification reaction, and the like. Specifically, the column contact apparatus can be used as a synthetic reaction apparatus for tertiary amine using alcohol and primary or secondary amine.

<Method for Operating the Column Contact Apparatus>

Next, a preferred method (method for contacting the gas with the liquid or method for reacting the gas-liquid) for operating the column contact apparatus according to the present invention will be described on the basis of the column contact apparatus 10 as shown in FIG. 1.

When operating the column contact apparatus 10 according to the present invention, the gas-liquid is supplied from the column lower portion 15, passing through the honeycomb structural body 12, and is discharged through the column top portion 16 to form the upflow.

It is generally considered that turbulence of the flow is noticeable in the upflow of the gas-liquid two-phase when a superficial gas velocity is large. In the present invention, however, the gas can be brought into contact with the liquid appropriately even if the superficial gas velocity is equal to or more than 0.05 m/s. The superficial gas velocity may be equal to or more than 0.1 m/s, and also may be equal to or more than 0.3 m/s. The upper limit of the superficial gas velocity is determined by an original pressure (line pressure) of the gas, the superficial gas velocity may be preferably equal to or less than 10 m/s, more preferably equal to or less than 1 m/s, and even more preferably equal to or less than 0.5 m/s.

The column contact apparatus is operated to contact the gas with the liquid so that the superficial liquid velocity is preferably 0.0001 m/s to 0.5 m/s, more preferably 0.0005 m/s to 0.1 m/s, and even more preferably 0.001 m/s to 0.05 m/s. Here, the superficial velocity is obtained by dividing the flow rate of the liquid or the gas by the cross-sectional area of the column.

Further, when operating the column contact apparatus 10 according to the present invention, from a point of view of improving the contact efficiency between the gas and the liquid, the gas is brought into contact with the liquid so that gas holdup may be preferably 0.05 to 0.8, more preferably 0.1 to 0.7, and even more preferably 0.2 to 0.6. Here, the gas holdup is directed to a volume fraction occupied by the gas in a gas-liquid two-phase system. The gas holdup is also referred to as void fraction. Occasionally, the gas holdup is defined as a local quantity for a small space taken out of an arbitrary region. Here, the gas holdup is defined as the volume fraction of the gas in the whole apparatus.

Further, when operating the column contact apparatus 10 according to the present invention, from a point of view of enhancing an effect of restricting the back flow by the flow-aligning portions 14a-14g and a point of view of improving the dispersion of the gas bubbles in the column contact apparatus 10, an average diameter of the gas bubbles in the gas-liquid two-phase flow may be preferably 0.1 to 30 mm, and more preferably 0.5 to 20 mm. An adjustment of the diameter of the gas bubbles can be performed by adjusting the surface tension of the liquid, for example.

In the method for operating the column contact apparatus according to the present invention, the column contact apparatus according to the present invention is used within an above mentioned range of the superficial velocity so that a distribution width of the residence time distribution of the liquid may be narrowed to improve the contact efficiency between the gas and the liquid. In particular, the method is characterized in that the superficial gas velocity can be larger. Further, the gas holdup and the diameter of the gas bubbles in the gas-liquid two-phase flow are adjusted so as to further improve the contact efficiency between the gas and the liquid.

In a case in which the column contact apparatus according to the present invention is not used, even if the operation method according to the present invention is applied, the distribution width of the residence time distribution of the liquid cannot be narrowed.

In the present invention, an example in which the narrow tubular channels include hydraulic diameter of the cross-sectional shape in the width direction equal to or more than 0.1 mm and less than 1 mm will be described below in detail.

<A Method for Operating the Column Contact Apparatus According to Aspect (I)>

Next, a preferred method (method for contacting the gas with the liquid or method for reacting the gas-liquid) for operating the column contact apparatus according to the present invention will be described on the basis of the column contact apparatus 10 as shown in FIG. 9.

When operating the column contact apparatus 10 according to the present invention, the gas-liquid is supplied from the column lower portion 15, passing through the honeycomb structural body 12, and is discharged through the column top portion 16 to form the upflow.

It is generally considered that the turbulence of the flow is noticeable in the upflow of the gas-liquid two-phase when a superficial gas velocity is large. In the present invention, however, the gas can be brought into contact with the liquid appropriately even if the superficial gas velocity is equal to or more than 0.05 m/s. The superficial gas velocity may be equal to or more than 0.1 m/s, and also may be equal to or more than 0.3 m/s. The upper limit of the superficial gas velocity is determined by an original pressure (line pressure) of the gas, the superficial gas velocity may be preferably equal to or less than 10 m/s, more preferably equal to or less than 1 m/s, and even more preferably equal to or less than 0.5 m/s.

The column contact apparatus is operated to contact the gas with the liquid so that the superficial liquid velocity is preferably 0.0001 m/s to 0.5 m/s, more preferably 0.0005 m/s to 0.1 m/s, and even more preferably 0.001 m/s to 0.05 m/s.

Further, when operating the column contact apparatus 10 according to the present invention, from a point of view of improving the contact efficiency between the gas and the liquid, the gas is brought into contact with the liquid so that the gas holdup may be preferably 0.05 to 0.8, more preferably 0.1 to 0.7, and even more preferably 0.2 to 0.6.

Further, when operating the column contact apparatus 10 according to the present invention, from a point of view of improving the dispersion of the gas bubbles in the column contact apparatus 10, an average diameter of the gas bubbles in the gas-liquid two-phase flow may be preferably 0.1 to 30 mm, and more preferably 0.5 to 20 mm. The adjustment of the diameter of the gas bubbles can be performed by adjusting the surface tension of the liquid, for example.

In the method for operating the column contact apparatus according to the present invention, within the above mentioned range of the superficial velocity, it is advantageous that the flow state of the gas-liquid two-phase flow is stabilized by using the column contact apparatus according to the present invention and improvement is obtained in the contact efficiency between the gas and the liquid. In particular, the method is characterized in that the superficial gas velocity can be larger. Further, the gas holdup and the diameter of the gas bubbles in the gas-liquid two-phase flow are adjusted so as to further improve the contact efficiency between the gas and the liquid.

In a case in which the column contact apparatus according to the present invention is not used, even if the operation method according to the present invention is applied, the effect that the flow state of the gas-liquid two-phase flow is stabilized cannot be obtained.

<A method for Operating the Column Contact Apparatus According to Aspect (II)>

Next, a preferred method (method for contacting the gas with the liquid or method for reacting the gas-liquid) for operating the column contact apparatus according to the present invention will be described on the basis of the column contact apparatus 10 (FIG. 17) as shown in FIG. 17 or the column contact apparatus 100 (FIG. 20).

When operating the column contact apparatus 10 (FIG. 17) or the column contact apparatus 100 (FIG. 20) according to the present invention, the gas-liquid is supplied from an inlet 15, passing through the honeycomb structural body 22, and is discharged through an outlet 16 to form the upflow.

It is generally considered that the bypass flow to the clearance 19 is noticeable in the upflow of the gas-liquid two-phase when the superficial gas velocity is high. In the present invention, however, the gas can be brought into contact with the liquid appropriately in the honeycomb structural body, even if the superficial gas velocity is equal to or more than 0.05 m/s, since the bypass flow to the clearance 19 can be restricted by function of the annular plate 30 or the tubular body 130 as the flow control means. The superficial gas velocity may be equal to or more than 0.1 m/s, and also may be equal to or more than 0.3 m/s. The upper limit of the superficial gas velocity is determined by the original pressure (line pressure) of the gas, the superficial gas velocity may be preferably equal to or less than 10 m/s, more preferably equal to or less than 1 m/s, and even more preferably equal to or less than 0.5 m/s.

The column contact apparatus is operated to contact the gas with the liquid so that the superficial liquid velocity is preferably 0.0001 m/s to 0.5 m/s, more preferably 0.0005 m/s to 0.1 m/s, and even more preferably 0.001 m/s to 0.05 m/s.

In the method for operating the column contact apparatus according to the present invention, the column contact apparatus according to the present invention is used within the above mentioned range of the superficial velocity so that the advantage of restricting the bypass flow to the clearance 19 can be improved. In particular, the method is characterized in that the superficial gas velocity can be larger. In a case in which the column contact apparatus according to the present invention is not used, even if the operation method according to the present invention is applied, the effect of restricting the bypass flow cannot be obtained.

The present invention includes the following embodiments:

Item 1. A column contact apparatus for contacting gas with liquid in an upflow in a column container, including:
two or more stages of honeycomb structural bodies, vertically provided in the column container, each of the honeycomb structural bodies having a plurality of parallel narrow tubular channels;
a space portion having a length equal to or longer than 5 mm and equal to or less than twice as large as an inner diameter of the column container, formed between the respective stages of the two or more stages of the honeycomb structural bodies; and
a flow-aligning portion provided as back-flow prevention means in each space portion between the respective stages such that the flow-aligning portion is not brought into contact with the honeycomb structural bodies, the flow-aligning portion having a plurality of holes with hole diameters of 0.5 mm to 8 mm.

Item 2. The column contact apparatus according to item 1, wherein four or more stages of the honeycomb structural bodies are accommodated in the column container in the vertical direction.

Item 3. The column contact apparatus according to item 1 or 2, wherein the length of the space portion is equal to or more than 10 mm and equal to or less than an inner diameter of the column container.

Item 4. The column contact apparatus according to any one of items 1-3, wherein the length of the space portion is equal to or more than 20 mm and equal to or less than ½ of an inner diameter of the column container.

Item 5. The column contact apparatus according to any one of items 1-4, wherein the inner diameter of the column container is equal to or more than 50 mm.

Item 6. The column contact apparatus according to any one of items 1-5, wherein the flow-aligning portion, in the space portion, is located at an intermediate position of the honeycomb structural bodies adjacent to the flow-aligning portion thereon and thereunder.

Item 7. The column contact apparatus according to any one of items 1-6, wherein the flow-aligning portion includes a plurality of holes with hole diameters of 0.8 to 6 mm, and preferably 1 to 5 mm.

Item 8. The column contact apparatus according to any one of items 1-7, wherein the flow-aligning portion is configured by a perforated plate with an aperture ratio of 1-70%.

Item 9. The column contact apparatus according to any one of items 1-8, wherein the flow-aligning portion is configured by a perforated plate with an aperture ratio of 10-60%, preferably 20-50%, and more preferably 31-45%.

Item 10. The column contact apparatus according to item 8 or 9, wherein the flow-aligning portion is configured by a perforated plate with a thickness of 0.5-20 mm, preferably 0.5-10 mm, and more preferably 1-5 mm.

Item 11. The column contact apparatus according to anyone of items 1-7, wherein the flow-aligning portion is formed by a honeycomb structural plate with a thickness equal to or more than 5 mm and equal to or less than 25% of a height of the honeycomb structural body.

Item 12. The column contact apparatus according to anyone of items 1-7 and 11, wherein the flow-aligning portion is formed by a honeycomb structural plate with a thickness equal to or more than 10 mm and equal to or less than 25% of a height of the honeycomb structural body, and preferably equal to or more than 20 mm and equal to or less than 25% of the height of the honeycomb structural body.

Item 13. The column contact apparatus according to anyone of items 1-12, wherein, in the column contact apparatus, the flow-aligning portion as back-flow prevention means is provided below the honeycomb structural body at the bottom stage in a state in which the flow-aligning portion is not brought into contact with the honeycomb structural body.

Item 14. The column contact apparatus according to any one of items 1-13, wherein a hydraulic diameter of a cross-sectional shape of the narrow tubular channel in the width direction is equal to or more than 0.1 mm and less than 1 mm.

Item 15. The column contact apparatus according to any one of items 1-14, wherein a hydraulic diameter of a cross-sectional shape of the narrow tubular channel in the width direction is equal to or more than 0.5 mm and less than 1 mm.

Item 16. The column contact apparatus according to any one of items 1-15, wherein the cross-sectional shape of the narrow tubular channels in the width direction is selected from circular shapes, oval shapes, polygonal shapes and substantially polygonal shapes.

Item 17. The column contact apparatus according to any one of items 1-15, wherein the cross-sectional shape of the narrow tubular channels in the width direction is polygonal or substantially polygonal, selected from hexagonal shapes, pentagonal shapes, square shapes and triangular shapes.

Item 18. The column contact apparatus according to any one of items 1-15, wherein the cross-sectional shape of the narrow tubular channels in the width direction is a triangular shape or a substantially triangular shape.

Item 19. The column contact apparatus according to any one of items 1-18, wherein the honeycomb structural body is configured by alternately stacking a flat plate film and a corrugated plate film in the thickness direction, and the cross-sectional shape of the narrow tubular channels in the width direction is a substantially triangular shape.

Item 20. The column contact apparatus according to any one of items 1-19 for contacting gas and liquid supplied from the bottom of the apparatus with each other in the upflow in the column container and then taking out the gas and the liquid via a top of the apparatus, further containing:
a container that accommodates the honeycomb structural body therein in the column container;
a clearance being continuous from a bottom to a top of the column container in the height direction between the column container and the accommodating container for the honeycomb structural body; and
flow control means provided at a desired height position of the clearance to control such that a pressure loss ($PL_1$) of the gas and the liquid passing through the clearance is equal to or more than a pressure loss ($PL_2$) of the gas and the liquid passing through the honeycomb structural body.

Item 21. The column contact apparatus according to item 20, wherein the flow control means satisfies a relationship $PL_1/PL_2 \geq 2$.

Item 22. The column contact apparatus according to item 21, wherein the flow control means satisfies a relationship $PL_1/PL_2 \geq 4$.

Item 23. The column contact apparatus according to any one of items 20-22, wherein the flow control means satisfies a relationship $PL_1/PL_2 \leq 10000$, preferably $PL_1/PL_2 \leq 1000$, and more preferably $PL_1/PL_2 \leq 100$.

Item 24. The column contact apparatus according to any one of items 20-23, further containing guiding means between a supply port for the gas and the liquid and a clearance formed by the column container and a container for accommodating a honeycomb structural body of the bottom stage therein, the supply port being provided at the bottom of the column container, wherein the guiding means guides gas bubbles supplied from the supply port to the honeycomb structural body at the bottom stage.

Item 25. The column contact apparatus according to item 24, wherein the guiding means is configured with an annular flat plate portion and a tubular portion that protrudes from an inner peripheral edge of the annular flat plate portion to one side; the guiding means includes a tubular wall portion configured by a peripheral wall of the accommodating container extended downward, a gap $w_1$ between the annular flat plate portion and an inlet of the clearance and a gap $w_2$ between a tubular portion and a tubular wall portion are respectively equal to or less than 50 mm, preferably equal to or less than 30 mm, and more preferably equal to or less than 10 mm; and a length $w_3$ of portions of the tubular portion and the tubular wall portion overlapped with each other in the gap $w_2$ is equal to or more than 5 mm, preferably equal to or more than 10 mm, and more preferably equal to or more than 20 mm.

Item 26. The column container apparatus according to any one of items 20-25, wherein the flow control means includes a perforation hole or can have a perforation hole formed therein, and one or two or more perforation holes are provided.

Item 27. The column container apparatus according to any one of items 20-26, wherein
the flow control means is formed by an annular plate,
the flow control means includes a perforation hole or can have a perforation hole formed therein, and
one or two or more perforation holes are provided.

Item 28. The column contact apparatus according to any one of items 20-26, wherein
an upper side of the clearance is closed, the flow control means is formed by a tubular member,
the tubular member includes a perforation hole, and
one or two or more perforation holes are provided.

Item 29. The column contact apparatus according to any one of items 20-26, wherein
an upper side of the clearance is closed,
the flow control means is an accommodating container for accommodating the honeycomb structural body, in which a perforation hole is formed, and
one or two or more perforation holes are provided.

Item 30. The column contact apparatus according to anyone of items 20-29, wherein the flow control means is provided on an upper side of the packed honeycomb structural body at the top stage on an inside of the column container or at a position of the same height as the honeycomb structural body at the top stage.

Item 31. The column contact apparatus according to anyone of items 20-30, wherein the container that accommodates the honeycomb structural body at one of the stages is configured by a combination of a plurality of the containers.

Item 32. The column contact apparatus according to anyone of items 1-31, wherein the honeycomb structural body is provided with a surface on which a catalyst is immobilized.

Item 33. A method for operating the column contact apparatus according to any one of items 1-32, containing a step of contacting the gas with the liquid at a superficial liquid velocity of 0.0001 to 0.5 m/s and a superficial gas velocity of 0.05 to 10 m/s.

Item 34. The method for operating the column contact apparatus according to item 33, containing a step of contacting the gas with the liquid at the superficial liquid velocity of 0.0005 to 0.1 m/s, preferably 0.001 to 0.05 m/s and the superficial gas velocity of 0.05 to 1 m/s, preferably 0.1 to 0.5 m/s.

Item 35. The method for operating the column contact apparatus according to item 33 or 34, wherein the gas and the liquid are brought into contact with each other so that a gas holdup is within a range of 0.05-0.8.

Item 36. The method for operating the column contact apparatus according to any one of items 33-35, wherein the gas and the liquid are brought into contact with each other so that a gas holdup is within a range of 0.1-0.7, preferably 0.2-0.6.

EXAMPLES

The following examples illustrate examples of the present invention. The examples are disclosed for illustrative purpose of the present invention, and are not intended to limit the scope of the present invention. The present invention is further illustrated on the basis of the following examples.

(Evaluation by the Residence Time Distribution)

Tracer is instantaneously (within approximately one second) injected by a syringe to an intermediate portion of a piping prior to mixing gas with liquid. As the tracer, 1 mL of NaCl aqueous solution with 20 mass % is used for obtaining a residence time distribution of the liquid.

The gas-liquid (containing the tracer) is supplied to a column contact apparatus in an upflow and received by a cup so that the gas and the liquid discharged from the column contact apparatus are separated from each other. Then, electrical conductivity of the liquid is measured. The measured electrical conductivity is converted into concentration using a calibration curve (correlation line) between the concentration and the electrical conductivity.

Concentration response is obtained during the time measured from when the tracer is injected until when the tracer is fully discharged from the apparatus. The measured time is equal to or more than at least four times as long as a time calculated by dividing a volume (including a volume of the piping from a tracer inlet to the apparatus and a volume of the piping from the apparatus to the cup for measuring the electrical conductivity) of the apparatus by the flow rate of the liquid. It should be noted that the length of the piping from a tracer injecting position to the column contact apparatus and the length of the piping from the apparatus to the cup (an electrical conductivity-measuring position) are formed as short as possible to reduce effect of a flow state other than that of the apparatus to the measurement.

Figure 4:
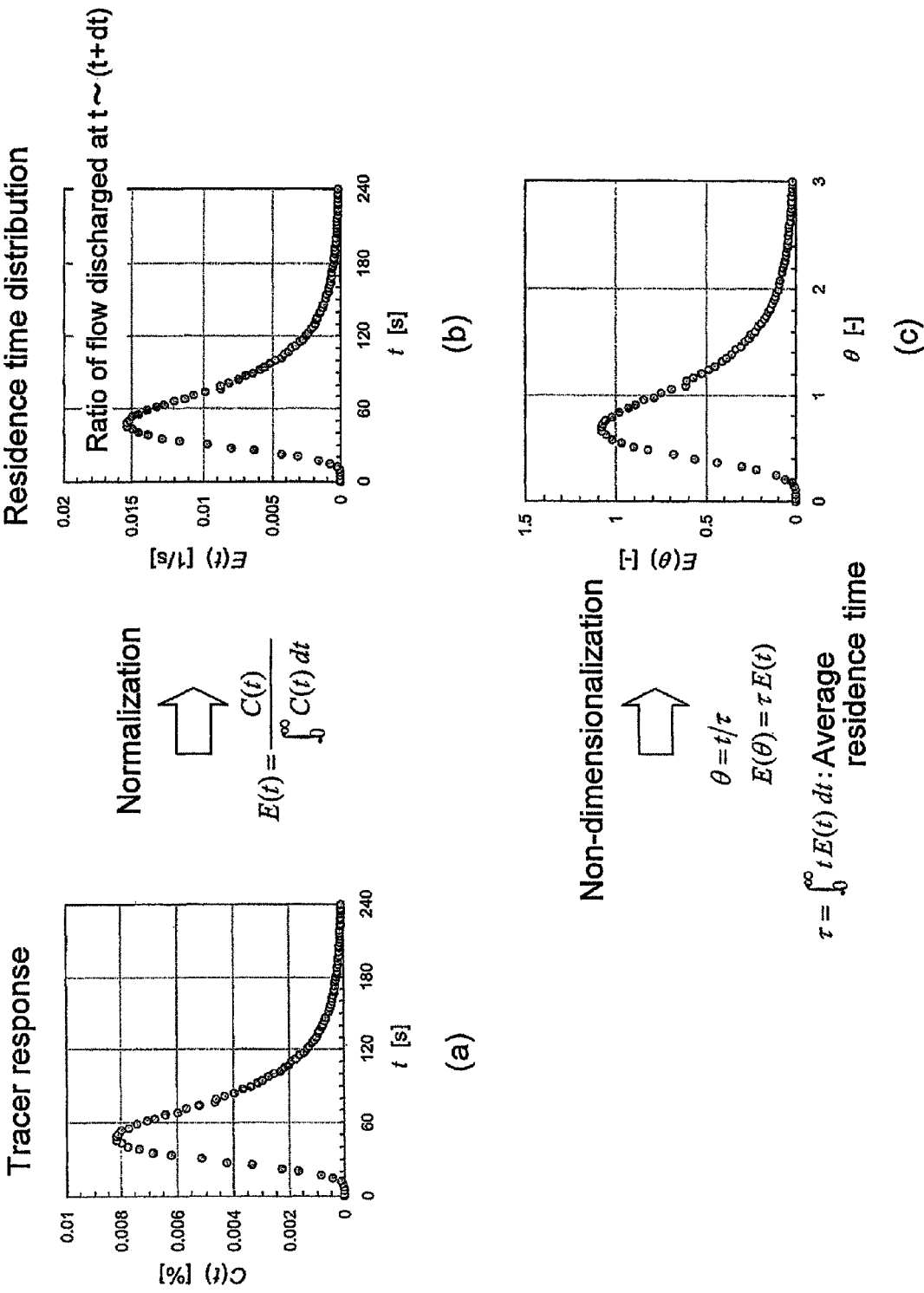
FIG. 4 is views illustrating a calculation method of a residence time distribution according to an example and a comparative example.
Figure 5:
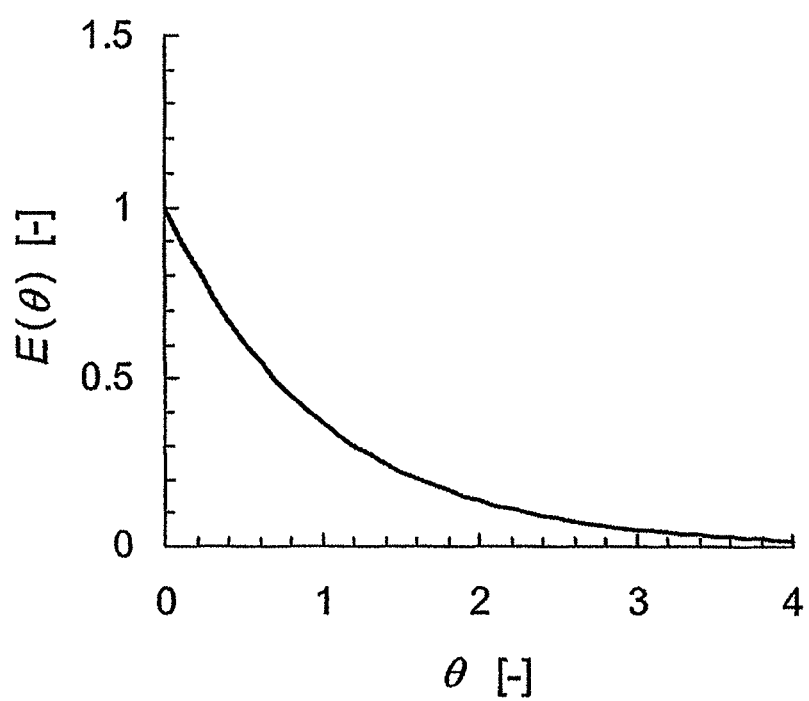
FIG. 5 is a view showing a residence time distribution in a completely mixed flow.

When the concentration response of the tracer as shown in FIG. 4($a$) is normalized so that the integral is equal to one, the residence time distribution E(t) represented by an actual time t can be obtained as shown in FIG. 4($b$). Then, the E(t) is multiplied by an average residence time τ to be non-dimensional, to obtain a residence time distribution E(θ) represented by a non-dimensional time θ as shown in FIG. 4($c$). It should be noted that FIG. 5 is a view showing a residence time distribution in a completely mixed flow.

(Evaluation by Number N of Tanks)

The residence time distribution, namely, the flow state is evaluated by using a tanks-in-series model known as a model that expresses the residence time distribution. The tanks-in-series model is directed to a model in which the apparatus is hypothetically divided into completely stirred tanks each having equal volumes and the flow state is represented by the number N of the tanks and the residence time distribution is expressed by an equation (I) (Literature 1).

It should be noted that the completely stirred tank is a device in which the completely mixed flow is assumed as an inner flow state. A fact that the number N of the tanks=1 corresponds to the completely mixed flow. When the number N of the tanks is more than one, the flow is closer to a plug flow.

Generally, a fact that the residence time distribution is close to the completely mixed flow (when the number N of the tanks is close to one) shows that mixing of the fluid inside the apparatus is noticeable as mentioned above. That is, the fact shows that the flow is very turbulent and the flow is unstable, and further, the width of the residence time distribution is wide. The fact that the number N of the tanks is more than one is directed to a fact that the flow is aligned and the width of the residence time distribution is narrow. The number N of the tanks can be obtained by an equation (II) from a variance $\sigma_t^2$ of the residence time distribution E(t) or a variance $\sigma_\theta^2$ of the residence time distribution E($\theta$).

$\tau$ in the equation (II) is directed to an average residence time and can be obtained by an equation (III) in the same manner as in FIG. 4. The variance $\sigma_t^2$ and the variance $\sigma_\theta^2$ can be obtained by an equation (IV).

[Equation 1]

$$E(\theta) = \frac{N(N\theta)^{N-1}}{(N-1)!}\exp(-N\theta) \quad \text{(I)}$$

$$N = \frac{\tau^2}{\sigma_t^2} = \frac{1}{\sigma_\theta^2} \quad \text{(II)}$$

$$\tau = \int_0^\infty tE(t)dt \quad \text{(III)}$$

$$\sigma_t^2 = \int_0^\infty (t-\tau)^2 E(t)dt,\ \sigma_\theta^2 = \int_0^\infty (\theta-1)^2 E(\theta)d\theta \quad \text{(IV)}$$

Examples 1-5 and Comparative Examples 1-3

Column contact apparatuses 100A to 100C were used as shown in FIGS. 6(a) to 6(c) (note that elements with reference numerals the same as those shown in FIG. 1 were directed to the same elements). The apparatus with two of the packed stages as shown in Table 1 corresponded to the apparatus 100A as shown in FIG. 6(a), the apparatus with four of the packed stages corresponded to the apparatus 100B as shown in FIG. 6(b), and the apparatus with the single packed stage corresponded to the apparatus 100C as shown in FIG. 6(c).

The column (column container 11) that was formed of an acrylic resin with an inner diameter of 85 mm and a height of 830 mm so that the flow state can be viewed was used.

The honeycomb structural body was stacked upward from a position of 115 mm from a bottom surface of the column.

As the honeycomb structural body, an aluminum micro honeycomb (width of narrow tubular channel of 1.5 mm) having hexagonal narrow tubular channels shaped as a honeycomb manufactured by Shin Nippon Feather Core Co., Ltd. was used. The honeycomb structural body was cut into a cylindrical shape with a diameter of 84 mm and a height of 26 mm. A total of sixteen of the honeycomb structural bodies were used. When the honeycomb structural bodies were stacked, the narrow tubular channels were not aligned to be consistent with each other.

The flow-aligning plate was of 1 mm in thickness and 84 mm in diameter, and was a perforated plate with hole diameters and pitches as shown in Table 1. An array of the holes in the perforated plate corresponded to an equilateral triangular array so that a shape of lines connecting central points of the holes corresponded to an equilateral triangle.

In FIG. 6(b) (examples 2 to 5), space portions 113a to 113c were respectively formed between the (four) honeycomb structural bodies 112a at the first stage and the (four) honeycomb structural bodies 112b at the second stage, between the (four) honeycomb structural bodies 112b at the second stage and the (four) honeycomb structural bodies 112c at the third stage, and between the (four) honeycomb structural bodies 112c at the third stage and the (four) honeycomb structural bodies 112d at the fourth stage.

The space portions 113a to 113c were respectively provided with flow-aligning plates 114a to 114c. A flow-aligning plate 117 was also provided under the (four) honeycomb structural bodies 112a.

In the examples and the comparative examples as shown in Table 1, the column contact apparatuses 100A to 100C respectively accommodated the honeycomb structural bodies with the number of the packed stages, the number of the honeycomb structural bodies installed in the single stage, and the lengths of the space portions between the respective stages as respectively shown in Table 1. The length of the space portion corresponds to a length from which the thickness of the flow-aligning plate was subtracted.

In the example 1 (FIG. 6(a)), a flow-aligning plate 114a was provided in the space portion 113a between the stages and a flow-aligning plate 117 was also provided under the honeycomb structural bodies at the bottom stage so that a total of two of the flow-aligning plates were used. In the examples 2 to 5 (FIG. 6(b)), flow-aligning plates 114a to 114c each were provided in the space portions 113a to 113c between the stages and a flow-aligning plate 117 was also provided under the honeycomb structural bodies 112a at the bottom stage so that a total of four of the flow-aligning plates were used.

Since the single stage was provided in the comparative example 1 (FIG. 6(c)), the space portion 113 and the flow-aligning plate 114 were not present, while only the flow-aligning plate 117 was provided. In the comparative examples 2 and 3, in FIG. 6(b), the flow-aligning plates were not provided in the space portions 113a to 113c and the flow-aligning plate 117 was not provided as well.

Figure 6:
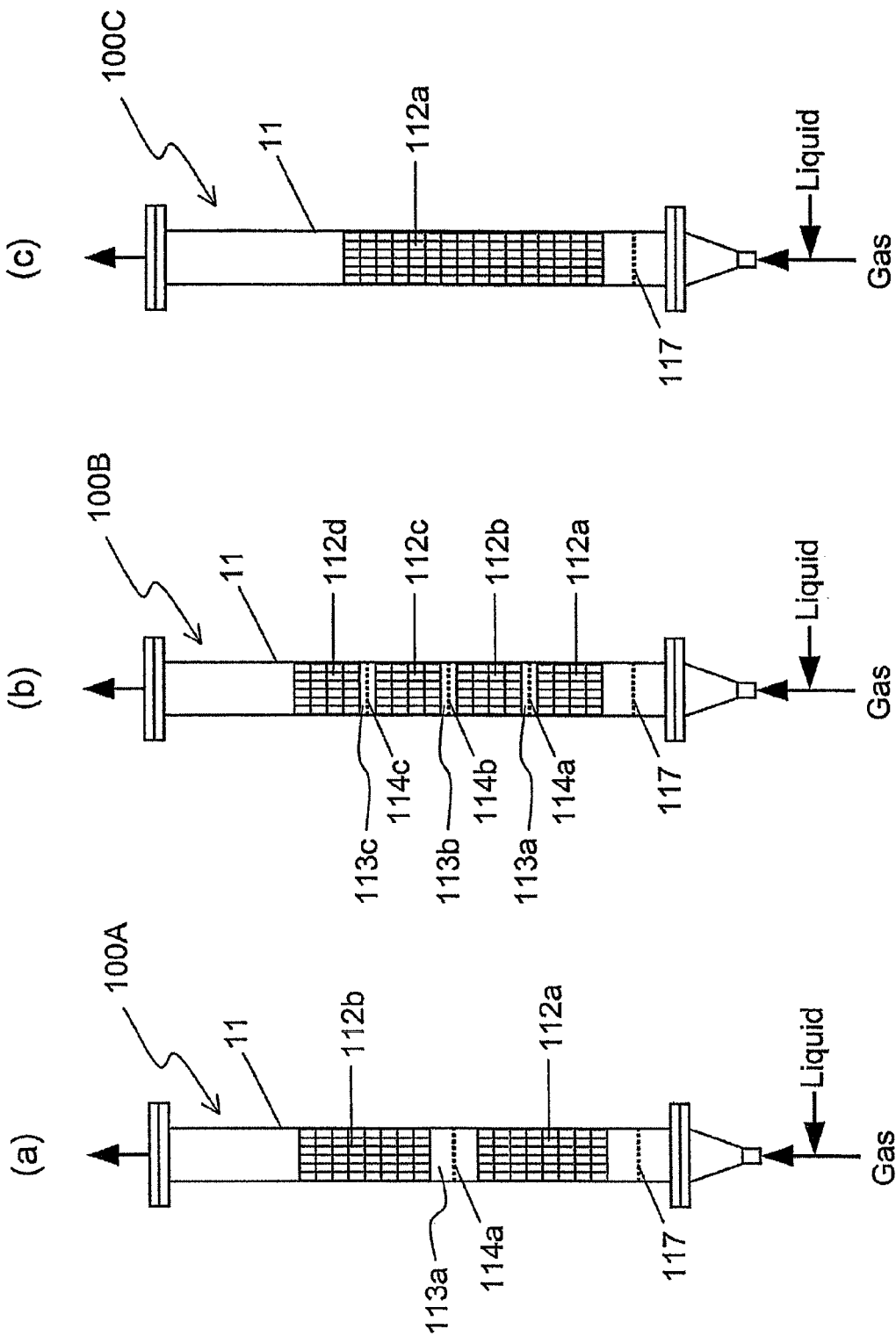
FIG. 6, in (a) to (c), is sectional views in a vertical direction showing the column contact apparatus used in the example and the comparative example.

A method for contacting the gas with the liquid using the column contact apparatus as shown in FIG. 6 and Table 1 was performed as follows.

Air was used as the gas and ion-exchange water was used as the liquid at an ambient temperature. The gas and the liquid were supplied from independent pipings through flowmeters so that the flow rate of the gas and the flow rate of the liquid were maintained to be constant.

The pipings of the gas and the liquid were joined in advance before entering the column so that the gas and the liquid were flowed through a straight pipe with a diameter of 10 mm and a length of 30 mm to be subjected to gas dispersion. The straight pipe was connected to a spreading pipe with a cross-section gradually increasing to be truncated conical. An outlet of the spreading pipe corresponded to an inner diameter of the column to be connected to a bottom side of the column.

The gas and the liquid were, at a superficial velocity shown in Table 1, flowed into the column from the bottom and discharged via the top. The superficial velocity was in accordance with a general definition and calculated by dividing the flow rate by the cross-sectional area of the column. The aperture ratio of the honeycomb structural body (width of the narrow tubular channel was 1.5 mm) used here was approximately 98%, being large. Accordingly, even if the superficial velocity was calculated with an opening area of the honeycomb structural body as a reference, the superficial velocity varied 2% at most.

The examples 3 to 5 show examples with configurations the same as that of the example 2 in which the superficial velocity of the gas or the liquid was changed.

TABLE 1

| | | Example | | Comparative example | Example | | | Comparative example | Comparative example |
|---|---|---|---|---|---|---|---|---|---|
| | | 1 | 2 | 1 | 3 | 4 | 5 | 2 | 3 |
| Column contact apparatus | Width of narrow tubular channels in a honeycomb (mm) | 1.5 | 1.5 | 1.5 | 1.5 | 1.5 | 1.5 | 1.5 | 1.5 |
| | Number of packed stages | 2 | 4 | 1 | 4 | 4 | 4 | 4 | 4 |
| | Number of packed honeycomb structural bodies per one stage | 8 | 4 | 16 | 4 | 4 | 4 | 4 | 4 |
| | Length of space portion (mm) | 78 | 26 | — | 26 | 26 | 26 | 26 | 26 |
| | Flow aligning plate Hole diameter (mm) | 3 | 3 | 3 | 3 | 3 | 3 | — | — |
| | Pitch (mm) | 5 | 5 | 5 | 5 | 5 | 5 | — | — |
| | Number of plates between stages | 1 | 1 | — | 1 | 1 | 1 | 0 | 0 |
| | Number of plates at bottom | 1 | 1 | 1 | 1 | 1 | 1 | 0 | 0 |
| Operation conditions | Superficial gas velocity (m/s) | 0.059 | 0.059 | 0.059 | 0.117 | 0.470 | 0.117 | 0.059 | 0.117 |
| | Superficial liquid velocity (m/s) | 0.012 | 0.012 | 0.012 | 0.012 | 0.012 | 0.023 | 0.012 | 0.012 |
| Number of tanks, N (residence time distribution) | | 1.8 | 2.4 | 1.3 | 2.3 | 1.9 | 1.8 | 1.5 | 0.92 |

The examples 1 and 2 and the comparative example 1 are examples in which the number of the stages in which the honeycomb structural bodies were packed were changed.

In the example 1, the number of stages of the packed honeycomb structural bodies was two, and gaps with a height of 39 mm each were provided on and below a flow-aligning plate (a perforated plate; hole diameter of 3 mm, pitch of 5 mm, and aperture ratio of 33%) with a thickness of 1 mm so that the length of the space portions was 78 mm (not including the thickness of the flow-aligning plate).

In the example 2, the number of stages of the packed honeycomb structural bodies was four, and gaps with a height of 13 mm each were provided on and below a flow-aligning plate (a perforated plate; hole diameter of 3 mm, pitch of 5 mm, and aperture ratio of 33%) with a thickness of 1 mm so that the length of the space portions was 26 mm (not including the thickness of the flow-aligning plate).

In the comparative example 1, the number of stages of the honeycomb structural bodies was one, and only a flow-aligning plate (perforated plate) 117 shown in FIG. 6(c) was provided.

A value of the number N of the tanks calculated from the residence time distribution was 1.3 in the comparative example 1 of the single stage of the honeycomb structural bodies, which was close to a value 1 in the completely mixed flow. Accordingly, it was recognized that the flow was close to the completely mixed flow as publicly known, and thus the flow-aligning advantage could not be confirmed.

In contrast, in the example 1 of the two stages of the packed honeycomb structural bodies and the example 2 of the four stages of the honeycomb structural bodies, the values of the numbers N of the tanks were 1.8, 2.4, respectively. Accordingly, it was obvious that the flows were closer to the plug flow and thus the flow-aligning advantage could be confirmed. In the example 2 in which the number of the stages was especially large, the flow-aligning advantage was noticeable.

The comparative examples 2 and 3 show examples including configurations almost the same as that of the example 2 from which all of the flow-aligning plates (perforated plates) were removed.

In the examples 3 and 4, the superficial gas velocity was more than that in the example 2. Generally, it was recognized that as the superficial gas velocity was increased, turbulence of the flow was noticeable. In the examples 3 and 4, however the value of N was not much different from that of the example 2 to be sufficiently more than one. Accordingly, it was recognized that by forming a multi-stage, the flow could be stably aligned.

In the example 5, the superficial liquid velocity was more than that in the example 3. At this time, the flow-aligning effect by forming the multi-stage was also maintained.

In contrast, when the flow-aligning plate (perforated plate) was not used, although the flow-aligning advantage could be recognized in the comparative example 2 from the value of N, the flow-aligning effect was reduced compared with that of the example 2 under the same superficial velocity conditions. In the comparative example 3 in which the superficial gas velocity was increased, the value of N was significantly close to one, and thus the flow-aligning result could not be confirmed.

Examples 6 to 13 and Comparative Examples 4 and 5

In the examples 6 to 13 and the comparative examples 4 and 5, as in the examples 1 to 5, the column contact apparatus as shown in FIG. 6 and Table 2 was used. The results were shown in Table 2. Here, the examples 2 and 4 were also shown for reference.

TABLE 2

| | | Example | | | | | Comparative example | Example |
|---|---|---|---|---|---|---|---|---|
| | | 2 | 6 | 7 | 8 | 9 | 4 | 4 |
| Column contact apparatus | Width of narrow tubular channels in a honeycomb (mm) | 1.5 | 1.5 | 1.5 | 1.5 | 1.5 | 1.5 | 1.5 |
| | Number of packed stages | 4 | 4 | 4 | 4 | 4 | 4 | 4 |
| | Number of packed honeycomb structural bodies per one stage | 4 | 4 | 4 | 4 | 4 | 4 | 4 |
| | Length of space portion (mm) | 26 | 26 | 26 | 26 | 26 | 26 | 26 |
| Flow aligning plate | Hole diameter (mm) | 3 | 1 | 1 | 2 | 5 | 10 | 3 |
| | Pitch (mm) | 5 | 5 | 2 | 3 | 6 | 11 | 5 |
| | Aperture ratio (%) | 33 | 4 | 23 | 40 | 63 | 75 | 33 |
| | Number of plates between stages | 1 | 1 | 1 | 1 | 1 | 1 | 1 |
| | Number of plates at bottom | 1 | 1 | 1 | 1 | 1 | 1 | 1 |
| Operation conditions | Superficial gas velocity (m/s) | 0.059 | 0.059 | 0.059 | 0.059 | 0.059 | 0.059 | 0.470 |
| | Superficial liquid velocity (m/s) | 0.012 | 0.012 | 0.012 | 0.012 | 0.012 | 0.012 | 0.012 |
| Number of tanks, N (residence time distribution) | | 2.4 | 2.6 | 2.3 | 2.6 | 2.3 | 2.4 | 1.9 |

| | | Example | | | | Comparative example |
|---|---|---|---|---|---|---|
| | | 10 | 11 | 12 | 13 | 5 |
| Column contact apparatus | Width of narrow tubular channels in a honeycomb (mm) | 1.5 | 1.5 | 1.5 | 1.5 | 1.5 |
| | Number of packed stages | 4 | 4 | 4 | 4 | 4 |
| | Number of packed honeycomb structural bodies per one stage | 4 | 4 | 4 | 4 | 4 |
| | Length of space portion (mm) | 26 | 26 | 26 | 26 | 26 |
| Flow aligning plate | Hole diameter (mm) | 1 | 1 | 2 | 5 | 10 |
| | Pitch (mm) | 5 | 2 | 3 | 6 | 11 |
| | Aperture ratio (%) | 4 | 23 | 40 | 63 | 75 |
| | Number of plates between stages | 1 | 1 | 1 | 1 | 1 |
| | Number of plates at bottom | 1 | 1 | 1 | 1 | 1 |
| Operation conditions | Superficial gas velocity (m/s) | 0.470 | 0.470 | 0.470 | 0.470 | 0.470 |
| | Superficial liquid velocity (m/s) | 0.012 | 0.012 | 0.012 | 0.012 | 0.012 |
| Number of tanks, N (residence time distribution) | | 1.5 | 2.5 | 2.2 | 1.5 | 1.2 |

In the examples 6 to 9 and the comparative example 4, flow-aligning plates (perforated plates) that were different from those in the example 2 were used to compare an advantage obtained therefrom with that of the example 2.

In comparison of the value of the number N of the tanks in the example 2 with that in the examples 6-9 and the comparative example 4, a noticeable effect could not be recognized by a difference of the hole diameter and the pitch (aperture ratio).

Then, by increasing the superficial gas velocity, the examples 10 to 13 and the comparative example 5 were compared with the example 4. According to the value of the number N of the tanks, it was recognized that the flow-aligning effect could be maintained in the examples 10 to 13 as in the example 4. The examples 10 and 13, however, show N=1.5 which was a rather smaller value, and the flow-aligning effect was a little reduced. In the comparative example 5, the value of N was smaller to be close to one, and the flow-aligning effect could not be confirmed.

It was considered that when the aperture ratio of the flow-aligning plate (perforated plate) was small, a stagnant portion of the flow was generated inside the column to degrade the flow state. It was considered when the hole diameter of the flow-aligning plate (perforated plate) was large, the effect by the flow-aligning plate (perforated plate) of preventing the back-mixing from being caused was reduced, and thus conditions therein were similar to that in the comparative example 2 or 3 in which the flow-aligning plate (perforated plate) was not used. It is noted that an air bubble diameter in these experiments was approximately between 3 mm and 12 mm.

Examples 14 and 15 and Comparative Examples 6 and 7

In the examples 14 and 15 and the comparative examples 6 and 7, as in the examples 1 to 5, the column contact apparatus as shown in FIG. 6 and Table 3 was used. The results are shown in Table 3. Here, the examples 2 and 4 are also shown for reference.

TABLE 3

|  |  | Example | | Comparative example | Example | | Comparative example |
| --- | --- | --- | --- | --- | --- | --- | --- |
|  |  | 2 | 14 | 6 | 4 | 15 | 7 |
| Column contact apparatus | Width of narrow tubular channels in a honeycomb (mm) | 1.5 | 1.5 | 1.5 | 1.5 | 1.5 | 1.5 |
|  | Number of packed stages | 4 | 4 | 4 | 4 | 4 | 4 |
|  | Number of packed honeycomb structural bodies per one stage | 4 | 4 | 4 | 4 | 4 | 4 |
|  | Length of space portion (mm) | 26 | 52 | 4 | 26 | 52 | 4 |
|  | Flow aligning plate — Hole diameter (mm) | 3 | 3 | 3 | 3 | 3 | 3 |
|  | Pitch (mm) | 5 | 5 | 5 | 5 | 5 | 5 |
|  | Number of plates between stages | 1 | 1 | 1 | 1 | 1 | 1 |
|  | Number of plates at bottom | 1 | 1 | 1 | 1 | 1 | 1 |
| Operation condition | Superficial gas velocity (m/s) | 0.059 | 0.059 | 0.059 | 0.470 | 0.470 | 0.470 |
|  | Superficial liquid velocity (m/s) | 0.012 | 0.012 | 0.012 | 0.012 | 0.012 | 0.012 |
| Number of tanks, N (residence time distribution) |  | 2.4 | 3.4 | 2.0 | 1.9 | 1.5 | 1.3 |

In the examples 14 and 15 and the comparative examples 6 and 7, the width of space portions 113a to 113c (not including a thickness of the flow-aligning plate) as shown in FIG. 6(b) was changed to be compared with the examples 2 and 4.

In the examples 14 and 15, gaps with a height of 26 mm each were provided on and below a flow-aligning plate (a perforated plate) with a thickness of 1 mm so that the length of the space portions was 52 mm (not including the thickness of the flow-aligning plate). In the comparative examples 6 and 7, gaps with a height of 2 mm each were provided on and below a flow-aligning plate (a perforated plate) with a thickness of 1 mm so that the length of the space portions was 4 mm (not including the thickness of the flow-aligning plate).

From results obtained in the examples 14 and 15, it was confirmed that the value of the number N of the tanks was changed by the superficial gas velocity. In any of the examples 14 and 15, however, the flow-aligning advantage could be confirmed. In particular, the value of N in the example 14 was more than that in the example 2. In a case of a superficial gas velocity between those in the examples 14 and 15, the value of N is approximately a value between them.

In the comparative example 6, the flow-aligning effect was recognized from the value of N. However, compared to the example 2 with the same superficial gas velocity condition, the value of N in the comparative example 6 was smaller than that in the example 2 and it could be confirmed that the flow-aligning advantage was reduced. In the comparative example 7, the value of N was close to one and the flow-aligning advantage was not confirmed. It was recognized that when the length of the space portion was small, especially in a case where the superficial gas velocity was large, the flow-aligning advantage was reduced. It is noted that an air bubble diameter in these experiments was approximately between 3 mm and 12 mm. To obtain sufficient flow-aligning effect, it was considered that it is necessary that the length of the space portion is more than the air bubble diameter.

Examples 16 to 18 and Comparative Example 8

In the examples 16 to 18 and the comparative example 8, as in the examples 1 to 5, the column contact apparatus as shown in FIG. 6 and Table 4 was used. The results are shown in Table 4. Here, the example 3 is also shown for reference.

TABLE 4

|  |  | Example | | | Example | Comparative example |
| --- | --- | --- | --- | --- | --- | --- |
|  |  | 3 | 16 | 17 | 18 | 8 |
| Column contact apparatus | Width of narrow tubular channels in a honeycomb (mm) | 1.5 | 1.5 | 1.5 | 0.9 | 0.9 |
|  | Number of packed stages | 4 | 4 | 4 | 4 | 1 |
|  | Number of packed honeycomb structural bodies per one stage | 4 | 3 | 4 | 4 | 16 |
|  | Length of space portion (mm) | 26 | 65 | 26 | 26 | — |
|  | Flow aligning plate — Hole diameter (mm) | 3 | between stages: the following 2 plates | between stages: Thick honeycomb plate | 3 | — |
|  | Pitch (mm) | 5 | hole diameter 2, pitch 3 hole diameter 3, pitch 5 bottom: hole diameter 3, pitch 5 | having hole diameter 0.9 bottom: hole diameter 1, pitch 2 | 5 | — |
|  | Number of plates between stages | 1 | 2 | 1 | 1 | — |
|  | Number of plates at bottom | 1 | 1 | 1 | 1 | 0 |

TABLE 4-continued

|  |  | Example | | | Example | Comparative example |
| --- | --- | --- | --- | --- | --- | --- |
|  |  | 3 | 16 | 17 | 18 | 8 |
| Operation condition | Superficial gas velocity (m/s) | 0.117 | 0.117 | 0.117 | 0.117 | 0.117 |
|  | Superficial liquid velocity (m/s) | 0.012 | 0.012 | 0.012 | 0.012 | 0.012 |
| Number of tanks, N (residence time distribution) | | 2.3 | 2.7 | 2.8 | 4.7 | 3.0 |

The examples 16 and 17 show examples in which the flow-aligning plates were changed. In the example 16, two perforated plates with different hole diameter and pitch were used as the flow-aligning plates 114a to 114c in the space portions 113a to 113c as shown in FIG. 6(b). The configuration of the space portion was as follows.

From a top, 26 mm, 13 mm, and 26 mm of gaps were provided in this order. As an upper flow-aligning plate, a perforated plate with a hole diameter of 2 mm and a pitch of 3 mm (an aperture ratio of 40%, a thickness of 1 mm) was fixed between the spaces of 26 mm and 13 mm. As a lower flow-aligning plate, a perforated plate with a hole diameter of 3 mm and a pitch of 5 mm (an aperture ratio of 33%, a thickness of 1 mm) was fixed between the spaces of 13 mm and 26 mm. The length of the space portion was 65 mm (not including the thicknesses of the two flow-aligning plates). That is, the flow-aligning plates 114a to 114c were respectively configured by the above described two perforated plates. As the flow-aligning plate 117, a single perforated plate with a hole diameter of 3 mm and a pitch of 5 mm (an aperture ratio of 33% and a thickness of 1 mm) was used.

In the example 17, thick honeycomb plates (a diameter of 84 mm, a thickness of 26 mm, and an aperture ratio of 96%) with 0.9 mm of a width of a narrow tubular channel were used as the flow-aligning plates 114a to 114c of the space portions 113a to 113c as shown in FIG. 6(b) (aluminum micro honeycomb manufactured by Shin Nippon Feather Core Co., Ltd.). Gaps of 13 mm were provided on and below the thick honeycomb plate, and the length of the space portions was set to be 26 mm (not including the thickness of the flow-aligning plate). When the thickness of the flow-aligning plate was included in the space portions, the length of the space portions was 52 mm. As the flow-aligning plate 117, a single perforated plate with a hole diameter of 1 mm and a pitch of 2 mm (an aperture ratio of 23% and a thickness of 1 mm) was used.

In the examples 16 and 17 compared with the example 3 with the same superficial velocity conditions, the value of the number N of the tanks was slightly larger and a higher flow-aligning advantage could be confirmed. In one of the space portions, different types of two of the flow-aligning plates could be used as in the example 16. Generally, the same type or different types of a plurality of the flow-aligning plates may be combined to be used. According to the example 17, it was recognized that, although the aperture ratio of the flow-aligning plate was large, a sufficient back-mixing restriction was obtained if the hole diameter was small.

The example 18 and the comparative example 8 show examples in which a honeycomb structural body (a diameter of 84 mm, a thickness of 26 mm) with 0.9 mm of a width of a narrow tubular channel was used as a honeycomb structural body accommodated in the column container 11. As the honeycomb structural body, an aluminum micro honeycomb having hexagonal narrow tubular channel shaped as a honeycomb manufactured by Shin Nippon Feather Core Co., Ltd. was used.

The example 18 was the same as the example 3 except that the honeycomb structural bodies accommodated in the column container 11 were different from those in the example 3.

The comparative example 8 includes a configuration almost the same as that of the comparative example 1. The comparative example 8 differs from the comparative example 1 in that no flow-aligning plate was used.

According to the comparative example 8, it was confirmed that when the honeycomb structural body with less than 1 mm of the width of the narrow tube was used, the flow-aligning advantage was confirmed even in a case of the single stage of the honeycomb structural bodies. In comparison to the example 18, the honeycomb structural bodies were sectioned into four stages and the flow-aligning plates were used in the space portions so that it was confirmed that the flow-aligning advantage was improved.

Comparative Examples 9 and 10

In the comparative examples 9 and 10, as in the examples 1 to 5, the column contact apparatus as shown in FIG. 6 and Table 5 was used. The results are shown in Table 5. Here, the comparative example 1 is also shown for reference.

TABLE 5

|  |  | Comparative example | | |
| --- | --- | --- | --- | --- |
|  |  | 1 | 9 | 10 |
| Column contact apparatus | Width of narrow tubular channels in a honeycomb (mm) | 1.5 | 1.5 | 1.5 |
|  | Number of packed stages | 1 | 1 | 1 |
|  | Number of packed honeycomb structural bodies per one stage | 16 | 16 | 20 |
|  | Length of space portion (mm) | — | — | — |
| Flow aligning plate | Hole diameter (mm) | 3 | 1 | — |
|  | Pitch (mm) | 5 | 20 | — |
|  | Number of plates between stages | — | — | — |
|  | Number of plates at bottom | 1 | 2 | 0 |
| Operation condition | Superficial gas velocity (m/s) | 0.059 | 0.059 | 0.059 |
|  | Superficial liquid velocity (m/s) | 0.012 | 0.012 | 0.012 |
| Number of tanks, N (residence time distribution) | | 1.3 | 1.3 | 1.1 |

In the comparative examples 9 and 10, effects of the gas dispersion were confirmed.

The number of the stages of the honeycomb structural bodies was one (FIG. 6(c)) in the comparative examples 1, 9, and 10.

In the comparative example 1, the flow-aligning plate (perforated plate) 117 as shown in FIG. 6(c) was provided. The flow-aligning plate (perforated plate) was of 3 mm of hole diameter and 5 mm of pitch (an aperture ratio of 33% and a thickness of 1 mm).

In the comparative example 9, two of the flow-aligning plates (perforated plate) 117 placed with a space therebetween as shown in FIG. 6(c) was provided. Both of the flow-aligning plates (perforated plate) were of 1 mm of hole diameter and 20 mm of pitch (an aperture ratio of 0.23% and a thickness of 1 mm), and the gap between the two flow-aligning plates was 26 mm. In the comparative example 10, the flow-aligning plate (perforated plate) was not used.

In the comparative examples 1 and 9, the gas was dispersed in front of the honeycomb structural bodies by the flow-aligning plate (perforated plate). In contrast, since the flow-aligning plate (perforated plate) was not used in the comparative example 10, the comparative example 10 differs from the comparative examples 1 and 9 in that gas dispersion operations were not performed as in the comparative examples 1 and 9.

In any of the comparative examples 1, 9, and 10, the number N of the tanks was close to 1, and thus the flow was close to the completely mixed flow.

Figure 7:
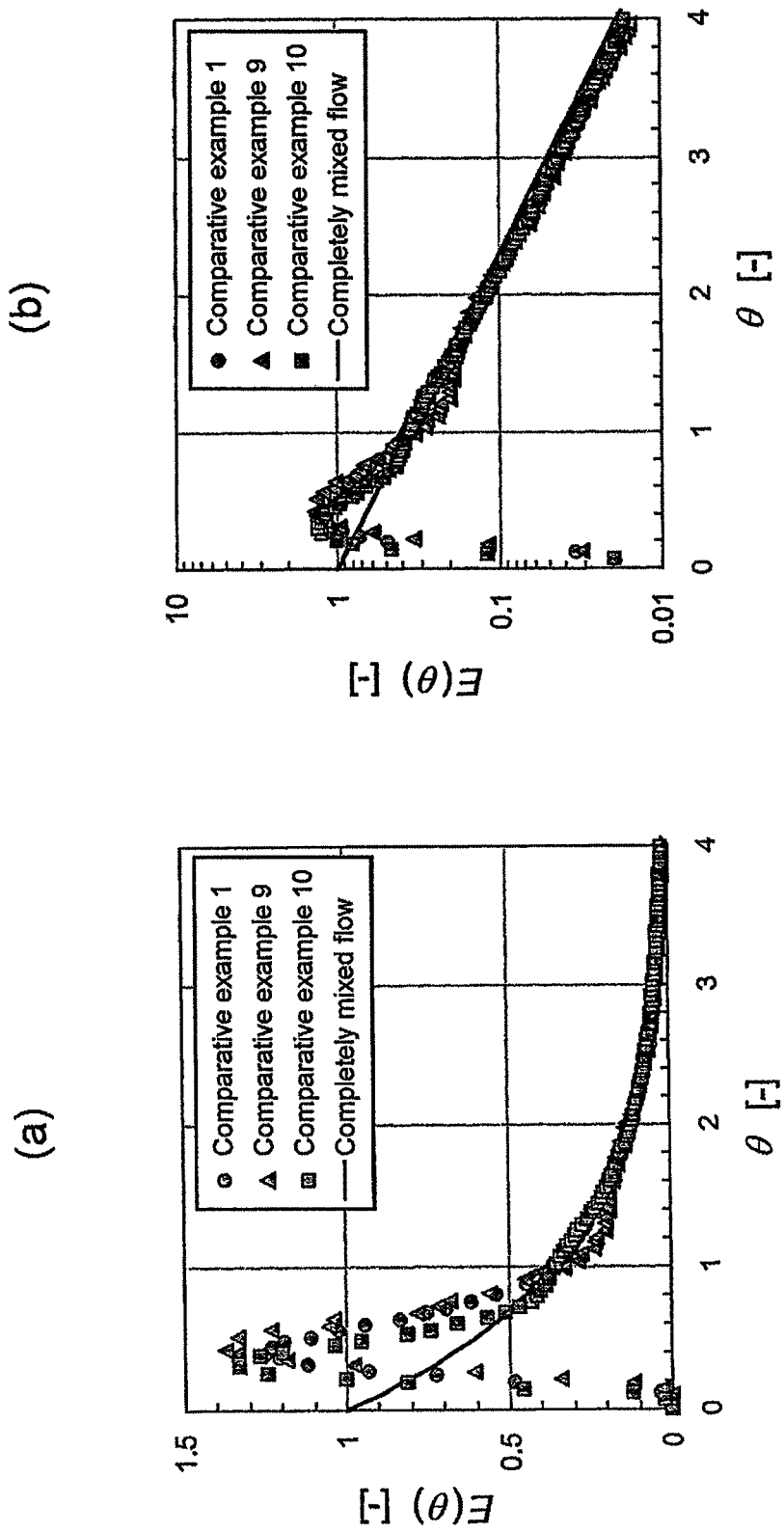
FIG. 7 is views showing measurement results of the residence time distributions in the comparative examples 1, 9, and 10.

In FIGS. 7(a) and 7(b), the residence time distributions of the comparative examples 1, 9 and 10 are shown. FIG. 7(b) logarithmically shows a vertical axis of FIG. 7(a). The solid line shows the residence time distribution in the completely mixed flow.

Any of the flows in the comparative examples 1, 9, and 10 were noticeably close to the completely mixed flow. When the comparative examples 1, 9, and 10 were compared to each other by the residence time distribution, almost the same flow states were confirmed. According to this result, it was confirmed that even if the flow-aligning plate (perforated plate) (the flow-aligning plate 117 in FIG. 6(c)) was provided at the bottom stage, almost no flow-aligning advantage was obtained due to the gas dispersion.

Figure 8:
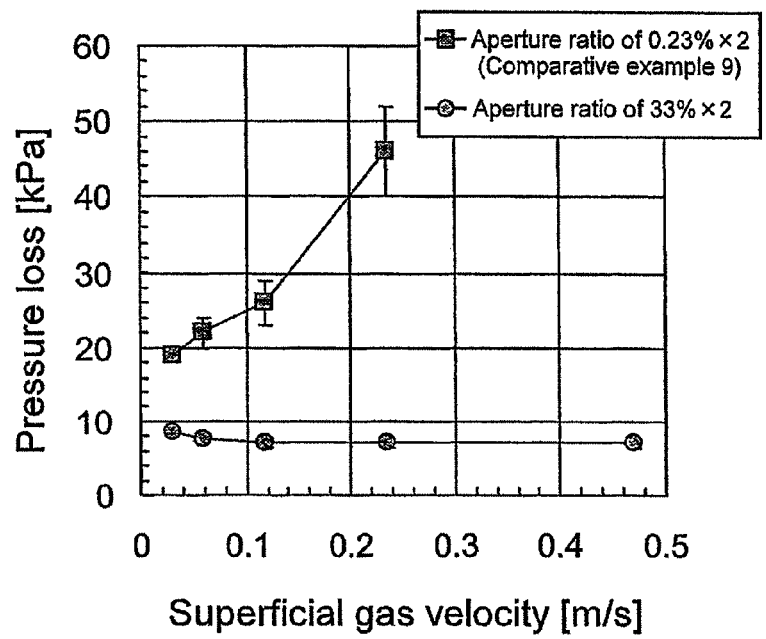
FIG. 8 is a view showing a pressure loss in the comparative example 9.

Next, in the comparative example 9, a static pressure was measured at a position under the flow-aligning plate 117. This may be considered as a pressure loss caused from when the gas and the liquid entered the bottom of the column to when the gas and the liquid were discharged via the top of the column. The results are shown in FIG. 8. An error bar indicates a deviation of a value visually measured by a manometer and is a rough indication of the variation of the value.

In FIG. 8, as a comparison, a configuration the same as that in the comparative example 9 except that the flow-aligning plate 117 as shown in FIG. 6(c) was replaced with two of the flow-aligning plates (perforated plates; an aperture ratio of 33% and a thickness of 1 mm) with a hole diameter of 3 mm and a pitch of 5 mm are also shown. In the comparative example 9 in which two of the flow-aligning plates (perforated plates) with an aperture ratio of 0.23%, in comparison to a case in which two of the flow-aligning plates (perforated plates) with an aperture ratio of 33% were used, it was confirmed that the pressure loss was noticeably increased when the superficial gas velocity was increased. Accordingly, it was recognized that the plates in the comparative example 9 were not suitable for the flow-aligning plates in a point of view of the pressure loss.

Hereinafter, the examples 19 to 24 illustrate aspect (I) of the present invention.

Examples 19 to 21 and Comparative Examples 11 to 14

Figure 12:
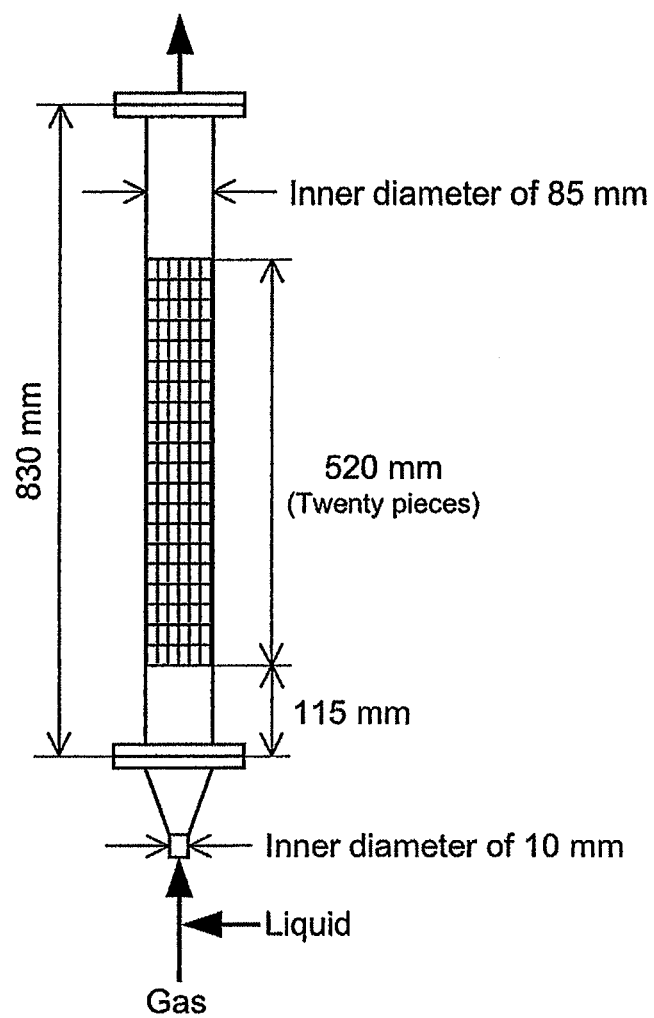
FIG. 12 is a cross-sectional view in a vertical direction showing the column contact apparatus used in the examples 19 to 21 according to aspect (I) of the present invention.

The gas was brought into contact with the liquid using a column contact apparatus as shown in FIG. 12.

The column (column container) was formed of an acrylic resin with an inner diameter of 85 mm and a height of 830 mm so that the flow state could be viewed.

The honeycomb structural bodies were stacked upward from a position of 115 mm from a bottom surface of the column. A total of twenty of the honeycomb structural bodies were stacked and accommodated (a single stage as a whole).

As the honeycomb structural body, an aluminum micro honeycomb (width of narrow tubular channel of 0.9 mm and 1.5 mm) and an aluminum honeycomb (width of narrow tubular channel of 3.2 mm), each having hexagonal narrow tubular channels shaped as a honeycomb as shown in Table 6 manufactured by Shin Nippon Feather Core Co., Ltd., were used. Here, the width of the narrow tubular channel was a length shown by "a" in the hexagon in FIG. 10.

The honeycomb structural body was cut into a cylindrical shape with a diameter of 84 mm and a height of 26 mm. When the honeycomb structural bodies were stacked, the narrow tubular channels were not aligned to be consistent with each other.

A method for contacting the gas with the liquid using the column contact apparatus as shown in FIG. 12 and Table 6 was performed as follows.

Air was used as the gas and ion-exchange water was used as the liquid at an ambient temperature. The gas and the liquid were supplied from independent pipings through flowmeters so that the flow rate of the gas and the flow rate of the liquid were maintained to be constant.

The pipings of the gas and the liquid were joined in advance before entering the column so that the gas and the liquid were flowed through a straight pipe with a diameter of 10 mm and a length of 30 mm to be subjected to gas dispersion. The straight pipe was connected to a spreading pipe with a cross-section gradually increasing to be truncated conical. An outlet of the spreading pipe corresponded to an inner diameter of the column to be connected to a bottom side of the column.

The gas and the liquid were, at a superficial velocity shown in Table 6, flowed into the column from the bottom and discharged via the top. The superficial velocity was in accordance with a general definition and calculated by dividing the flow rate by the cross-sectional area of the column. Since the aperture ratios of the three types of the honeycomb structural bodies used here were approximately 96% to 99%, being large, even if the superficial velocity was calculated with the opening area of the honeycomb structural body as a reference, the superficial velocity varied only within the range about 1%-4%.

TABLE 6

| | | Example | | | Comparative example | | | |
|---|---|---|---|---|---|---|---|---|
| | | 19 | 20 | 21 | 11 | 12 | 13 | 14 |
| Column contact apparatus | Width of narrow tubular channels of honeycomb structural bodies (mm) | 0.9 | 0.9 | 0.9 | 1.5 | 1.5 | 1.5 | 3.2 |
| | Hydraulic diameter of narrow tubular channels of honeycomb structural bodies (mm) | 0.9 | 0.9 | 0.9 | 1.5 | 1.5 | 1.5 | 3.2 |
| | Number of packed honeycomb structural bodies | 20 | 20 | 20 | 20 | 20 | 20 | 20 |

TABLE 6-continued

|  |  | Example | | | Comparative example | | | |
| --- | --- | --- | --- | --- | --- | --- | --- | --- |
|  |  | 19 | 20 | 21 | 11 | 12 | 13 | 14 |
| Operation condition | Superficial gas velocity (m/s) | 0.059 | 0.117 | 0.470 | 0.059 | 0.117 | 0.470 | 0.117 |
|  | Superficial liquid velocity (m/s) | 0.012 | 0.023 | 0.012 | 0.012 | 0.023 | 0.012 | 0.023 |
| Number of tanks, N (residence time distribution) |  | 3.4 | 5.0 | 2.7 | 1.1 | 1.0 | 1.3 | 1.3 |

In the examples 19 to 21 and the comparative examples 11 to 14, experiments were performed with different superficial velocities of the gas and the liquid with respect to three types of the honeycomb structural bodies.

In the comparative examples 11 to 14, it was recognized that, independent from the superficial velocities of the gas and the liquid, the value of the number N of the tanks calculated from the residence time distribution was close to one, and the flow was close the completely mixed flow as was publicly known.

In contrast, in the examples 19 to 21, the value of the number N of the tanks was sufficiently more than one, and the flow was clearly different from the completely mixed flow, while it was closer to the plug flow.

Generally, if the superficial gas velocity was large, it was considered that a turbulence of the flow was noticeable. When the example 21 was compared with the example 19, although the value of N was slightly small in the example 21 in which the superficial gas velocity was large, the value of N was sufficiently more than one. That is, even if the superficial gas velocity was large, it was confirmed that the flow was stable.

When the superficial gas velocity was an intermediate velocity between the superficial gas velocity in the example 19 and the superficial gas velocity in the example 21, it was considered that the value of N may be approximately an intermediate value between the value of N in the example 19 and the value of N in the example 21.

According to the example 20, it was recognized that the flow was stabilized without any problems even when the superficial liquid velocity was large.

Figure 13:
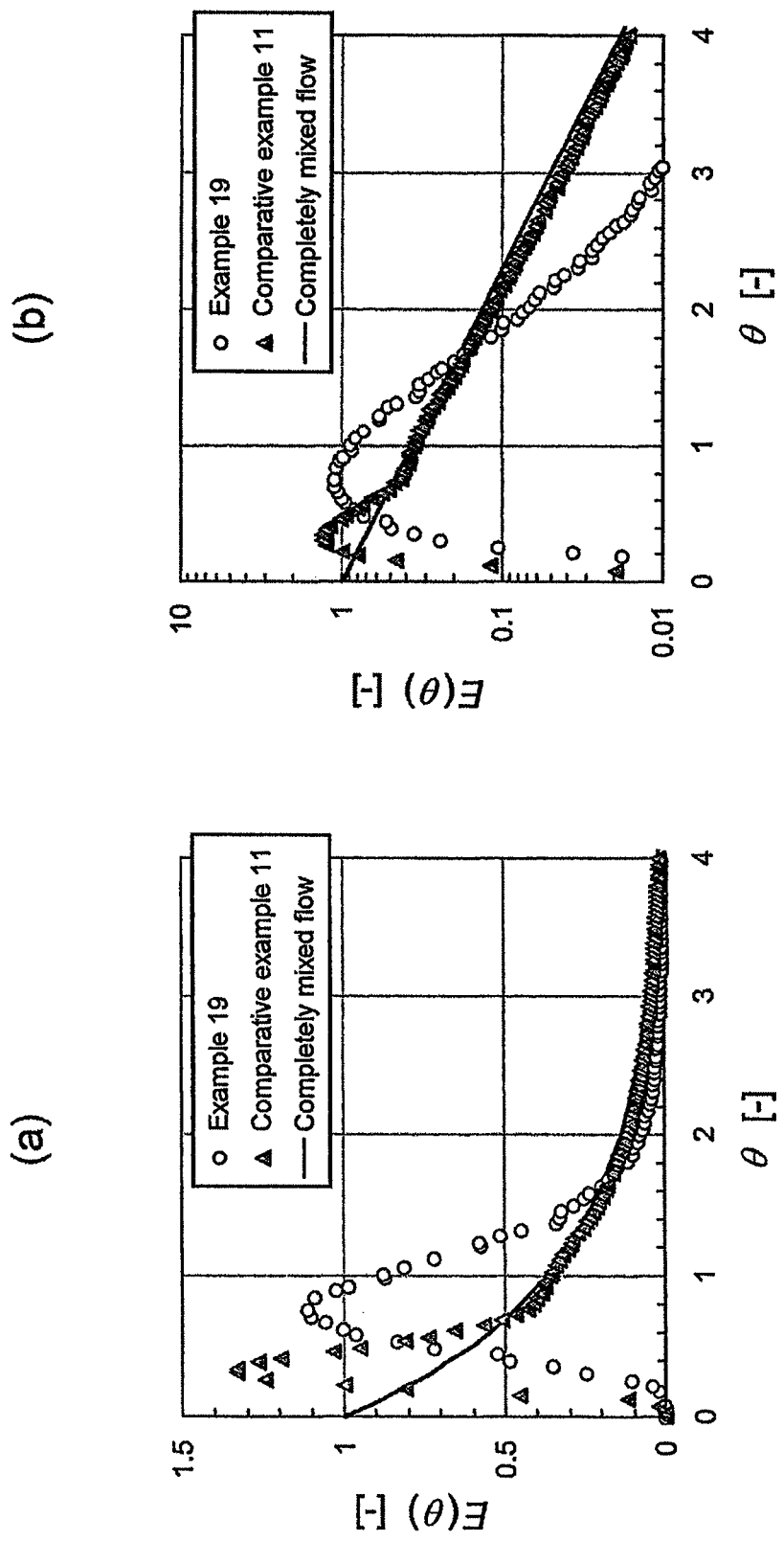
FIG. 13 is views showing measurement results of the residence time distributions in the example 19 and the comparative example 11 according to aspect (I) of the present invention.

In FIGS. 13(a) and 13(b), the residence time distributions of the example 19 and the comparative example 11 are shown. FIG. 13(b) logarithmically shows a vertical axis of FIG. 13(a). The solid line shows the residence time distribution in the completely mixed flow.

According to FIGS. 13(a) and 13(b), it was confirmed that the flow in the comparative example 11 was highly close to the completely mixed flow and the flow in the example 19 was clearly different from the completely mixed flow and was rather close to the plug flow.

Then, in the apparatuses in the examples 19 to 21 and the comparative examples 11 to 14, aqueous solution of 1% methylene blue was used as a tracer to visualize the flow to confirm the flow state.

When the aqueous solution of the methylene blue was injected into the upper side of the apparatuses (columns) in the comparative examples 11 to 14, the liquid in the lower side of the column was also strongly colored. Further, the color in the upper side of the column was observed to be the same as the color in the lower side of the column in a short period. It was also confirmed that the color of the liquid in the column was uniformly thinner in both of the upper and the lower sides with progress of time. This shows that the flow states in the apparatuses in the comparative examples 11 to 14 were close to the completely mixed flow and noticeable back mixing was caused.

When the aqueous solution of the methylene blue was injected into the upper side of the apparatuses (columns) in the examples 19 to 21, the liquid in the lower side of the column was almost not colored. The color in the upper side of the column was thinner with progress of time. This shows that back mixing was small and the flow was stable in the apparatuses in the examples 19 to 21.

Examples 22 and 23 and Comparative Examples 15 and 16

Figure 14:
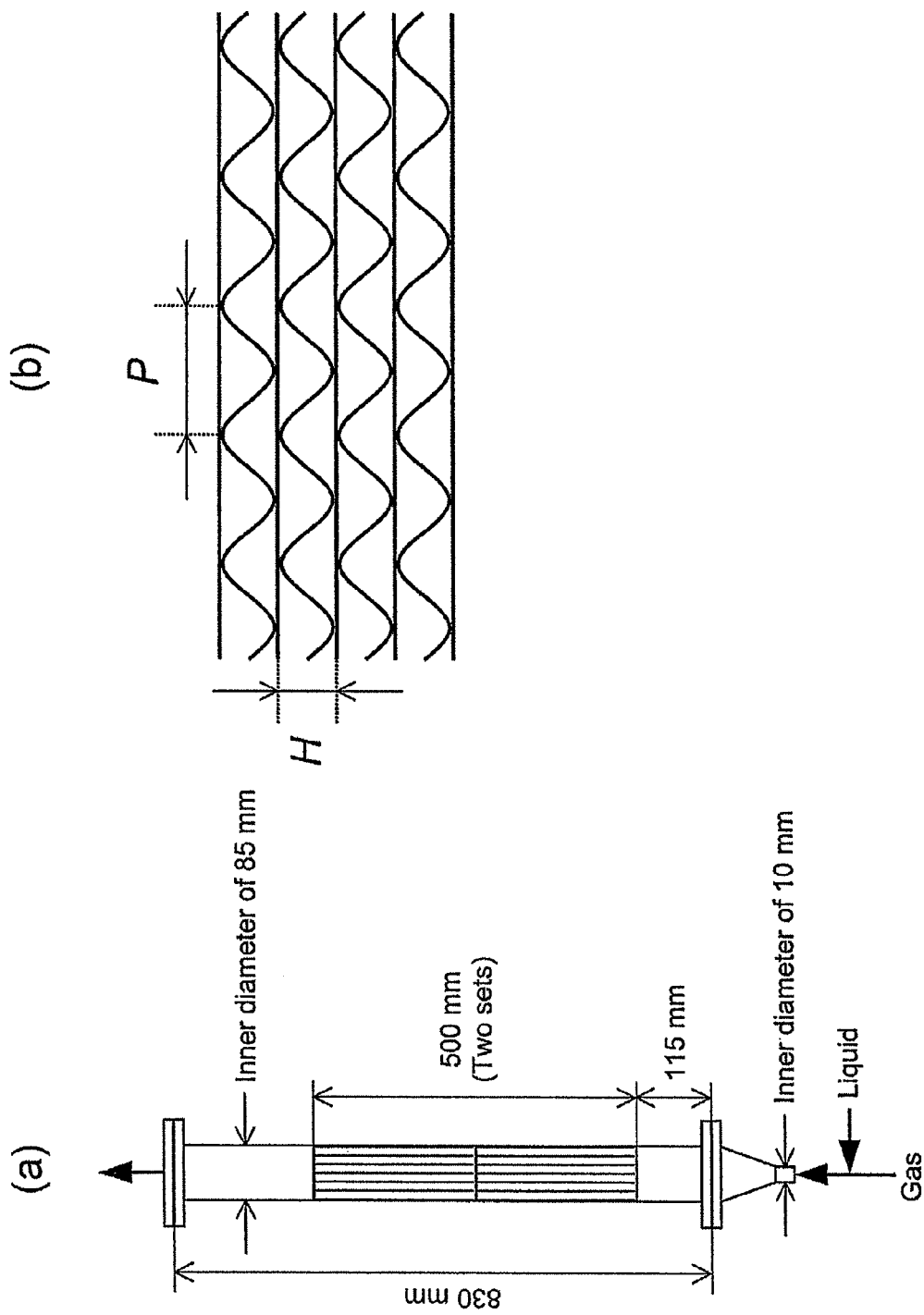

The gas was brought into contact with the liquid using a column contact apparatus as shown in FIG. 14(a) and Table 7. The column (column container) was formed of an acrylic resin with an inner diameter of 85 mm and a height of 830 mm so that the flow state could be viewed.

The honeycomb structural body was stacked upward from a position of 115 mm from a bottom surface of the column.

The honeycomb structural bodies include narrow tubular channels with substantially triangular cross sectional shape as shown in FIG. 14(b), and were formed by stacking corrugated plate films and flat plate films using copper foil with a thickness of 40 μm. The height of a single one of the honeycomb structural bodies was 250 mm, a cross-section thereof was circular, where each of the films was cut by a different width so that the honeycomb structural bodies could be packed into the column with an inner diameter of 85 mm.

Two sets of the honeycomb structural bodies were accommodated in the column, and a total height of the honeycomb structural bodies was set to 500 mm. As the upper and the lower honeycomb structural bodies, the honeycomb structural bodies directly stacked by being shifted by an angle of 90° in a circumferential direction with each other and the honeycomb structural bodies accommodated in two of the stages so that a gap of 26 mm was formed and maintained between the upper and the lower honeycomb structural bodies were used. The honeycomb structural body was held by a stainless steel wire net (diameter of 84 mm) with a wire diameter of 0.47 mm and a mesh size of 2 mm.

The honeycomb structural bodies with a different height (H) and a pitch (P) with respect to the narrow tubular channels (a cross sectional shape was substantially triangular) as shown in Table 7 and FIG. 14(b) were used.

An aperture ratio of the honeycomb with a height (H) of 1.0 mm and a pitch (P) of 5.2 mm was about 92% and the hydraulic diameter of the narrow tubular channels was about 0.96 mm. An aperture ratio of the honeycomb with a height (H) of 1.6 mm and a pitch (P) of 7.6 mm was about 95% and the hydraulic diameter of the narrow tubular channels was about 1.53 mm. Here, the values of the aperture ratio and the hydraulic diameter were calculated by approximating a curve of the cross-sectional shape of the corrugated plate film by a trigonometric function. When the cross-sectional shape of the narrow tubular channels of the honeycomb structural bodies was approximated by an isosceles triangle, the hydraulic diameter was also roughly estimated from the equations as shown in FIG. 10. The estimated value was highly close to the value obtained by approximating the shape by the trigonometric function.

A method for contacting the gas with the liquid using the column contact apparatus as shown in FIG. 14(a) and Table 7 was performed as in the examples 19 to 21 and the comparative examples 11 to 14.

The superficial velocity was in accordance with the general definition and calculated by dividing the flow rate by the cross-sectional area of the column as in the examples 19 to 21 and the comparative examples 11 to 14. Since the aperture ratios of the two types of the honeycomb structural bodies used here were large, even if the superficial velocity was calculated with the opening area of the honeycomb as a reference, the superficial velocity varied only within the range about 5%-9%.

0.9 mm. The hydraulic diameter was 0.9 mm and the cross-sectional area of one of the narrow tubular channels was about 0.70 mm².

The hydraulic diameter of the honeycomb structural bodies in the example 22 was more than those in the examples 19 to 21. When the cross-sectional area of the narrow tubular channels was focused, the area in the example 22 was about 3.7 times as large as those in the examples 19 to 21. In spite of this, the flow stabilization was obtained, which was considered as the effect of the cross-sectional shape of the narrow tubular channels.

Example 24

Manufacture of Tertiary Amine

<Manufacture of Film Catalyst>

A film catalyst was prepared by fixing powder catalysts on a film support body with phenolic resin as a binder.

A flask having a capacity of 1 L was charged with synthetic zeolite and then an aqueous solution in which copper nitrate,

TABLE 7

| | | Example | | Comparative example | |
|---|---|---|---|---|---|
| | | 22 | 23 | 15 | 16 |
| Column contact apparatus | Height of narrow tubular channels (mm) (H in FIG. 14(b)) | 1.0 | 1.0 | 1.6 | 1.6 |
| | Pitch of narrow tubular channels (mm) (P in FIG. 14(b)) | 5.2 | 5.2 | 7.6 | 7.6 |
| | Hydraulic diameter of narrow tubular channels (mm) (substantially triangle in FIG. 14(b)) | 0.96 | 0.96 | 1.53 | 1.53 |
| | Number of packed honeycomb structural bodies | 2 | 2 | 2 | 2 |
| | Gap between honeycomb structural bodies (mm) | 0 | 26 | 0 | 26 |
| Operation condition | Superficial gas velocity (m/s) | 0.029 | 0.029 | 0.029 | 0.029 |
| | Superficial liquid velocity (m/s) | 0.012 | 0.012 | 0.012 | 0.012 |
| Number of tanks, N (residence time distribution) | | 1.8 | 3.5 | 1.1 | 1.0 |

In the comparative examples 15 and 16, the value of the number N of the tanks calculated from the residence time distributions was close to one so that it was confirmed that the flow was close to the completely mixed flow.

In contrast, in the examples 22 and 23, the values of N were more than those in the comparative examples 15 and 16, and the flows were closer to the plug flow. This tendency was especially noticeable in the example 23 in which the honeycomb structural bodies were accommodated in two of the stages.

Figure 15:
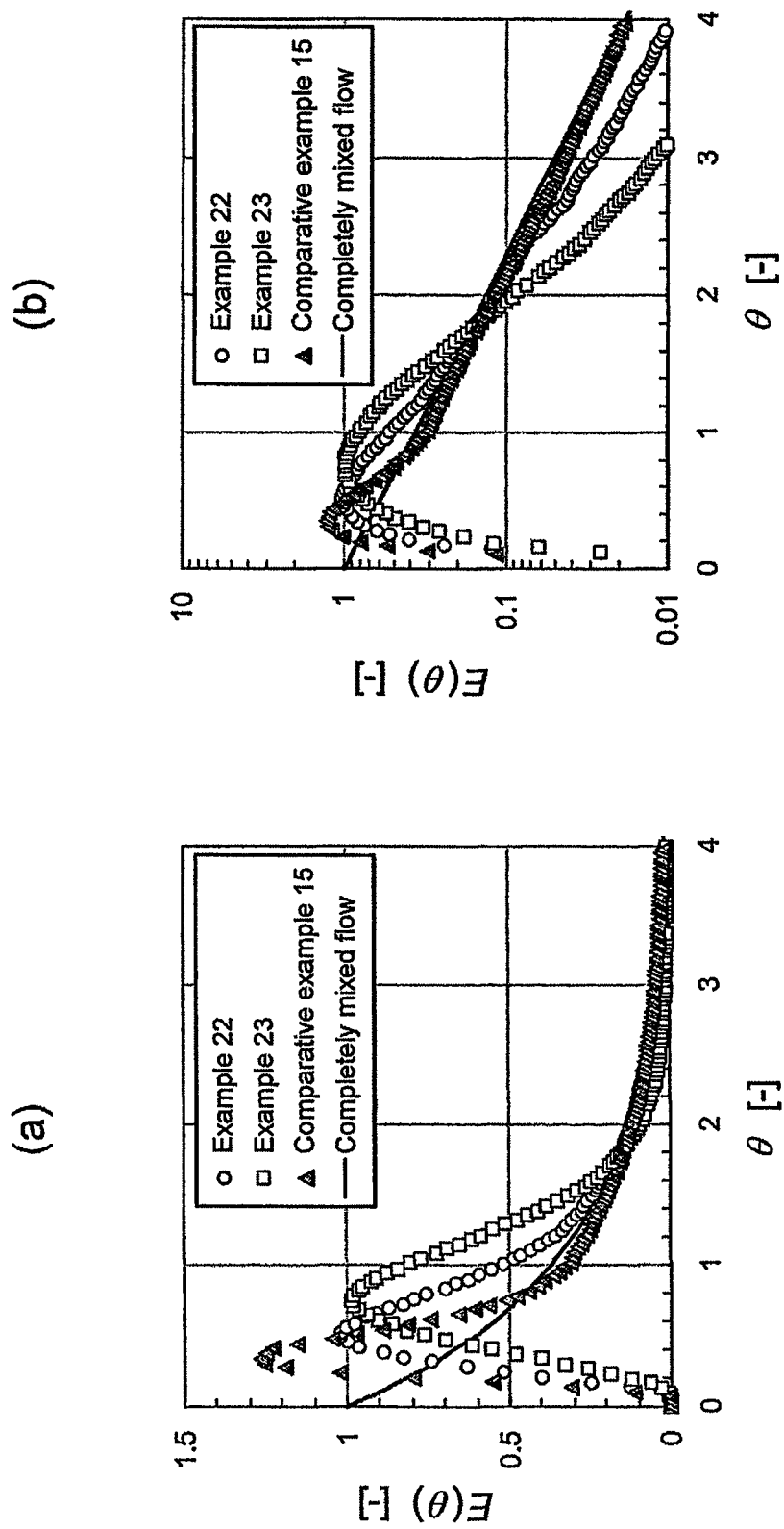
FIG. 15 is views showing measurement results of the residence time distributions in the examples 22 and 23 and the comparative example 15 according to aspect (I) of the present invention.

In FIGS. 15(a) and 15(b), the residence time distributions of the examples 22 and 23 and the comparative example 15 are shown. FIG. 15(b) logarithmically shows a vertical axis of FIG. 15(a). The solid line shows the residence time distribution in the completely mixed flow.

It was confirmed that the flow in the comparative example 15 was highly close to the completely mixed flow, the flow in the example 22 was clearly different from the completely mixed flow and was rather close to the plug flow, and the flow in the example 23 was closer to the plug flow.

By focusing on the cross-sectional shape of the narrow tubular channels, the example 22 (substantially triangular narrow tubular channels) was compared with the examples 19 to 21 (hexagonal narrow tubular channels).

In the example 22, the hydraulic diameter was 0.96 mm and the cross-sectional area of one of the narrow tubular channels was about 2.6 mm².

The honeycomb structural bodies in the examples 19 to 21 included hexagonal narrow tubular channels with the width of nickel nitrate and ruthenium chloride were dissolved to satisfy a molar ratio of metal atoms of Cu:Ni:Ru=4:1:0.01. The mixture was stirred and simultaneously heated.

After the mixture was heated to 90° C., aqueous solution of sodium carbonate of 10% by mass was gradually dropped to control pH to be pH9 to pH10.

After aging for one hour, deposits were filtered and washed with water, and then dried for ten hours at 80° C., and calcined for three hours at 600° C. to obtain a powder catalyst. A percentage of metal oxides in the obtained powder catalyst was 50% by mass, and a percentage of the synthetic zeolite was 50% by mass.

Phenolic resin (PR-9480 manufactured by Sumitomo Bakelite Co., Ltd., a nonvolatile portion of 56% by mass) as a binder was added to the power catalyst of 100 parts by mass so that a nonvolatile content of the phenolic resin was 25 parts by mass. 4-methyl-2-pentanone was added as a solvent so that a ratio of solid contents (the powder catalyst and nonvolatile contents of the phenolic resin) was 57% by mass.

The obtained mixture was mixed and dispersed by a paint shaker (manufactured by Toyo Seiki Seisaku-sho, Ltd., a plastic container of 250 mL was filled with catalyst containing paint of 164.5 g and glass beads of 102 g with a diameter of 1.0 mm), for thirty minutes to obtain paint.

The paint was applied to both surfaces of a copper foil (40 μm in thickness, 6.5 cm×410 cm×1 sheet) as a support body by a bar coater, and then dried for one minute at 130° C.

A half of the dried copper foil with the paint was shaped to a corrugated plate, and a remainder was maintained as a flat plate. The corrugated plate and the flat plate were cured for ninety minutes at 150° C. and a film catalyst was fixed on the both surfaces of the copper foil. The obtained film catalyst, except for the copper foil, had a solid content weight of 18.75 g per 1 m$^2$ per one of the surfaces.

<Manufacture OF Honeycomb Catalyst>

The honeycomb structured catalyst (honeycomb catalyst) was manufactured by using the film catalyst.

The cylindrical tube with an outer diameter of 27 mm, an inner diameter of 24.2 mm, and a height of 80 mm manufactured by SUS304 with a bottom surface on which a mesh formed of stainless steel (SUS304) with a mesh size of 5 mm was fixed was prepared as a container for the honeycomb catalyst.

The above-mentioned cured flat plate and corrugated plate film catalysts were alternately stacked and rolled into a cylinder, installed in the container to have honeycomb.

A total of five of these were produced, and supported and packed in a cylindrical tube (column container 101) formed of SUS304 with an inner diameter of 28.0 mm and a height of 650 mm at a position of 70 mm from a bottom of the cylindrical tube with these five stacked with each other to form a column reactor 100 (a single stage as a whole).

Lauryl alcohol (KALCOL 2098 by Kao Corp.) of 820 g was fed in a buffer tank 113.

A pump 135 for external circulation was operated with the open/close valve 133 opened, and lauryl alcohol was introduced into the column reactor 100 via a piping (line 125) with an inner diameter of 6 mm at 9 L/hr, and liquid circulation was performed between the buffer tank 113 and the column reactor 100.

As the gas supplier 102, a metal filter with a hole diameter of 0.025 mm was used. Hydrogen gas in a material tank 116 was supplied from a line 122 with an open/close valve 132 opened at a flow rate of 50 L/hr according to a volume conversion in a normal state and temperature in an inside of the column reactor 100 was increased to 185° C. simultaneously. Thereafter, the gas supply was held for one hour to reduce the catalyst to obtain the honeycomb catalyst. Then, it was cooled and lauryl alcohol was extracted therefrom.

The manufactured honeycomb catalyst was of a height (H) of 1.0 mm and a pitch (P) of 2.5 mm for the corrugated plate. The hydraulic diameter of the narrow tubular channels was about 0.87 mm, which was estimated by approximating the cross sectional shape of the corrugated plate by a trigonometric function.

<Preparation of Tertiary Amine>

(Preparation of N-dodecyl-N,N-dimethylamine)

Figure 16:
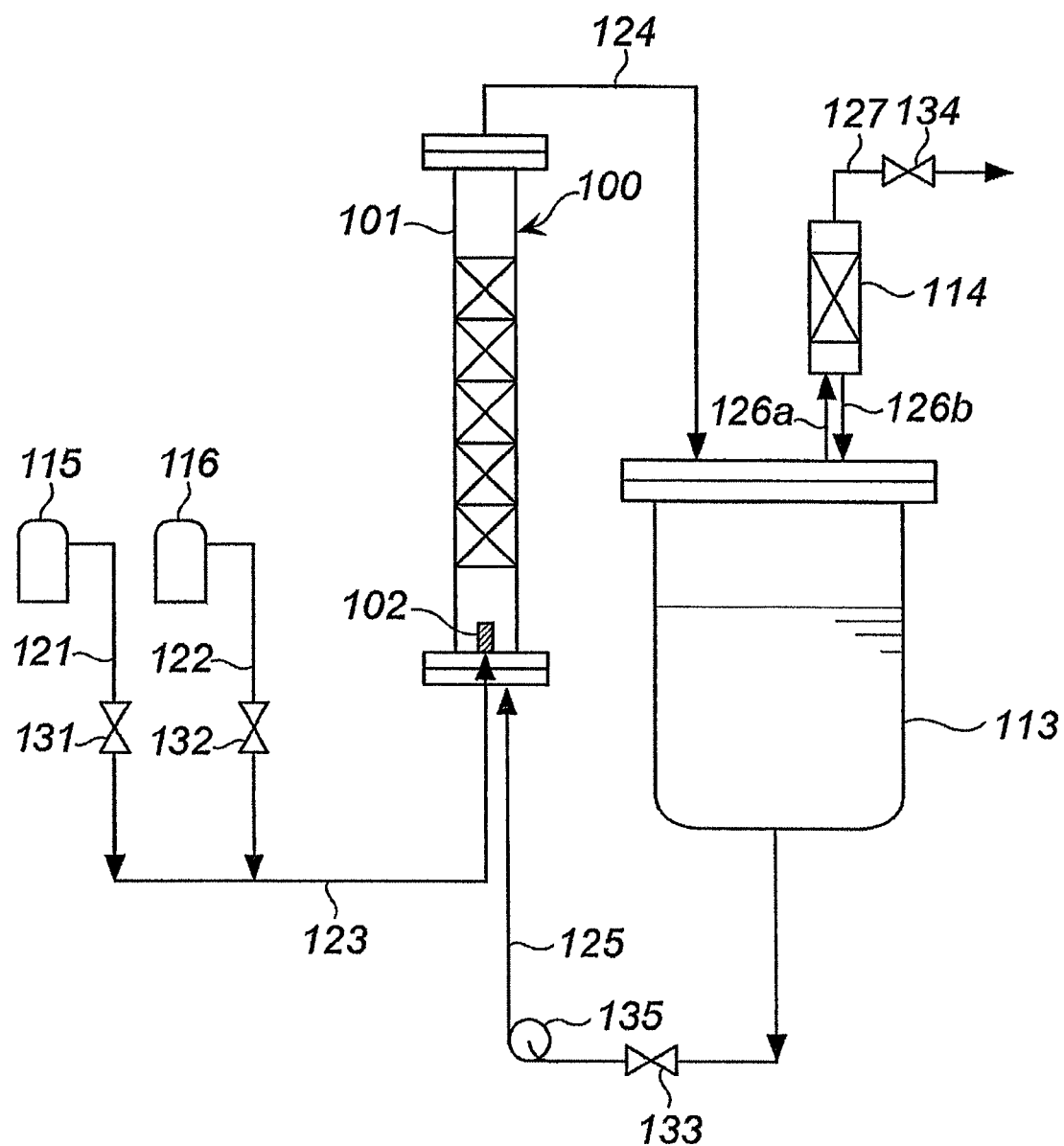
FIG. 16 is a view showing a manufacturing apparatus and &manufacturing flow for manufacturing tertiary amine according to aspect (I) of the present invention.

With respect to the column reactor 100 (which accommodates the honeycomb catalyst), a tertiary amine was prepared according to a manufacturing flow in FIG. 16.

Lauryl alcohol of 820 g was fed in a buffer tank 113 and circulated by a liquid flow rate of 9 L/hr. As a gas supplier 102, a metal filter with hole diameter of 0.025 mm was used. Hydrogen in the material tank 116 was supplied at a flow rate of 25 L/hr according to a volume conversion in a normal state and heated simultaneously. Reaction starts according to a supply of dimethylamine in a material tank 115 to perform a circulation reaction.

The unreacted dimethylamine and moisture in the buffer tank 113 was successively discharged from the line 127 with the open/close valve 134 opened through a conduit 126a.

Since the components discharged from the conduit 126a occasionally contained alcohol, generated tertiary amine, or the like as well as the above described components, they were condensed to liquid in a packed column 114 and returned to the buffer tank 113 via the line 126b.

Reaction temperature was increased to 220° C. and an amount of supplying dimethylamine was regulated according to progress of the reaction. The reaction liquid was sampled from the buffer tank 113 and analyzed by a gas chromatograph and quantity of compositions of the liquid was determined according to the peak area percentage method.

As a result, time required for an unreacted lauryl alcohol to be 1.0 mass % of lauryl alcohol was four hours from the start of reaction. As for compositions of the reacted liquid at this time, N-dodecyl-N,N-dimethylamine was 86 mass % and N,N-didodecyl-N-methylamine generated as a side product was 11 mass %.

Hereinafter, the examples 25 to 28 illustrate aspect (II) of the present invention.

Examples 25 and 26 and Comparative Examples 17 and 18

Figure 23:
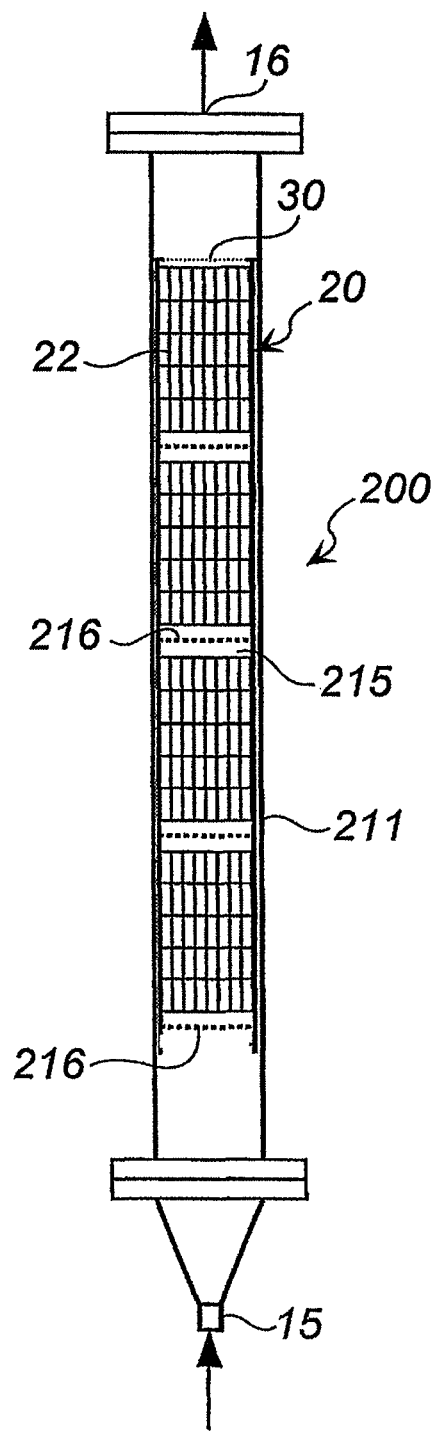
FIG. 23 is a cross-sectional view in a vertical direction showing the column contact apparatus used in the examples 25 and 26 according to aspect (II) of the present invention.

The gas was brought into contact with the liquid using a column contact apparatus 200 as shown in FIG. 23.

The column (column container 211) was formed of an acrylic resin with an inner diameter of 85 mm and a height of 830 mm so that the flow state could be viewed.

A container 20 in which the honeycomb structural bodies 22 are accommodated was configured to include four stages each including five of the honeycomb structural bodies so that a total of twenty of the honeycomb structural bodies were used. The container 20 was provided such that the honeycomb structural body at a bottom stage was located at a position 142 mm from a bottom of a column container 211. When the honeycomb structural body was stacked, the narrow tubular channels were not aligned to be consistent with each other.

In the apparatus 200 in the example, an annular plate 30 as shown in FIG. 19(a) was provided on the top portion of the honeycomb structural bodies at the top stage and four perforation holes 35 were formed as shown in FIG. 19(b). In the apparatus of the comparative examples, the annular plate 30 was not used.

The annular plate 30 (annular body portion 31) was of 84 mm of an outer diameter, 73 mm of an inner diameter, and 2 mm of a thickness. The recessed portions 33a to 33d of the annular body portion 31 were of a shape in which a semicircle was coupled with a rectangle as shown in FIG. 19. The diameter of the semicircle was 2 mm and the size of the rectangle coupled with the semicircle was 2 mm×1 mm. The cross-sectional area per each recess was about 3.6 mm$^2$. An outer peripheral edge 31a (except for the recessed portions 33a to 33d) of the annular body portion 31 as shown in FIG. 19 was sealed and the annular plate 30 was fixed so that the outer peripheral edge 31a could abut on an inner wall surface of the column container 211.

The container 20 was a cylinder formed of an acrylic resin with an outer diameter of 80 mm, an inner diameter of 76 mm, and a height of 633 mm, and each of the honeycomb structural bodies 22, packed into the container 20, was of a diameter of 75 mm and a height of 26 mm. The width of the clearance 19 was 2.5 mm.

As the honeycomb structural body 22, an aluminum micro honeycomb (width of narrow tubular channel of 1.5 mm) having hexagonal narrow tubular channels manufactured by Shin Nippon Feather Core Co., Ltd. was used.

Between the respective stages, as a flow-aligning plate 216, a perforated plate (a punching metal; hole diameter of 3 mm, pitch of 5 mm, and aperture ratio of 33%) with a diameter of 75 mm and a thickness of 1 mm was provided and spaces each of 13 mm were provided on and below the plate so that the length of the space portions was 26 mm (not including the thickness of the flow-aligning plate). The same perforated plate was also provided under the bottom stage.

A method for contacting the gas with the liquid using the column contact apparatus 200 as shown in FIG. 23 was performed as follows.

Air was used as the gas and ion-exchange water was used as the liquid at an ambient temperature. The gas and the liquid were flowed from independent pipings through flowmeters so that the flow rate of the gas and the flow rate of the liquid were maintained to be constant.

The pipings of the gas and the liquid were joined in advance before entering the column so that the gas and the liquid were flowed through a straight pipe with a diameter of 10 mm and a length of 30 mm to be subjected to gas dispersion. The straight pipe was connected to a spreading pipe with a cross-section gradually increasing to be truncated conical. An outlet of the spreading pipe corresponded to an inner diameter of the column to be connected to a bottom side of the column.

The gas and the liquid were, at a superficial velocity shown in Table 8, flowed into the column from the bottom and discharged via the top.

The superficial velocity was calculated by dividing the flow rate by the cross-sectional area of the column. The aperture ratio of the honeycomb structural body used here was approximately 98%, being large. Accordingly, even if the superficial velocity was calculated with an opening area of the honeycomb as a reference, the superficial velocity scarcely changed.

TABLE 8

|  | Example | | Comparative example | |
|---|---|---|---|---|
|  | 25 | 26 | 17 | 18 |
| Flow control means (annular plate 30) | Present | Present | None | None |
| Number of perforation holes of flow control means | 4 | 4 | — | — |
| Superficial gas velocity (m/s) | 0.059 | 0.235 | 0.059 | 0.235 |
| Superficial liquid velocity (m/s) | 0.012 | 0.012 | 0.012 | 0.012 |
| Ratio between pressure losses ($PL_1/PL_2$) | 3.7 | 4.0 | — | — |
| Number of tanks, N (residence time distribution) | 2.6 | 1.6 | 1.0 | 0.8 |

In the examples 25 and 26, an annular plate 30 was provided on an upper end of the clearance, while in the comparative examples 17 and 18, the annular plate 30 was not provided and the upper end of the clearance was opened.

The superficial liquid velocity was constant to be 0.012 m/s, and in the example 25, the superficial gas velocity was 0.059 m/s, and in the example 26, the superficial gas velocity was 0.235 m/s. By using the formula of Chisholm and the formula of Murdock, a ratio ($PL_1/PL_2$) between a pressure loss (local loss) $PL_1$ through the clearance and a pressure loss (friction loss) $PL_2$ through the honeycomb structural body when the annular plate 30 as shown in FIG. 19(a) was provided could be obtained. Approximately, in the example 25, the ratio $PL_1/PL_2$=3.7, and in the example 26, the ratio $PL_1/PL_2$=4.0.

Figure 24:
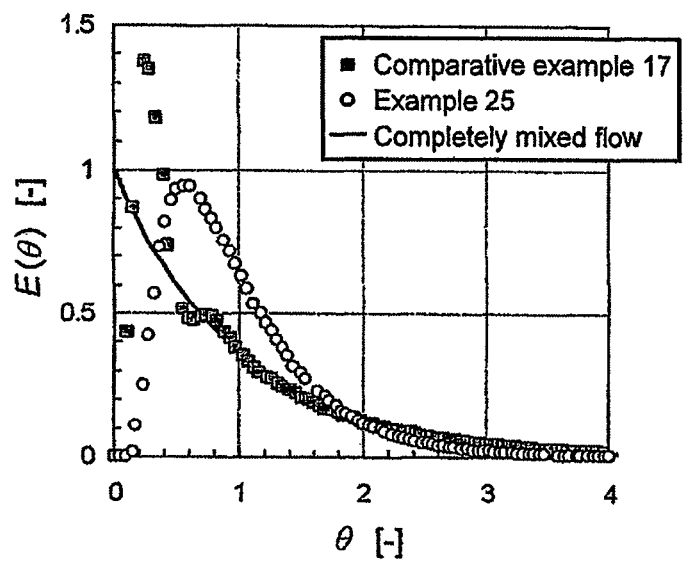
FIG. 24 is views showing the residence time distributions in the example 25 and the comparative example 17 according to aspect (II) of the present invention.
Figure 24:
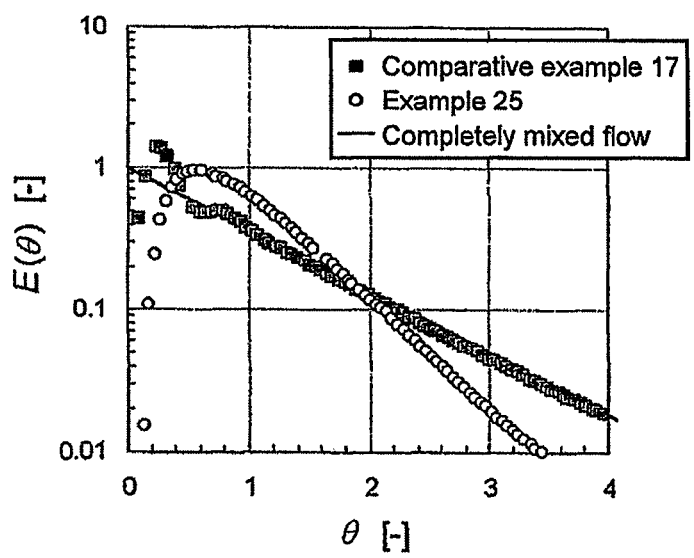

The residence time distributions of the example 25 and the comparative example 17 are as shown in FIGS. 24(a) and 24(b). FIG. 24(b) logarithmically shows a vertical axis of FIG. 24(a). A solid line shows the residence time distribution in the completely mixed flow.

Figure 25:
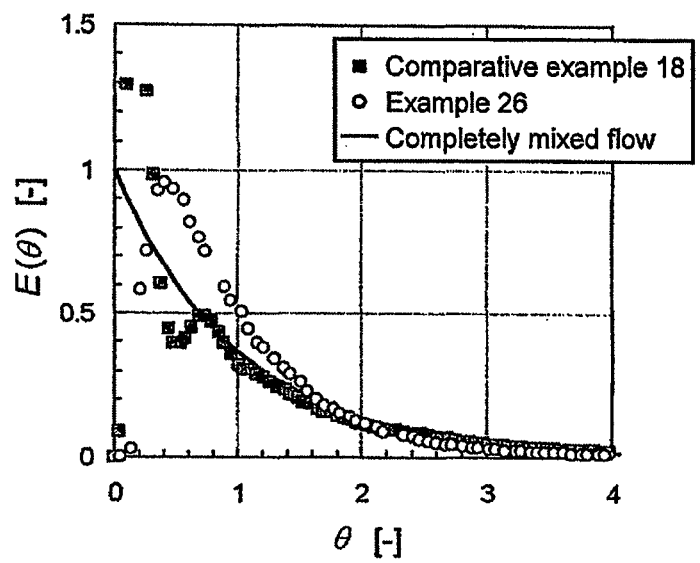
FIG. 25 is views showing the residence time distributions in the example 26 and the comparative example 18 according to aspect (II) of the present invention.
Figure 25:
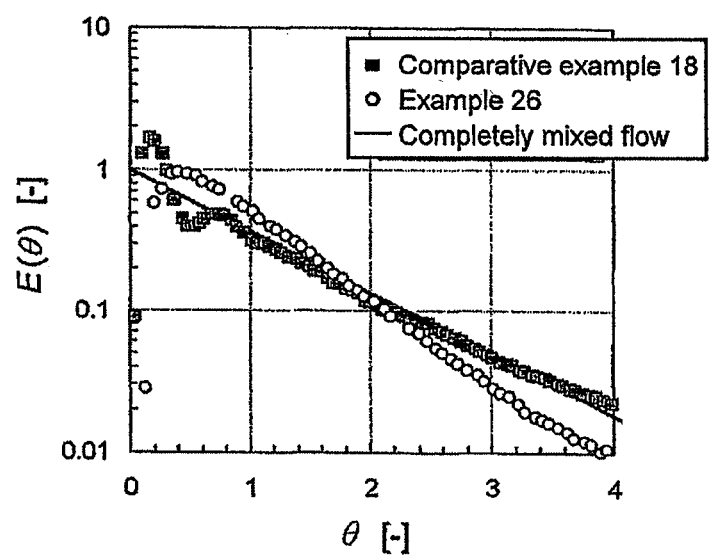

The residence time distributions of the example 26 and the comparative example 18 were obtained as FIGS. 25(a) and 25(b). FIG. 25(b) logarithmically shows a vertical axis of FIG. 25(a). The solid line shows the residence time distribution in the completely mixed flow.

In the comparative examples 17 and 18, the upward bypass flow in the clearance was strong, while in an inside of the container 20 that accommodates the honeycomb structural bodies therein, the liquid flowed downward. The residence time distribution was highly close to the completely mixed flow corresponding to such a turbulent flow state.

In contrast, in the examples 25 and 26, the flow into the clearance was restricted and it was observed that the gas and the liquid flowed upward in both of the container 20 that accommodates the honeycomb structural bodies therein and the clearance. That is, the bypass flow of the gas-liquid into the clearance was restricted, although it was present. In the honeycomb structural bodies 22 in the container 20, the gas was appropriately brought into contact with the liquid. Corresponding to the restriction of the flow into the clearance, the obtained residence time distribution differed from that of the completely mixed flow.

When the value of N corresponding to the number of the tanks in the tanks-in-series model was calculated from the dispersion of the residence time distribution, in the comparative examples 17 and 18, the value was highly close to the value N=1 in the completely mixed flow, while in the examples 25 and 26, the value of N was sufficiently more than one so that it was further confirmed that the bypass flow into the clearance was restricted.

Examples 27 and 28 and Comparative Example 19

Figure 26:
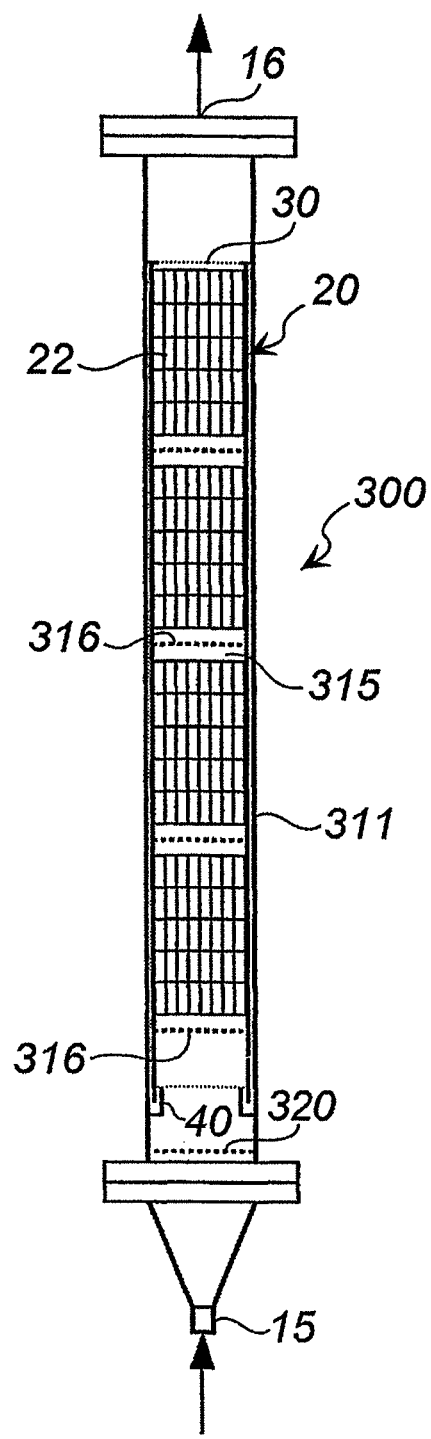
FIG. 26 is a cross-sectional view in a vertical direction showing the column contact apparatus used in the examples 27 and 28 according to aspect (II) of the present invention.

The gas was brought into contact with the liquid using a column contact apparatus 300 as shown in FIG. 26. The column contact apparatus 300 as shown in FIG. 26 was the same as the column contact apparatus 200 as shown in FIG. 23 except that guiding means 40 and a perforated plate 320 were provided. Reference numerals 315 and 316 indicate a space portion and a flow-aligning plate, respectively.

It should be noted that the example 27 shows an example in which two of the four perforation holes 35 facing oppositely with each other were closed to form two of the perforation holes 35.

The guiding means (gas bubble flow-in prevention member) 40 that was configured by an annular flat plate 41 with an outer diameter of 84 mm, an inner diameter of 62 mm, and a thickness of 2 mm, and a tubular portion 42 with an outer diameter of 66 mm and an inner diameter of 62 mm was provided as shown in FIG. 22 to satisfy the configuration of $w_1$=10 mm, $w_2$=5 mm, and $w_3$=12 mm.

Further, a perforated plate 320 (punching metal; hole diameter of 3 mm, pitch of 5 mm, and aperture ratio of 33%) with a diameter of 84 mm and a thickness of 1 mm was also provided at an inlet side of a column container 311.

TABLE 9

|  |  | Example 27 | | Example 28 | | Comparative example 19 |
|---|---|---|---|---|---|---|
| Flow control means (annular plate 30) | | Present | | Present | | None |
| Number of perforation holes of flow control means | | 2 | | 4 | | — |
| Perforated plate at inlet of column container | | Present | None | Present | None | Present |
| Superficial gas velocity | 0.059 m/s (20 L/min) | ○ | ○ | ○ | ○ | ○ |
| | 0.117 m/s (40 L/min) | ○ | ○ | ○ | ○ | x |
| | 0.235 m/s (80 L/min) | ○ | ○ | ○ | x | x |
| | 0.470 m/s (160 L/min) | ○ | x | ○ | x | x |
| Ratio between pressure loss ($PL_1/PL_2$) | | 5.2~7.8 | | 1.3~2.0 | | — |

(Superficial liquid velocity of 0.012 m/s, Liquid flow rate of 4 L/min)
○: No bypass flow
x: Bypass flow present (turbulent in flow)

In the examples 27 and 28 and the comparative example 19, honeycomb structural bodies having hexagonal narrow tubular channels of width of 0.9 mm (aluminum micro honeycomb manufactured by Shin Nippon Feather Core Co., Ltd.) were packed as in the examples 25 and 26. The superficial liquid velocity was constant to be 0.012 m/s and a flow state was confirmed in a range of 0.059 to 0.470 m/s of the superficial gas velocity.

By using the formula of Chisholm and the formula of Murdock, a ratio ($PL_1/PL_2$) between a pressure loss (local loss) $PL_1$ through the clearance and a pressure loss (friction loss) $PL_2$ through the honeycomb structural body when the annular plate 30 as shown in FIG. 19(*a*) was provided could be obtained. In the example 27 for the two perforation holes, $PL_1/PL_2$ was approximately equal to 5.2 to 7.8. In the example 28 for the four perforation holes, $PL_1/PL_2$ was approximately equal to 1.3 to 2.0.

In the comparative example 19 in which an upper end of the clearance was opened, according to advantage of the guiding means 40, inflow of the air bubbles into the clearance when the superficial gas velocity was equal to 0.059 m/s was not observed, and the bypass flow of the gas into the clearance was not generated. In the container 20 in which the honeycomb structural bodies were accommodated, the gas-liquid was in an upflow and the liquid in the clearance was in a downflow. That is, in the column contact apparatus 300 (column container 311), the flow corresponded to an internal circulation flow. This is because the bypass flow into the clearance was not generated. When the superficial gas velocity was equal to or more than 0.117 m/s, however, the air bubbles flowed into the clearance. In the clearance, an upward strong bypass flow of the gas and the liquid was observed.

In the examples 27 and 28 in which the annular plate 30 was provided at the upper end of the clearance, at the superficial gas velocity of 0.059 to 0.470 m/s, the air bubbles flowing into the clearance were not observed. Further, the liquid in the clearance flowed downward, and the bypass flow into the clearance was not caused. This result shows that, by a combination of the flow control means (annular plate 30) and the guiding means 40, the bypass flow into the clearance was more advantageously restricted than those in the examples 25 and 26.

Note that in a case in which the perforated plate (the punching metal) at an inlet of the column was removed, when the superficial gas velocity was 0.235 m/s or 0.470 m/s, the gas in the vicinity of the guiding means 40 was in a continuous phase. At this time, in the example 28 in which an annular plate with four holes was used, the air bubbles flowing into the clearance and the bypass flow were observed.

In the example 27 in which an annular plate with two holes was used, when the superficial gas velocity was equal to 0.470 m/s, the air bubbles flowing into the clearance and the bypass flow were observed as in the example 28. In contrast, when the superficial gas velocity was equal to 0.235 m/s, some air bubbles flowed into the clearance, but the liquid flow in the clearance was stably downward and a bypass flow was not generated.

Such a difference between the examples 27 and 28 shows that by increasing the pressure loss in the clearance with the flow control means, the bypass flow could be advantageously restricted.

The invention claimed is:

1. A column contact apparatus for contacting gas with liquid in an upflow in a column container, the column contact apparatus comprising:
    four or more stages of honeycomb structural bodies, vertically provided in the column container, each of the honeycomb structural bodies having a plurality of parallel narrow tubular channels;
    a space portion having a length equal to or longer than 5 mm and equal to or less than twice as large as an inner diameter of the column container, formed between the respective stages of the four or more stages of the honeycomb structural bodies; and
    a flow-aligning portion provided as a back-flow prevention means in each space portion between the respective stages such that the flow-aligning portion is not brought into contact with the honeycomb structural bodies, the flow-aligning portion having a plurality of holes with hole diameters of 0.5 mm to 8 mm.

2. The column contact apparatus according to claim 1, wherein the length of the space portion is equal to or longer than 10 mm and equal to or less than an inner diameter of the column container.

3. The column contact apparatus according to claim 1, wherein the flow-aligning portion is a perforated plate with an aperture ratio of 1-70%.

4. The column contact apparatus according to claim 1, wherein the flow-aligning portion is formed with a honeycomb structural plate with a thickness equal to or more than 5 mm and equal to or less than 25% of a height of the honeycomb structural body.

5. The column contact apparatus according to claim 1, wherein, in the column contact apparatus, the flow-aligning portion is provided as the back-flow prevention means below the honeycomb structural body of the bottom stage such that the flow-aligning portion is not brought into contact with the honeycomb structural body.

6. The column contact apparatus according to claim 1, wherein a hydraulic diameter is equal to or more than 0.1 mm and less than 1 mm in a cross section in the width direction of the narrow tubular channel.

7. The column contact apparatus according to claim 1, wherein a hydraulic diameter is equal to or more than 0.5 mm and less than 1 mm in a cross section in the width direction of the narrow tubular channel.

8. The column contact apparatus according to claim 1, wherein the cross-sectional shape of the narrow tubular channels in the width direction is polygonal or substantially polygonal selected from the group consisting of hexagonal shapes, pentagonal shapes, square shapes and triangular shapes.

9. The column contact apparatus according to claim 1, wherein the honeycomb structural body is configured by alternately stacking a flat plate film and a corrugated plate film in the thickness direction, and the cross-sectional shape of the narrow tubular channels in the width direction is a substantially triangular shape.

10. The column contact apparatus according to claim 1, wherein the honeycomb structural body is provided with a surface on which a catalyst is immobilized.

11. A method for operating the column contact apparatus according to claim 1, comprising a step of contacting the gas with the liquid at a superficial liquid velocity of 0.0001 to 0.5 m/s and a superficial gas velocity of 0.05 to 10 m/s.

12. The method for operating the column contact apparatus according to claim 11, wherein the gas and the liquid are brought into contact with each other so that a gas holdup is within a range of 0.05 to 0.8.

13. A column contact apparatus for contacting gas and liquid supplied from the bottom of the apparatus with each other in an upflow in a column container and then taking out the gas and the liquid via a top of the apparatus, comprising:
    two or more stages of honeycomb structural bodies, vertically provided in the column container, each of the honeycomb structural bodies having a plurality of parallel narrow tubular channels;
    a space portion having a length equal to or longer than 5 mm and equal to or less than twice as large as an inner diameter of the column container, formed between the respective stages of the two or more stages of the honeycomb structural bodies;
    a flow-aligning portion provided as a back-flow prevention means in each space portion between the respective stages such that the flow-aligning portion is not brought into contact with the honeycomb structural bodies, the flow-aligning portion having a plurality of holes with hole diameters of 0.5 mm to 8 mm;
    a container containing the honeycomb structural body therein in the column container;
    a clearance being continuous from the bottom to the top of the column container in the height direction between the column container and the container containing the honeycomb structural body; and
    a flow control means provided at a desired height position of the clearance to control such that a pressure loss ($PL_1$) of the gas and the liquid passing through the clearance is equal to or more than a pressure loss ($PL_2$) of the gas and the liquid passing through the honeycomb structural body.

14. The column contact apparatus according to claim 13, wherein the flow control means satisfies a relationship $PL_1/PL_2 \geq 2$.

15. The column contact apparatus according to claim 13, further comprising a guiding means between a supply port for the gas and the liquid and a clearance formed by the column container and a container for accommodating a honeycomb structural body of the bottom stage therein, the supply port being provided at the bottom of the column container, wherein the guiding means guides gas bubbles supplied from the supply port to the honeycomb structural body at the bottom stage.

16. The column contact apparatus according to claim 13, wherein the flow control means includes a perforation hole or can have a perforation hole formed therein, and one or two or more perforation holes are provided.

17. The column contact apparatus according to claim 13, wherein the flow control means is formed with an annular plate including a perforation hole or allowing a perforation hole to be formed therein, and one or two or more perforation holes are provided.

18. The column contact apparatus according to claim 13, wherein an upper side of the clearance is closed, the flow control means is formed by a tubular member, the tubular member includes a perforation hole, and one or two or more perforation holes are provided.

19. The column contact apparatus according to claim 13, wherein an upper side of the clearance is closed, the flow control means is a container for accommodating the honeycomb structural body having a perforation hole and one or two or more perforation holes are provided.

20. The column contact apparatus according to claim 13, wherein the flow control means is provided on an upper side of the honeycomb structural body at the top stage installed in the inside of the column container or at a position of the same height as the honeycomb structural body at the top stage.

21. The column contact apparatus according to claim 13, wherein the container that accommodates the honeycomb structural body at one of the stages is configured by a combination of a plurality of the containers.

* * * * *